United States Patent
Suitoh et al.

(10) Patent No.: US 10,681,271 B2
(45) Date of Patent: Jun. 9, 2020

(54) IMAGE PROCESSING APPARATUS, IMAGE CAPTURING SYSTEM, IMAGE PROCESSING METHOD, AND RECORDING MEDIUM

(71) Applicant: Ricoh Company, Ltd., Tokyo (JP)

(72) Inventors: Hiroshi Suitoh, Kanagawa (JP); Takahiro Asai, Kanagawa (JP); Keiichi Kawaguchi, Kanagawa (JP); Kazuhiro Yoshida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 104 days.

(21) Appl. No.: 15/921,708

(22) Filed: Mar. 15, 2018

(65) Prior Publication Data
US 2018/0270417 A1 Sep. 20, 2018

(30) Foreign Application Priority Data

Mar. 15, 2017 (JP) .................................. 2017-050582
Nov. 29, 2017 (JP) .................................. 2017-229498
Feb. 8, 2018 (JP) .................................. 2018-021376

(51) Int. Cl.
| | |
|---|---|
| *H04N 5/00* | (2011.01) |
| *H04N 5/232* | (2006.01) |
| *H04N 5/357* | (2011.01) |
| *H04N 9/04* | (2006.01) |
| *G06T 3/40* | (2006.01) |

(52) U.S. Cl.
CPC ....... *H04N 5/23238* (2013.01); *G06T 3/4038* (2013.01); *H04N 5/3572* (2013.01); *H04N 9/045* (2013.01)

(58) Field of Classification Search
CPC .. H04N 5/23238; H04N 5/3572; H04N 9/045; G06T 3/4038
See application file for complete search history.

(56) References Cited

U.S. PATENT DOCUMENTS

| | | | | |
|---|---|---|---|---|
| 8,112,718 | B2 * | 2/2012 | Nezu | G11B 19/025 |
| | | | | 715/716 |
| 9,354,505 | B2 * | 5/2016 | Jang | H04N 5/23216 |
| 9,858,683 | B2 * | 1/2018 | Liu | G06T 7/60 |
| 2006/0090141 | A1 * | 4/2006 | Loui | G06F 16/54 |
| | | | | 715/764 |

(Continued)

FOREIGN PATENT DOCUMENTS

JP 2006-041741 2/2006

OTHER PUBLICATIONS

Zhengyou Zhang, "A Flexible New Technique for Camera Calibration" IEEE Transactions on Pattern Analysis and Machine Intelligence, vol. 22, No. 11, Nov. 2000, p. 1330-p. 1334.

*Primary Examiner* — Frank F Huang
(74) *Attorney, Agent, or Firm* — Xsensus LLP

(57) ABSTRACT

An apparatus, system, and method are provided, each of which: obtains a first image in a first projection, and a second image in a second projection; obtains area specification information specifying an area in the second image; and associates location information to be used for superimposing the second image on the first image with the area specification information, or generates location information based on the area specification information.

18 Claims, 51 Drawing Sheets

(56) References Cited

U.S. PATENT DOCUMENTS

| | | | |
|---|---|---|---|
| 2009/0210793 A1* | 8/2009 | Yee | G06F 16/58 |
| | | | 715/723 |
| 2012/0046770 A1* | 2/2012 | Becker | H04L 65/4084 |
| | | | 700/94 |
| 2013/0080895 A1* | 3/2013 | Rossman | G06F 3/04883 |
| | | | 715/720 |
| 2014/0347526 A1* | 11/2014 | Hara | H04N 5/357 |
| | | | 348/241 |
| 2015/0269969 A1* | 9/2015 | DeYonker | G11B 27/105 |
| | | | 386/241 |
| 2016/0050369 A1 | 2/2016 | Takenaka et al. | |
| 2016/0212336 A1 | 7/2016 | Takenaka et al. | |
| 2017/0094169 A1 | 3/2017 | Yoshikawa et al. | |

* cited by examiner

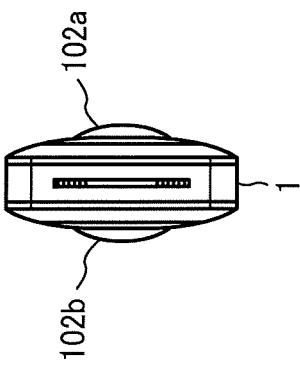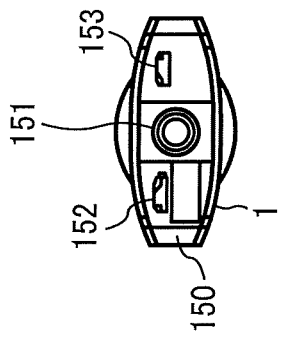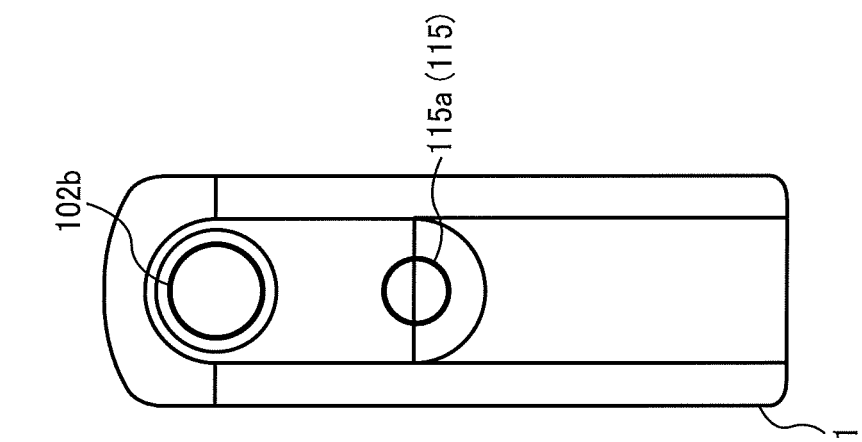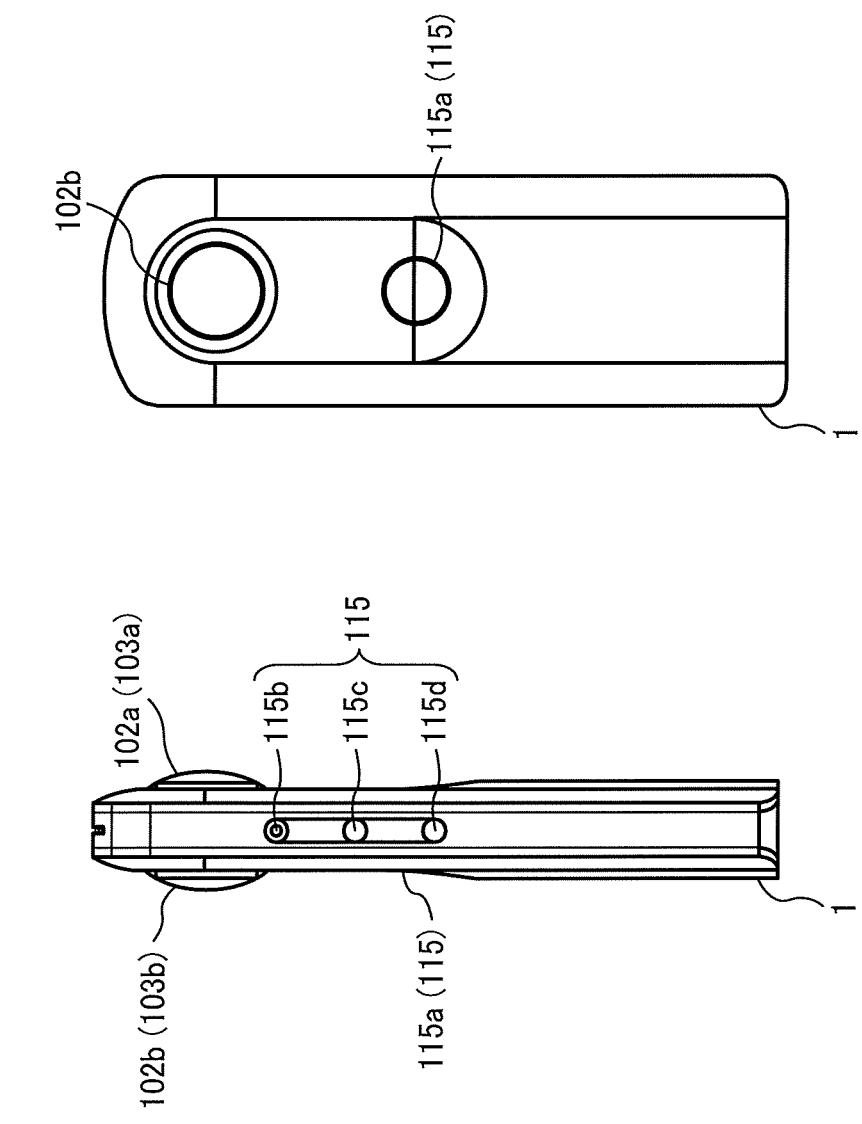

HEMISPHERICAL IMAGE (FRONT)

HEMISPHERICAL IMAGE (BACK)

CAPTURED IMAGE (EQUIRECTANGULAR PROJECTION IMAGE EC)

FIG. 4B
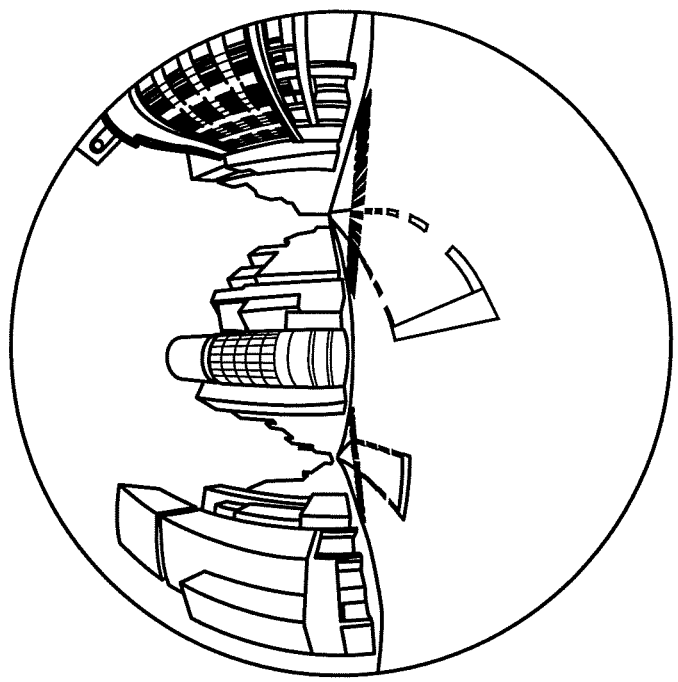
SPHERICAL IMAGE CE
FIG. 4A
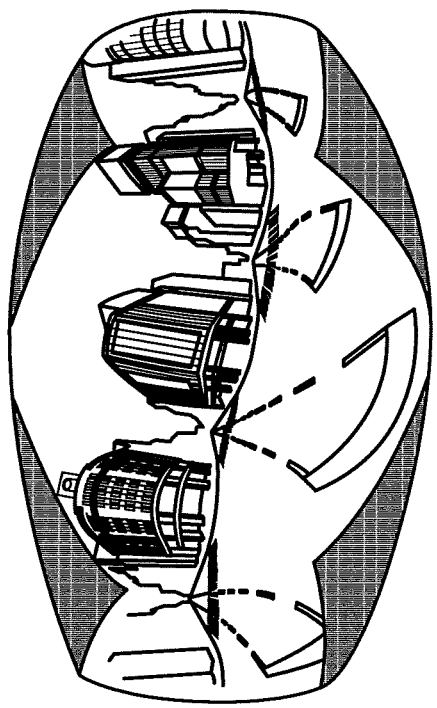
EQUIRECTANGULAR PROJECTION IMAGE EC
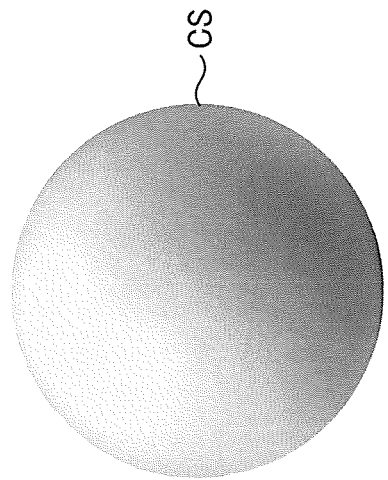
CS

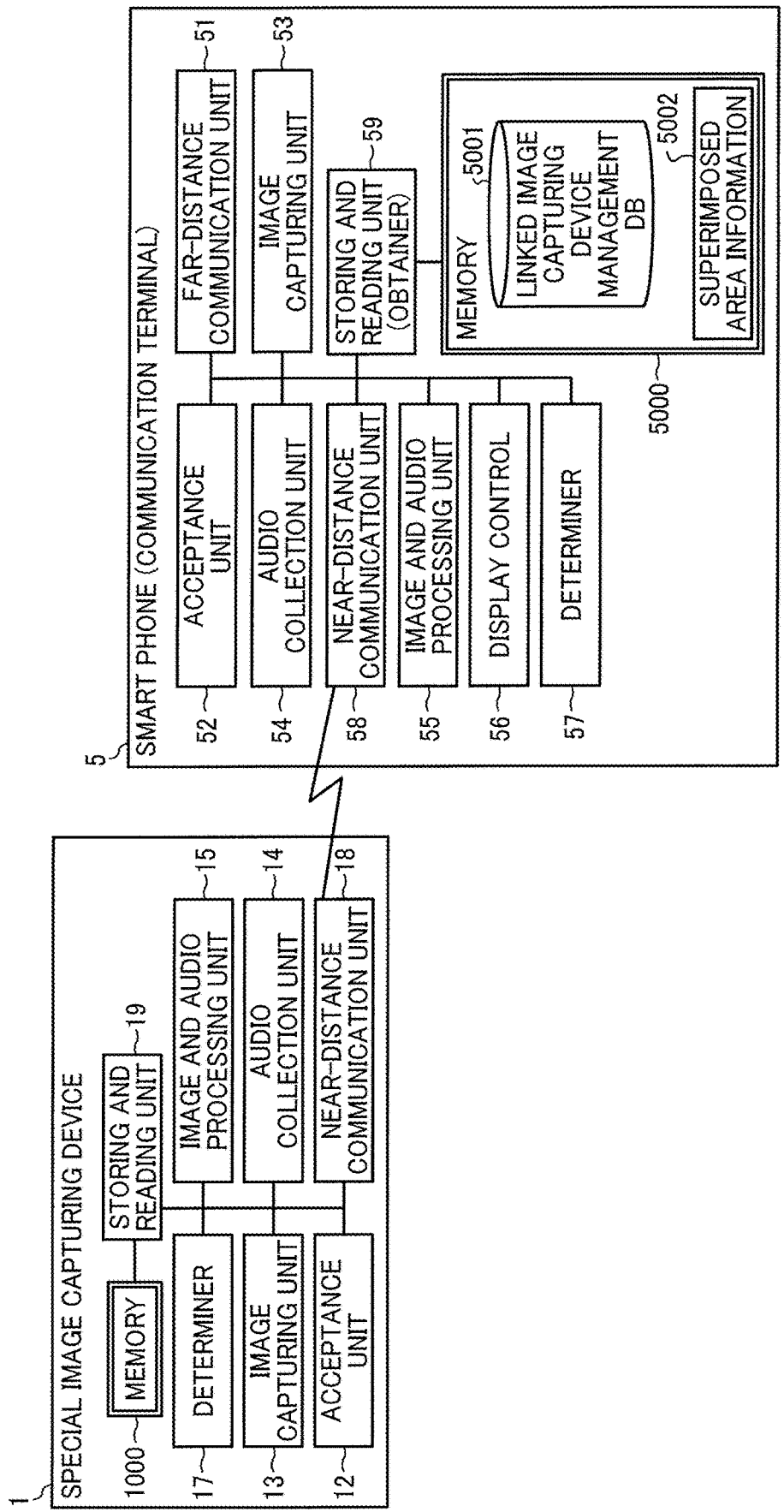

| LINKING INFORMATION | IP ADDRESS | DEVICE NAME |
|---|---|---|
| MAIN | 1.2.3.4 | smp-camera (REAR) |
| SUB | 1.2.3.4 | smp-camera (FRONT) |
| SUB | 1.2.3.6 | theta-camera1 |
| ⋮ | ⋮ | ⋮ |

FIG. 14

| | | | |
|---|---|---|---|
| EQUIRECTANGULAR PROJECTION IMAGE INFORMATION | ATTRIBUTE DATA | IMAGE ID | ./IMAGE001.JPG |
| | | POSITIONING CORRECTION (Pitch, Yaw, Roll) | (−2.8, −2.1, 0) |
| PLANER IMAGE INFORMATION | ATTRIBUTE DATA | IMAGE ID | ./IMAGE111.JPG |
| | | 35 mm EQUIVALENT FOCAL LENGTH | 28 |
| SUPERIMPOSED DISPLAY INFORMATION | AREA DIVISION NUMBER INFORMATION | HORIZONTAL (LONGITUDE) DIVISION NUMBER | 30 |
| | | VERTICAL (LATITUDE) DIVISION NUMBER | 20 |
| | COORDINATE OF GRID IN GRID AREA (LOCATION PARAMETER) | | $(LO'_{00,00}, LA'_{00,00}), (LO'_{01,00}, LA'_{01,00}),$ $..., (LO'_{30,20}, LA'_{30,20})$ |
| | CORRECTION VALUE OF BRIGHTNESS AND COLOR (CORRECTION PARAMETER) | | $(R_{00,00}, G_{00,00}, B_{00,00}), (R_{01,00}, G_{01,00}, B_{01,00}),$ $..., (R_{30,20}, G_{30,20}, B_{30,20})$ |
| METADATA GENERATION INFORMATION | VERSION INFORMATION | | 0.1.1 |

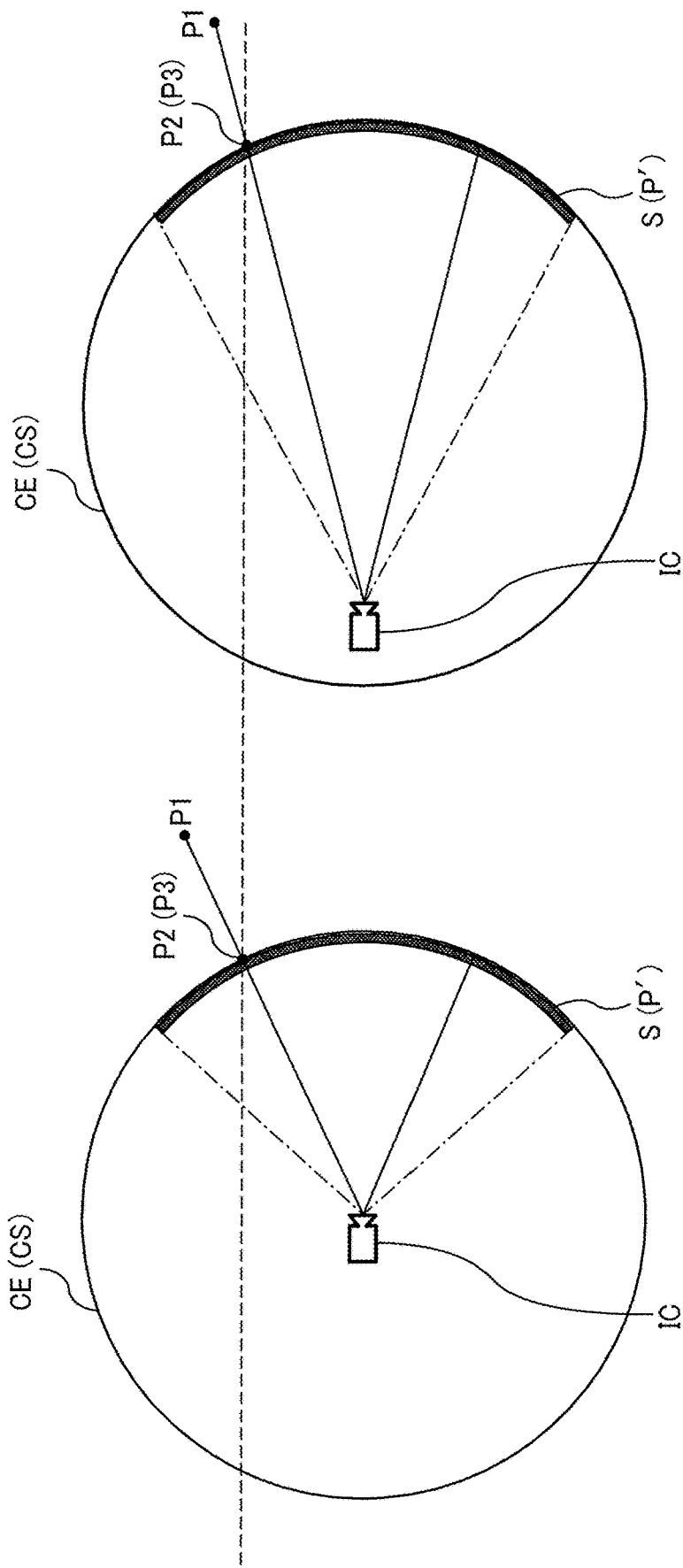

FIG. 31

| | | | |
|---|---|---|---|
| EQUIRECTANGULAR PROJECTION IMAGE INFORMATION | ATTRIBUTE DATA | IMAGE ID | ./IMAGE001.JPG |
| | | POSITIONING CORRECTION (Pitch, Yaw, Roll) | (−2.8, −2.1, 0) |
| PLANER IMAGE INFORMATION | ATTRIBUTE DATA | IMAGE ID | ./IMAGE111.JPG |
| | | 35 mm EQUIVALENT FOCAL LENGTH | 28 |
| SUPERIMPOSED DISPLAY INFORMATION | AREA DIVISION NUMBER INFORMATION | HORIZONTAL (LONGITUDE) DIVISION NUMBER | 30 |
| | | VERTICAL (LATITUDE) DIVISION NUMBER | 20 |
| | SUPERIMPOSED AREA INFORMATION | HORIZONTAL (LATITUDE) START/END POSITION | (0, 24) |
| | | VERTICAL (LONGITUDE) START/END POSITION | (0, 20) |
| | COORDINATE OF GRID IN GRID AREA (LOCATION PARAMETER) | | $(LO'_{00,00}, LA'_{00,00}), (LO'_{01,00}, LA'_{01,00}),$ $..., (LO'_{30,20}, LA'_{30,20})$ |
| | CORRECTION VALUE OF BRIGHTNESS AND COLOR (CORRECTION PARAMETER) | | $(R_{00,00}, G_{00,00}, B_{00,00}), (R_{01,00}, G_{01,00}, B_{01,00}),$ $..., (R_{30,20}, G_{30,20}, B_{30,20})$ |
| METADATA GENERATION INFORMATION | VERSION INFORMATION | | 0.1.1 |

FIG. 34

| | | | |
|---|---|---|---|
| EQUIRECTANGULAR PROJECTION IMAGE INFORMATION | ATTRIBUTE DATA | IMAGE ID | ./IMAGE001.JPG |
| | | POSITIONING CORRECTION (Pitch, Yaw, Roll) | (−2.8, −2.1, 0) |
| PLANER IMAGE INFORMATION | ATTRIBUTE DATA | IMAGE ID | ./IMAGE111.JPG |
| | | 35 mm EQUIVALENT FOCAL LENGTH | 28 |
| SUPERIMPOSED DISPLAY INFORMATION | AREA DIVISION NUMBER INFORMATION | HORIZONTAL (LONGITUDE) DIVISION NUMBER | 30 |
| | | VERTICAL (LATITUDE) DIVISION NUMBER | 20 |
| | SUPERIMPOSED AREA INFORMATION | HORIZONTAL (LATITUDE) START/END POSITION | (0, 30) |
| | | VERTICAL (LONGITUDE) START/END POSITION | (0, 20) |
| | COORDINATE OF GRID IN GRID AREA (LOCATION PARAMETER) | | $(LO'_{00,00}, LA'_{00,00}), (LO'_{01,00}, LA'_{01,00}),$ $\ldots, (LO'_{30,20}, LA'_{30,20})$ |
| | CORRECTION VALUE OF BRIGHTNESS AND COLOR (CORRECTION PARAMETER) | | $(R_{00,00}, G_{00,00}, B_{00,00}), (R_{01,00}, G_{01,00}, B_{01,00}),$ $\ldots, (R_{30,20}, G_{30,20}, B_{30,20})$ |
| | TEXTURE UV COORDINATES (OPTIONAL) | | $(U_{00,00}, V_{00,00}), (U_{01,00}, V_{01,00}),$ $\ldots, (U_{30,20}, V_{30,20})$ |
| METADATA GENERATION INFORMATION | VERSION INFORMATION | | 0.1.1 |

FIG. 42

| FIG. 42A |
|----------|
| FIG. 42B |

FIG. 42A

| | | | | | |
|---|---|---|---|---|---|
| EQUIRECTANGULAR PROJECTION IMAGE INFORMATION | | ATTRIBUTE DATA | IMAGE ID | | ./IMAGE001.JPG |
| | | | POSITIONING CORRECTION (Pitch, Yaw, Roll) | | (−2.8, −2.1, 0) |
| METADATA GENERATION INFORMATION | | VERSION INFORMATION | | | 0.1.1 |
| SUPERIMPOSED IMAGE 1 | PLANER IMAGE INFORMATION | ATTRIBUTE DATA | IMAGE ID | | ./IMAGE111.JPG |
| | | | 35 mm EQUIVALENT FOCAL LENGTH | | 28 |
| | SUPER-IMPOSED DISPLAY INFORMATION | AREA DIVISION NUMBER INFORMATION | HORIZONTAL (LONGITUDE) DIVISION NUMBER | | 30 |
| | | | VERTICAL (LATITUDE) DIVISION NUMBER | | 20 |
| | | COORDINATE OF GRID IN GRID AREA (LOCATION PARAMETER) | | | $(LO1'_{00,00}, LA1'_{00,00}), (LO1'_{01,00}, LA1'_{01,00}),$ $..., (LO1'_{30,20}, LA1'_{30,20})$ |
| | | CORRECTION VALUE OF BRIGHTNESS AND COLOR (CORRECTION PARAMETER) | | | $(R1_{00,00}, G1_{00,00}, B1_{00,00}), (R1_{01,00}, G1_{01,00}, B1_{01,00}),$ $..., (R1_{30,20}, G1_{30,20}, B1_{30,20})$ |
| SUPERIMPOSED IMAGE 2 | PLANER IMAGE INFORMATION | ATTRIBUTE DATA | IMAGE ID | | ./IMAGE112.JPG |
| | | | 35 mm EQUIVALENT FOCAL LENGTH | | 100 |
| | SUPER-IMPOSED DISPLAY INFORMATION | AREA DIVISION NUMBER INFORMATION | HORIZONTAL (LONGITUDE) DIVISION NUMBER | | 30 |
| | | | VERTICAL (LATITUDE) DIVISION NUMBER | | 20 |
| | | COORDINATE OF GRID IN GRID AREA (LOCATION PARAMETER) | | | $(LO2'_{00,00}, LA2'_{00,00}), (LO2'_{01,00}, LA2'_{01,00}),$ $..., (LO2'_{30,20}, LA2'_{30,20})$ |
| | | CORRECTION VALUE OF BRIGHTNESS AND COLOR (CORRECTION PARAMETER) | | | $(R2_{00,00}, G2_{00,00}, B2_{00,00}), (R2_{01,00}, G2_{01,00}, B2_{01,00}),$ $..., (R2_{30,20}, G2_{30,20}, B2_{30,20})$ |

FIG. 42B

| | | | |
|---|---|---|---|
| SUPERIMPOSED IMAGE 3 | PLANER IMAGE INFORMATION | IMAGE ID | ./IMAGE11n.JPG |
| | | 35 mm EQUIVALENT FOCAL LENGTH | 50 |
| | SUPER-IMPOSED DISPLAY INFORMATION | ATTRIBUTE DATA | |
| | | AREA DIVISION NUMBER INFORMATION | HORIZONTAL (LONGITUDE) DIVISION NUMBER | 30 |
| | | | VERTICAL (LATITUDE) DIVISION NUMBER | 20 |
| | | COORDINATE OF GRID IN GRID AREA (LOCATION PARAMETER) | $(LOn'_{00,00}, LAn'_{00,00}), (LOn'_{01,00}, LAn'_{01,00}),$ $...,(LOn'_{30,20}, LAn'_{30,20})$ |
| | | CORRECTION VALUE OF BRIGHTNESS AND COLOR (CORRECTION PARAMETER) | $(Rn_{00,00}, Gn_{00,00}, Bn_{00,00}), (Rn_{01,00}, Gn_{01,00}, Bn_{01,00}),$ $...,(Rn_{30,20}, Gn_{30,20}, Bn_{30,20})$ |
| ... | | | |

FIG. 43A

| | | | |
|---|---|---|---|
| EQUIRECTANGULAR PROJECTION IMAGE INFORMATION | IMAGE ID | | ./IMAGE001.JPG |
| | ATTRIBUTE DATA | POSITIONING CORRECTION (Pitch, Yaw, Roll) | (−2.8, −2.1, 0) |
| METADATA GENERATION INFORMATION | VERSION INFORMATION | | 0.1.1 |
| DISPLAY CONTROL INFORMATION | SUPERIMPOSITION ORDER INFORMATION | | [./IMAGE001.JPG., ./IMAGE111.JPG., ./IMAGE113.JPG., ./IMAGE112.JPG] |
| SUPERIMPOSED IMAGE 1 | PLANER IMAGE INFORMATION | IMAGE ID | ./IMAGE111.JPG |
| | | ATTRIBUTE DATA | 35 mm EQUIVALENT FOCAL LENGTH | 28 |
| | SUPERIMPOSED DISPLAY INFORMATION | AREA DIVISION NUMBER INFORMATION | HORIZONTAL (LONGITUDE) DIVISION NUMBER | 30 |
| | | | VERTICAL (LATITUDE) DIVISION NUMBER | 20 |
| | | COORDINATE OF GRID IN GRID AREA (LOCATION PARAMETER) | | $(LO1'_{00,00}, LA1'_{00,00}), (LO1'_{01,00}, LA1'_{01,00}),$ $..., (LO1'_{30,20}, LA1'_{30,20})$ |
| | | CORRECTION VALUE OF BRIGHTNESS AND COLOR (CORRECTION PARAMETER) | | $(R1_{00,00}, G1_{00,00}, B1_{00,00}), (R1_{01,00}, G1_{01,00}, B1_{01,00}),$ $..., (R1_{30,20}, G1_{30,20}, B1_{30,20})$ |

FIG. 43

| FIG. 43A |
|---|
| FIG. 43B |

FIG. 43B

| | | | | |
|---|---|---|---|---|
| SUPERIMPOSED IMAGE 2 | PLANER IMAGE INFORMATION | IMAGE ID | | ./IMAGE112.JPG |
| | | ATTRIBUTE DATA | 35 mm EQUIVALENT FOCAL LENGTH | 100 |
| | SUPERIMPOSED DISPLAY INFORMATION | AREA DIVISION NUMBER INFORMATION | HORIZONTAL (LONGITUDE) DIVISION NUMBER | 30 |
| | | | VERTICAL (LATITUDE) DIVISION NUMBER | 20 |
| | | COORDINATE OF GRID IN GRID AREA (LOCATION PARAMETER) | | $(LO2'_{00,00}, LA2'_{00,00}), (LO2'_{01,00}, LA2'_{01,00}),$ ..., $(LO2'_{30,20}, LA2'_{30,20})$ |
| | | CORRECTION VALUE OF BRIGHTNESS AND COLOR (CORRECTION PARAMETER) | | $(R2_{00,00}, G2_{00,00}, B2_{00,00}), (R2_{01,00}, G2_{01,00}, B2_{01,00}),$ ..., $(R2_{30,20}, G2_{30,20}, B2_{30,20})$ |
| SUPERIMPOSED IMAGE 3 | PLANER IMAGE INFORMATION | IMAGE ID | | ./IMAGE113.JPG |
| | | ATTRIBUTE DATA | 35 mm EQUIVALENT FOCAL LENGTH | 50 |
| | SUPERIMPOSED DISPLAY INFORMATION | AREA DIVISION NUMBER INFORMATION | HORIZONTAL (LONGITUDE) DIVISION NUMBER | 30 |
| | | | VERTICAL (LATITUDE) DIVISION NUMBER | 20 |
| | | COORDINATE OF GRID IN GRID AREA (LOCATION PARAMETER) | | $(LOn'_{00,00}, LAn'_{00,00}), (LOn'_{01,00}, LAn'_{01,00}),$ ..., $(LOn'_{30,20}, LAn'_{30,20})$ |
| | | CORRECTION VALUE OF BRIGHTNESS AND COLOR (CORRECTION PARAMETER) | | $(Rn_{00,00}, Gn_{00,00}, Bn_{00,00}), (Rn_{01,00}, Gn_{01,00}, Bn_{01,00}),$ ..., $(Rn_{30,20}, Gn_{30,20}, Bn_{30,20})$ |

FIG. 44

| | | | | |
|---|---|---|---|---|
| EQUIRECTANGULAR PROJECTION IMAGE INFORMATION | | IMAGE ID | | ./IMAGE001.JPG |
| | ATTRIBUTE DATA | POSITIONING CORRECTION (Pitch, Yaw, Roll) | | (−2.8, −2.1, 0) |
| METADATA GENERATION INFORMATION | | VERSION INFORMATION | | 0.1.1 |
| DISPLAY CONTROL INFORMATION | | SUPERIMPOSITION ORDER INFORMATION | | [./IMAGE001.JPG,../IMAGE111.JPG,./IMAGE113.JPG,../IMAGE112.JPG] |
| | DISPLAY START INFORMATION | LINE OF SIGHT DIRECTION INFORMATION (LONGITUDE, LATITUDE) | | (ee,aa) |
| | | ANGLE OF VIEW INFORMATION (DEGREE) | | 80 |
| SUPERIMPOSED IMAGE 1 | PLANER IMAGE INFORMATION | IMAGE ID | | ./IMAGE111.JPG |
| | | ATTRIBUTE DATA | 35 mm EQUIVALENT FOCAL LENGTH | 28 |
| | SUPER-IMPOSED DISPLAY INFORMATION | AREA DIVISION NUMBER INFORMATION | HORIZONTAL (LONGITUDE) DIVISION NUMBER | 30 |
| | | | VERTICAL (LATITUDE) DIVISION NUMBER | 20 |
| | | COORDINATE OF GRID IN GRID AREA (LOCATION PARAMETER) | | $(LO1'_{00,00}, LA1'_{00,00}), (LO1'_{01,00}, LA1'_{01,00}),$ ..., $(LO1'_{30,20}, LA1'_{30,20})$ |
| | | CORRECTION VALUE OF BRIGHTNESS AND COLOR (CORRECTION PARAMETER) | | $(R1_{00,00}, G1_{00,00}, B1_{00,00}), (R1_{01,00}, G1_{01,00}, B1_{01,00}),$ ..., $(R1_{30,20}, G1_{30,20}, B1_{30,20})$ |

| | | | |
|---|---|---|---|
| SUPERIMPOSED IMAGE 2 | PLANER IMAGE INFORMATION | IMAGE ID | ./IMAGE112.JPG |
| | | ATTRIBUTE DATA — 35 mm EQUIVALENT FOCAL LENGTH | 100 |
| | SUPERIMPOSED DISPLAY INFORMATION | AREA DIVISION NUMBER INFORMATION — HORIZONTAL (LONGITUDE) DIVISION NUMBER | 30 |
| | | AREA DIVISION NUMBER INFORMATION — VERTICAL (LATITUDE) DIVISION NUMBER | 20 |
| | | COORDINATE OF GRID IN GRID AREA (LOCATION PARAMETER) | $(LO2'_{00,00}, LA2'_{00,00}), (LO2'_{01,00}, LA2'_{01,00}),$ $..., (LO2'_{30,20}, LA2'_{30,20})$ |
| | | CORRECTION VALUE OF BRIGHTNESS AND COLOR (CORRECTION PARAMETER) | $(R2_{00,00}, G2_{00,00}, B2_{00,00}), (R2_{01,00}, G2_{01,00}, B2_{01,00}),$ $..., (R2_{30,20}, G2_{30,20}, B2_{30,20})$ |
| SUPERIMPOSED IMAGE 3 | PLANER IMAGE INFORMATION | IMAGE ID | ./IMAGE113.JPG |
| | | ATTRIBUTE DATA — 35 mm EQUIVALENT FOCAL LENGTH | 50 |
| | SUPERIMPOSED DISPLAY INFORMATION | AREA DIVISION NUMBER INFORMATION — HORIZONTAL (LONGITUDE) DIVISION NUMBER | 30 |
| | | AREA DIVISION NUMBER INFORMATION — VERTICAL (LATITUDE) DIVISION NUMBER | 20 |
| | | COORDINATE OF GRID IN GRID AREA (LOCATION PARAMETER) | $(LOn'_{00,00}, LAn'_{00,00}), (LOn'_{01,00}, LAn'_{01,00}),$ $..., (LOn'_{30,20}, LAn'_{30,20})$ |
| | | CORRECTION VALUE OF BRIGHTNESS AND COLOR (CORRECTION PARAMETER) | $(Rn_{00,00}, Gn_{00,00}, Bn_{00,00}), (Rn_{01,00}, Gn_{01,00}, Bn_{01,00}),$ $..., (Rn_{30,20}, Gn_{30,20}, Bn_{30,20})$ |

IMAGE PROCESSING APPARATUS, IMAGE CAPTURING SYSTEM, IMAGE PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application Nos. 2017-050582, filed on Mar. 15, 2017, 2017-229498, filed on Nov. 29, 2017, and 2018-021376, filed on Feb. 8, 2018, in the Japan Patent Office, the entire disclosure of which is hereby incorporated by reference herein.

BACKGROUND

Technical Field

The present invention relates to an image processing apparatus, an image capturing system, an image processing method, and a recording medium.

Description of the Related Art

Recently, a special digital camera is available that obtains, in a single image capturing operation, two hemispherical images, from which a spherical image is generated. Such a digital camera (hereinafter referred to as a spherical camera) generates one spherical image of a 360-degree surrounding scene from the hemispherical images.

The spherical image may have an area superimposed with a planar image that is captured separately from the spherical image. Since the planar image has a resolution higher than that of the spherical image, the area of the spherical image superimposed with the planar image remains clear, even if the image is enlarged.

It is desirable, for example, to capture a spherical image using a spherical camera and to capture a planar image using, for example, a smartphone at the same time and at the same position to the extent possible.

To capture the images at the same position, the user tends to make the lenses of the spherical camera closer to the lens of the smartphone to the extent possible. However, if the user makes the lenses too closer to each other, a shadow of the spherical camera may appear in an image captured by the smartphone. Such a phenomenon is called vignetting, which may cause a decrease in image quality.

SUMMARY

According to one or more embodiments, an apparatus, system, and method are provided, each of which: obtains a first image in a first projection, and a second image in a second projection; obtains area specification information specifying an area in the second image; and associates location information to be used for superimposing the second image on the first image with the area specification information, or generates location information based on the area specification information.

Example embodiments of the present invention include an apparatus, system, and method, each of which: obtains a first image in a first projection, and a second image in a second projection; transforms projection of at least a part of the first image corresponding to the second image, from the first projection to the second projection, to generate a third image in the second projection; extracts a plurality of feature points, respectively, from the second image and the third image; determines a corresponding area in the third image that corresponds to the second image, based on the plurality of feature points respectively extracted from the second image and the third image; transforms projection of a plurality of points in the corresponding area of the third image, from the second projection to the first projection, to obtain location information indicating locations of the plurality of points in the first projection in the first image, being respectively associated with the plurality of points in the second projection in the second image; obtains, from a memory, area specification information specifying an area in the second image; and associates the location information indicating the locations of the plurality of points in the first projection in the first image, in association with the area specification information, the area specification information to be used for determining, from among the plurality of points in the second image, one or more points in the second image to be superimposed on the first image according to the location information.

Example embodiments of the present invention include an apparatus, system, and method, each of which: obtains a first image in a first projection, and a second image in a second projection; transforms projection of at least a part of the first image corresponding to the second image, from the first projection to the second projection, to generate a third image in the second projection; extracts a plurality of feature points, respectively, from the second image and the third image; determines a corresponding area in the third image that corresponds to the second image, based on the plurality of feature points respectively extracted from the second image and the third image; obtains, from a memory, area specification information specifying an area in the second image that is not to be superimposed on the first image; transforms projection of a plurality of points in the corresponding area of the third image other than a plurality of points corresponding to the area specified by the area specification information, from the second projection to the first projection, to obtain location information indicating locations of the plurality of points in the first projection in the first image; and stores, in the memory, the location information indicating the locations of the plurality of points in the first projection in the first image, in association with the plurality of points in the second projection in the second image.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 1A is a left-side view of a special image capturing device according to an embodiment;

FIG. 1B is a rear view of the special image capturing device according to the embodiment;

FIG. 1C is a top view of the special image capturing device according to the embodiment;

FIG. 1D is a bottom view of the special image capturing device according to the embodiment;

FIG. 4A is a diagram schematically illustrating a state where a sphere is covered by an equirectangular projection image, according to an embodiment;

FIG. 4B is a diagram illustrating a spherical image, according to an embodiment;

FIG. 11 is a schematic block diagram illustrating a functional configuration of the image capturing system, according to an embodiment;

FIG. 14 is an illustration of a data structure of superimposed display metadata, according to an embodiment;

FIGS. 26A and 26B are 2D diagrams schematically illustrating an example case where a planar image is superimposed on a spherical image by using a location parameter according to an embodiment of the present invention;

FIG. 31 is a diagram illustrating an example of superimposed display metadata according to a first example of excluding a vignetting area;

FIG. 34 is a diagram illustrating an example of superimposed display metadata according to a second example of excluding a vignetting area;

FIGS. 42A and 42B are a diagram illustrating an example structure of superimposed display metadata in a case where N planar images are present;

FIGS. 43A and 43B are a diagram illustrating an example structure of superimposed display metadata that includes superimposition order information;

FIGS. 44A and 44B are a diagram illustrating an example structure of superimposed display metadata that includes line-of-sight direction information and angle-of-view information as display start information;

Figure 2:
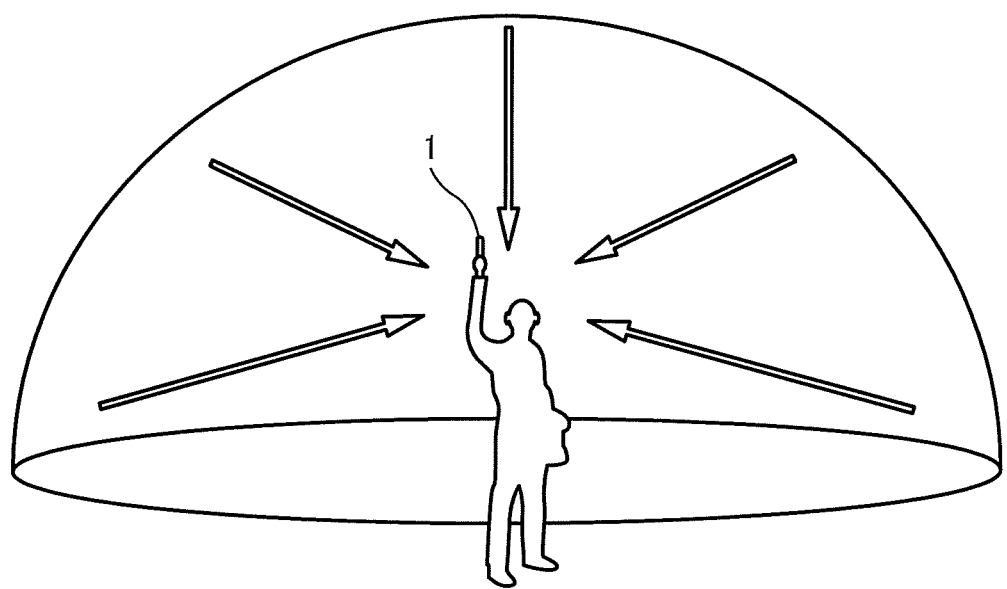
FIG. 2 is a diagram schematically illustrating how the special image capturing device is used, according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

In this disclosure, a first image is an image superimposed with a second image, and a second image is an image to be superimposed on the first image. For example, the first image is an image covering an area larger than that of the second image. In another example, the first image and the second image are images expressed in different projections. In another example, the second image is an image with image quality higher than that of the first image, for example, in terms of image resolution. Examples of the first image include a spherical image, an equirectangular projection image, and a low-definition image. Examples of the second image include a planar image, a perspective projection image, and a high-definition image.

Further, in this disclosure, the spherical image does not have to be the full-view spherical image. For example, the spherical image may be the wide-angle view image having an angle of about 180 to 360 degrees in the horizontal direction. As described below, it is desirable that the spherical image is image data having at least a part that is not entirely displayed in the predetermined area T.

Hereinafter, embodiments of the present invention will be described.

First Embodiment

Referring to FIG. 1A to FIG. 7, a method for generating a spherical image is described according to the embodiment.

First, the external view of a special image capturing device 1 is described with reference to FIGS. 1A to 1D. The special image capturing device 1 is a digital camera for capturing images, from which a spherical (360-degree) image is generated. FIG. 1A is a left-side view of the special image capturing device 1. FIG. 1B is a rear view of the special image capturing device 1. FIG. 1C is a top view of the special image capturing device 1. FIG. 1D is a bottom view of the special image capturing device 1.

As illustrated in FIGS. 1A to 1D, the special image capturing device 1 is provided with a fish-eye lens 102a on a front side of an upper portion, and a fish-eye lens 102b on a rear side (back side) of the upper portion. Inside the special image capturing device 1, imaging elements (imaging sensors) 103a and 103b described below are provided. The imaging elements 103a and 103b capture images of an object and a scene (surroundings) via the fish-eye lenses 102a and 102b respectively to obtain hemispherical images (of an angle of view of 180° or more)

On the surface opposite the front side of the special image capturing device 1, a shutter button 115a is provided. On a side surface of the special image capturing device 1, a power button 115b, a Wireless Fidelity (Wi-Fi, registered trademark) button 115c, and an image capturing mode button 115d are provided. Each of the shutter button 115a, the power button 115b, and the Wi-Fi button 115c switches between ON and OFF each time the button is pressed. The image capturing mode button 115d switches between a still-image capturing mode and a moving-image capturing mode each time the button is pressed. The shutter button 115a, the power button 115b, the Wi-Fi button 115c, and the image capturing mode button 115d constitute part of an operation unit 115. The operation unit 115 may include any button other than the buttons described above.

At the center of a bottom face 150 of the special image capturing device 1, a tripod mount hole 151 for attaching the special image capturing device 1 to a camera tripod is provided. In the left portion of the bottom face 150, a Micro Universal Serial Bus (USB) terminal 152 is provided. In the right portion of the bottom face 150, a High-Definition Multimedia Interface (HDMI, registered trademark) terminal 153 is provided.

Next, a state where the special image capturing device 1 is used is described with reference to FIG. 2. FIG. 2 is a diagram schematically illustrating how the special image capturing device 1 is used. As illustrated in FIG. 2, for example, a user holds the special image capturing device 1 in their hand and uses the special image capturing device 1 to capture an image of an object around the user. In this case, the imaging elements 103a and 103b illustrated in FIG. 1A each capture an image of an object around the user to obtain two hemispherical images.

Figure 3A:
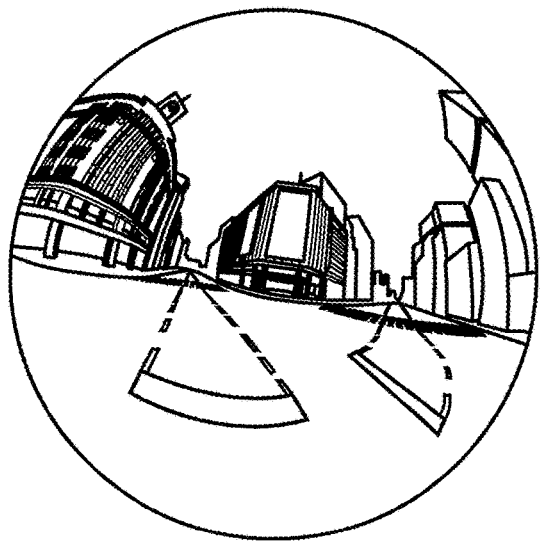
FIG. 3A is a diagram illustrating a hemispherical image (front side) captured by the special image capturing device, according to an embodiment.
Figure 3B:
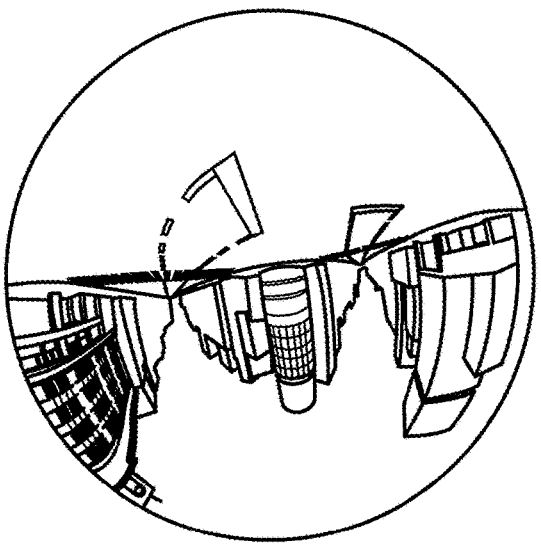
FIG. 3B is a diagram illustrating a hemispherical image (back side) captured by the special image capturing device, according to the embodiment.
Figure 3C:
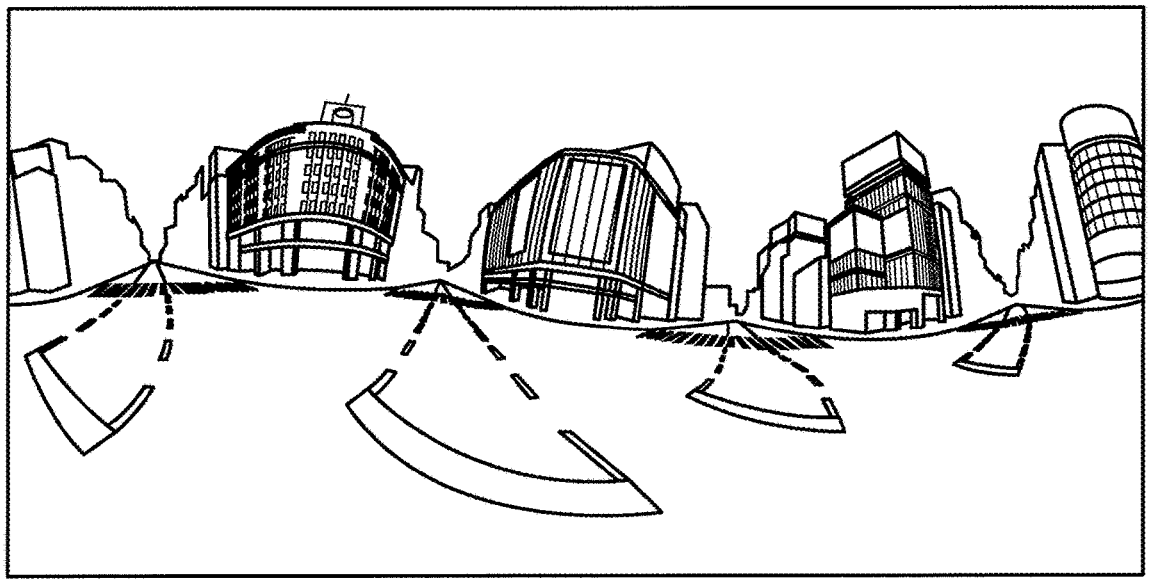
FIG. 3C is a diagram illustrating an image in equirectangular projection, according to an embodiment.

Next, an overall process up to generation of an equirectangular projection image EC and a spherical image CE from images captured by the special image capturing device 1 is described with reference to FIG. 3A to FIG. 4B. FIG. 3A is a diagram illustrating a hemispherical image (front side) captured by the special image capturing device 1. FIG. 3B is a diagram illustrating a hemispherical image (back side) captured by the special image capturing device 1. FIG. 3C is a diagram illustrating an image in equirectangular projection (hereinafter referred to as "equirectangular projection image"). FIG. 4A is a diagram schematically illustrating a state where a sphere is covered by the equirectangular projection image EC. FIG. 4B is a diagram illustrating the spherical image CE.

As illustrated in FIG. 3A, an image captured by the imaging element 103a is a hemispherical image (front side) that curves due to the fish-eye lens 102a described below. As illustrated in FIG. 3B, an image captured by the imaging element 103b is a hemispherical image (back side) that curves due to the fish-eye lens 102b described below. The hemispherical image (front side) and the hemispherical image (back side), which is an image of the back side opposite the front side by 180 degrees, are combined by the special image capturing device 1, and the equirectangular projection image EC is generated, as illustrated in FIG. 3C.

Then, the equirectangular projection image EC is placed so as to cover the spherical surface, as illustrated in FIG. 4A, by using Open Graphics Library for Embedded Systems (OpenGL ES), and the spherical image CE as illustrated in FIG. 4B is generated.
Accordingly, the spherical image CE is represented as the equirectangular projection image EC that faces the center of the sphere. Note that OpenGL ES is a graphics library that is used to visualize 2D and 3D data. The spherical image CE may be a still image or a moving image.

Since the spherical image CE is an image attached to the sphere surface, as illustrated in FIG. 4B, a part of the image may look distorted when viewed from the user, providing a feeling of strangeness. To resolve this strange feeling, an image of a predetermined area, which is a part of the spherical image CE, is displayed as a flat image having fewer curves. The predetermined area is, for example, a part of the spherical image CE that is viewable by the user. In this disclosure, the image of the predetermined area is referred to as a "predetermined-area image" Q. Hereinafter, a description is given of displaying the predetermined-area image Q with reference to FIG. 5 and FIGS. 6A and 6B.

Figure 5:
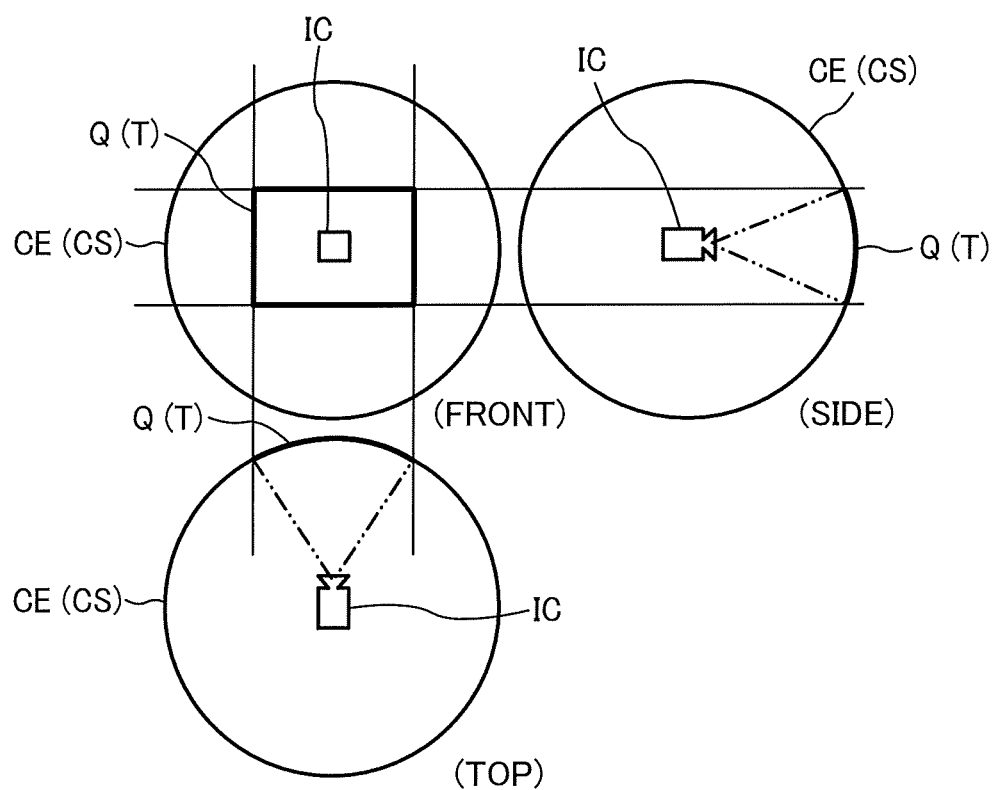
FIG. 5 is a diagram illustrating the positions of a virtual camera and a predetermined area in an example case where a spherical image is represented as a three-dimensional (3D) sphere.
Figure 6A:
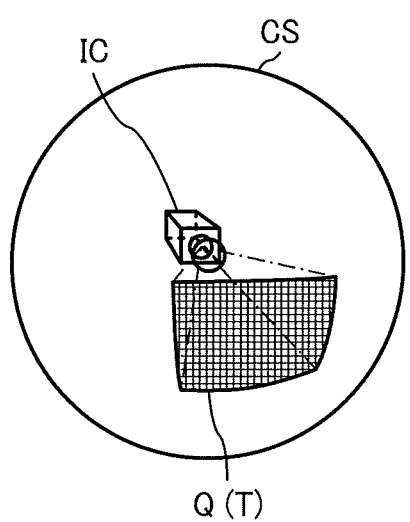
FIG. 6A is a perspective view corresponding to FIG. 5, according to an embodiment.
Figure 6B:
FIG. 6B is a diagram illustrating a state where an image of a predetermined area is displayed on a display of a communication terminal, according to an embodiment.

FIG. 5 is a view illustrating positions of a virtual camera IC and a predetermined area T in a case in which the spherical image is represented as a surface area of a three-dimensional solid sphere. The virtual camera IC corresponds to a position of a point of view (viewpoint) of a user who is viewing the spherical image CE represented as a surface area of the three-dimensional solid sphere CS. FIG. 6A is a perspective view of the spherical image CE illustrated in FIG. 5. FIG. 6B is a view illustrating the predetermined-area image Q when displayed on a display. In FIG. 6A, the spherical image CE illustrated in FIG. 4B is represented as a surface area of the three-dimensional solid sphere CS. Assuming that the spherical image CE is a surface area of the solid sphere CS, the virtual camera IC is inside of the spherical image CE as illustrated in FIG. 5. The predetermined area T in the spherical image CE is an image-capturing area of the virtual camera IC. Specifically, the predetermined area T is specified by predetermined-area information indicating an image capturing direction and an angle of view of the virtual camera IC in a three-dimensional virtual space containing the spherical image CE. Zooming for the predetermined area T may be represented by movement of the virtual camera IC close to the spherical image CE or away from the spherical image CE. The predetermined-area image Q is an image of the predetermined area T in the spherical image CE. Therefore, the predetermined area T is determined by an angle of view α and the distance f from the virtual camera IC to the spherical image CE (see FIG. 7).

The predetermined-area image Q illustrated in FIG. 6A is displayed on a display as an image of the image-capturing area of the virtual camera IC, as illustrated in FIG. 6B. The image illustrated in FIG. 6B is a predetermined-area image represented by initially set (default) predetermined-area information. The image capturing direction (ea, aa) and the angle of view (α) of the virtual camera IC are used to give a description below. The predetermined area T may be determined on the basis of the image capturing area (X, Y, Z) of the virtual camera IC, which corresponds to the predetermined area T, instead of the angle of view α and the distance f.

Figure 7:
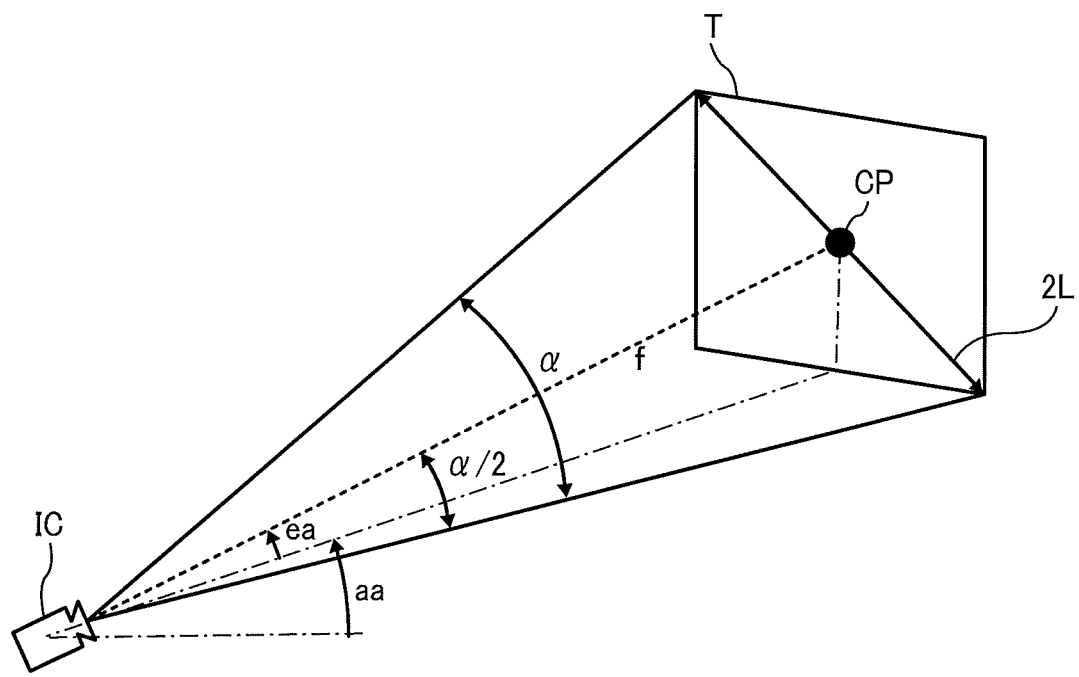
FIG. 7 is a diagram illustrating a relation between predetermined-area information and an image of a predetermined area, according to an embodiment.

Next, a relation between predetermined-area information and the predetermined area T is described with reference to FIG. 7. FIG. 7 is a diagram illustrating a relation between predetermined-area information and an image of the predetermined area T. As illustrated in FIG. 7, "ea" represents the elevation angle, "aa" represents the azimuth angle, and "α" represents the angle of view. That is, the positioning of the virtual camera IC is changed such that the point of gaze of the virtual camera IC determined by the image capturing direction (ea, aa) corresponds to a central point CP of the predetermined area T, which is the image capturing area of the virtual camera IC. As illustrated in FIG. 7, in a case where the angle of view α of the virtual camera IC represents the diagonal angle of view α of the predetermined area T, the central point CP corresponds to an (x, y) parameter in the predetermined-area information. The distance from the virtual camera IC to the central point CP is represented by f, and the distance between one of the vertices of the predetermined area T and the central point CP is represented by L (the diagonal is represented by 2L). Then, in FIG. 7, a trigonometric function expressed by equation (1) below is generally applicable.

$$L/f = \tan(\alpha/2) \quad (1)$$

<Overview of Image Capturing System>

Figure 8:
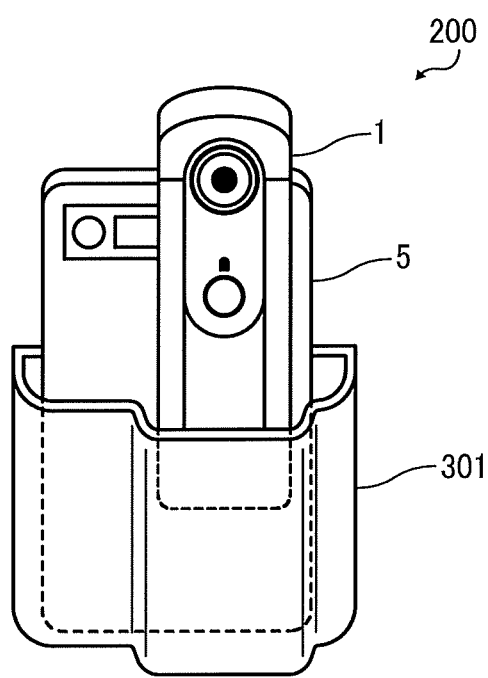
FIG. 8 is a schematic view of an image capturing system according to an embodiment.

Now, an overall configuration of an image capturing system 200 according to this embodiment is described. FIG. 8 is a schematic view illustrating a configuration of the image capturing system 200 according to this embodiment.

Note that, desirably, the wide-angle image is an image of a 360-degree surrounding scene; however, the wide-angle image may be a 360-degree image extending in only the horizontal direction or may be a 180-degree image extending in the vertical or horizontal direction. Alternatively, the wide-angle image may be an image of an angle of less than 180°.

Further, in this example, a projection method corresponds to a method for forming an image in consideration of a relation between the position of a light beam passing through a lens and the position where the light beam reaches after passing through the lens.

As illustrated in FIG. 8, the image capturing system 200 according to this embodiment includes the special image capturing device 1 and a smartphone 5. The position of the special image capturing device 1 relative to the smartphone 5 is determined by a fitting unit 301.

Among these devices, the special image capturing device 1 is a special digital camera that captures images of an object, a scene, and so on to obtain two hemispherical images, from which a spherical (panoramic) image is generated, as described above.

The fitting unit 301 may have various forms, or be formed of various materials, such that the fitting unit 301 may determine the relative positions of the special image capturing device 1 and the smartphone 5 in various manners. The fitting unit 301 illustrated in FIG. 8 is a holder-type unit but is not limited to this type.

The smartphone 5 is an information processing device that uses a short-range wireless communication technology, such as Wi-Fi, Bluetooth (registered trademark), or Near Field Communication (NFC), to wirelessly communicate with the special image capturing device 1. The smartphone 5 displays an image obtained from the special image capturing device 1 on a display 517 as described below.

The smartphone 5 may communicate with the special image capturing device 1 via a wire cable without using a short-range wireless communication technology. The smartphone 5 is an example of a communication terminal, and the communication terminal may be a tablet personal computer (PC), a laptop PC, or a desktop PC. The smartphone 5 may also be an example of an image processing terminal.

A user may hold the smartphone 5 and the special image capturing device 1 up high and capture images, as illustrated in FIG. 2, or may capture images at a relatively low position so that the user appears in the images. Alternatively, the user may attach the smartphone 5 and the special image capturing device 1 to, for example, a tripod and capture images.

The smartphone 5 includes a camera each on the display side and on the opposite side. The user uses the camera on the display side to mainly capture a self-portrait image while looking at the display displaying a screen of a video call and so on. The camera on the opposite side is used as, for example, a typical digital camera. The camera on the display side is called, for example, a front camera or a selfie camera, and the camera on the opposite side is called, for example, a back camera or a rear camera.

The smartphone 5 according to this embodiment allows the front camera and the rear camera to simultaneously capture images. Accordingly, images of scenes in different directions can be easily captured.

The front camera and the rear camera of the smartphone 5 and the special image capturing device 1 may be used to simultaneously capture a spherical image and two planar images in different directions with a single image capturing instruction. As described below, the smartphone 5 combines the two planar images with the spherical image, and therefore, the user is able to easily take advantage of the spherical image and the planar images captured by the smartphone 5.

Now, a hardware configuration of the special image capturing device 1 and that of the smartphone 5 according to this embodiment are described in detail with reference to FIG. 9 and FIG. 10.

<Hardware Configuration of Special Image Capturing Device>

First, a hardware configuration of the special image capturing device 1 is described with reference to FIG. 9. FIG. 9 is a diagram illustrating a hardware configuration of the special image capturing device 1. It is assumed below that the special image capturing device 1 is a special spherical (omnidirectional) image capturing device including two imaging elements; however, the number of imaging elements may be any number equal to or larger than two. Further, the special image capturing device 1 need not be a device dedicated to omnidirectional image capturing. An omnidirectional image capturing unit may be attached to, for example, a typical digital camera or smartphone to thereby implement substantially the same functions as those of the special image capturing device 1.

Figure 9:
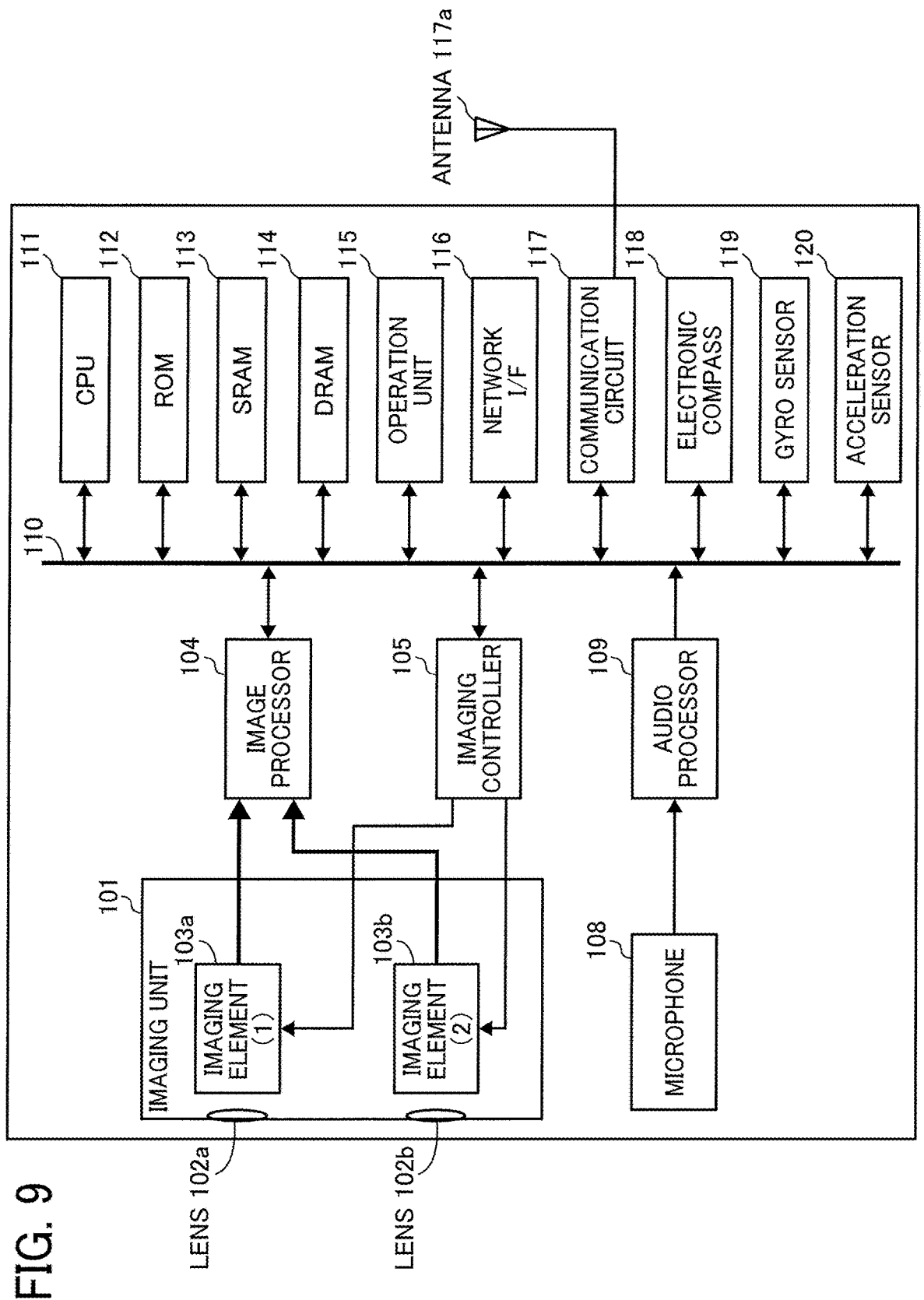
FIG. 9 is a schematic diagram illustrating a hardware configuration of a special image capturing device, according to an embodiment.

As illustrated in FIG. 9, the special image capturing device 1 includes an imaging unit 101, an image processor 104, an imaging controller 105, a microphone 108, an audio processor 109, a central processing unit (CPU) 111, a read-only memory (ROM) 112, a static random access memory (SRAM) 113, a dynamic random access memory (DRAM) 114, the operation unit 115, a network interface (I/F) 116, a communication circuit 117, an antenna 117a, an electronic compass 118, a gyro sensor 119, and an acceleration sensor 120.

The imaging unit 101 includes the wide-angle lenses (fish-eye lenses) 102a and 102b each having an angle of view of 180° or more so as to form a hemispherical image and the two imaging elements 103a and 103b corresponding to the wide-angle lenses 102a and 102b, respectively. The imaging elements 103a and 103b each include an image sensor, such as a complementary metal oxide semiconductor (CMOS) sensor or a charge coupled device (CCD) sensor, that converts an optical image formed by the fish-eye lens 102a or 102b to an electric signal and outputs image data, a timing generation circuit that generates, for example, a horizontal or vertical synchronization signal and a pixel clock for the image sensor, and a group of registers in which, for example, various commands and parameters used in an operation of the imaging element are set.

The imaging elements 103a and 103b of the imaging unit 101 are each connected to the image processor 104 via a parallel I/F bus. Further, the imaging elements 103a and 103b of the imaging unit 101 are each connected to the imaging controller 105 via a serial I/F bus (for example, an I2C bus). The image processor 104, the imaging controller 105, and the audio processor 109 are connected to the CPU 111 via a bus 110. The ROM 112, the SRAM 113, the DRAM 114, the operation unit 115, the network I/F 116, the communication circuit 117, and the electronic compass 118 are connected to the bus 110.

The image processor 104 obtains image data output from the respective imaging elements 103a and 103b via the parallel I/F buses, performs processing on the image data, and combines the image data to generate data of an equirectangular projection image as illustrated in FIG. 3C.

In general, the imaging controller 105 functions as a master device, and the imaging elements 103a and 103b function as slave devices. Then, the imaging controller 105 uses the I2C buses to set commands in the group of registers of each of the imaging elements 103a and 103b. The commands to be set are received from the CPU 111. Further, the imaging controller 105 also uses the I2C buses to acquire such as status data of the group of registers of each of the imaging elements 103a and 103b and transmits the status data to the CPU 111.

The imaging controller 105 instructs the imaging elements 103a and 103b to output image data at the time at which the shutter button of the operation unit 115 is pressed. The special image capturing device 1 may have a function of displaying a preview image or a function of displaying a moving image on a display (for example, the display 517 of the smartphone 5). In the case of displaying the moving image, the image data are output from the imaging elements 103a and 103b successively at a predetermined frame rate (frames per minute).

The imaging controller 105 also functions as a synchronization controller that cooperates with the CPU 111 to synchronize the timings at which respective image data are output from the imaging elements 103a and 103b, as described below. Although the special image capturing device 1 does not include a display in this embodiment, the special image capturing device 1 may include a display.

The microphone 108 converts sounds to audio data (signal). The audio processor 109 acquires the audio data output from the microphone 108 via an I/F bus and performs processing on the audio data.

The CPU 111 controls the overall operation of the special image capturing device 1 and performs processing as appropriate. The ROM 112 stores various programs for the CPU 111. The SRAM 113 and the DRAM 114 are work memories and store, for example, programs to be executed by the CPU 111 and data that is being processed. Specifically, the DRAM 114 stores image data that is being processed by the image processor 104 and data of an equirectangular projection image that has been processed.

The operation unit 115 generally refers to various operation buttons including the shutter button 115a. A user operates the operation unit 115 to input, for example, various image capturing modes and image capturing conditions.

The network I/F 116 generally refers to interface circuits (including a USB I/F) providing interfaces with, for example, an external medium, such as an SD card, and a PC. The network I/F 116 may be a wireless or wired network interface. Data of an equirectangular projection image stored in the DRAM 114 is recorded to an external medium via the network I/F 116 or transmitted to an external terminal (device), such as the smartphone 5, via the network I/F 116 as appropriate.

The communication circuit 117 is a circuit for communicating with an external terminal (device), such as the smartphone 5, via the antenna 117a included in the special image capturing device 1 using a short-range wireless communication technology, such as Wi-Fi, NFC, or Bluetooth. Data of an equirectangular projection image may be transmitted to an external terminal (device), such as the smartphone 5, also via the communication circuit 117.

The electronic compass 118 calculates an orientation of the special image capturing device 1 from the magnetism of the earth and outputs azimuth information. The orientation information is an example of related information (metadata) compliant with Exchangeable image file format (Exif) and is used in image processing, such as correction of a captured image. The related information also includes other data, such as the date and time when the image is captured and the data size of the image data.

The gyro sensor 119 detects changes in angles (roll, pitch, and yaw angles) associated with a tilt of the special image capturing device 1. The changes in the angles are examples of the related data (metadata) compliant with Exif and are used in image processing, such as correction of a captured image.

The acceleration sensor 120 detects accelerations in the directions of three axes. Based on the detected accelerations, the positioning of the special image capturing device 1 (the angle relative to the gravity direction) is detected. Both the gyro sensor 119 and the acceleration sensor 120 are provided to thereby increase the accuracy of image correction.

<Hardware Configuration of Smartphone>

Next, a hardware configuration of the smartphone 5 is described with reference to FIG. 10. FIG. 10 is a diagram illustrating a hardware configuration of the smartphone 5. As illustrated in FIG. 10, the smartphone 5 includes a CPU 501, a ROM 502, a RAM 503, an electrically erasable programmable read-only memory (EEPROM) 504, an imaging element I/F 505, an acceleration and orientation sensor 506, a medium I/F 508, and a global positioning system (GPS) receiver 509.

The CPU 501 controls the overall operation of the smartphone 5. The ROM 502 stores programs including an initial program loader (IPL) used to drive the CPU 501. The RAM 503 is used as a work area of the CPU 501. The EEPROM 504 reads/writes various types of data including a smartphone control program under control of the CPU 501. The imaging element I/F 505 is connected to two CMOS sensors 505a and obtains image data of a captured image of an object (mainly, a self-portrait image) under control of the CPU 501. The two CMOS sensors 505a correspond to the front camera and the rear camera. The imaging element I/F 505 is a circuit that controls the driving of the CMOS sensors 505a.

The acceleration and orientation sensor 506 includes various sensors, namely, an electronic magnetic compass or a gyrocompass that detects the magnetism of the earth and an acceleration sensor. The medium I/F 508 controls read/write (storing) of data from/to (in) a recoding medium 507, such as a flash memory. The GPS receiver 509 receives a GPS signal from a GPS satellite.

The smartphone 5 further includes a far-distance communication circuit 511, an antenna 511a, a CMOS sensor 512, an imaging element I/F 513, a microphone 514, a speaker 515, an audio input/output I/F 516, the display 517, an external device connection I/F 518, a near-distance communication circuit 519, an antenna 519a for the near-distance communication circuit 519, and a touch panel 521.

The far-distance communication circuit 511 is a circuit for communicating with other device via a communication network 100 described below. The CMOS sensor 512 is a built-in image capturing unit that captures an image of an object under control of the CPU 501 to obtain image data. The imaging element I/F 513 is a circuit that controls the driving of the CMOS sensor 512. The microphone 514 is a built-in audio collection unit that receives sounds. The audio input/output I/F 516 is a circuit that processes input/output of audio signals with the microphone 514 and with the speaker 515 under control of the CPU 501. The display 517 is a type of display unit, such as a liquid crystal display or an organic electroluminescence (EL) display, that displays, for example, an image of an object and various icons. The external device connection I/F 518 is an interface for connecting to various external devices. The near-distance communication circuit 519 is a communication circuit compliant with Wi-Fi, NFC, or Bluetooth. The touch panel 521 is a type of input unit for operating the smartphone 5 by a user touching the display 517.

The smartphone 5 further includes a bus line 510. The bus line 510 is constituted by, for example, an address bus and a data bus used to electrically connect the above-described elements including the CPU 501.

The programs described above are stored in a recording medium, such as a hard disk (HD) or a CD-ROM. The HD or the CD-ROM may be provided within the country or outside the country as a program product.

The programs described above are stored in a recording medium, such as a hard disk drive (HDD) or a CD-ROM. The HDD or the CD-ROM may be distributed within the country or outside the country as a program product.

Now, a functional configuration according to this embodiment is described with reference to FIG. 11. FIG. 11 is a functional block diagram of the special image capturing device 1 and the smartphone 5, which constitute part of the image capturing system 200 according to this embodiment.

<Functional Configuration of Special Image Capturing Device>

First, a functional configuration of the special image capturing device 1 is described in detail. As illustrated in FIG. 11, the special image capturing device 1 includes an acceptance unit 12, an image capturing unit 13, an audio collection unit 14, an image and audio processing unit 15, a determiner 17, a near-distance communication unit 18, and a storing and reading unit 19. These units are functions or units that are implemented by one or more of the constituent elements illustrated in FIG. 9 operating in accordance with instructions from the CPU 111, the CPU 111 operating in accordance with a special-image-capturing-device program loaded from the SRAM 113 to the DRAM 114.

The special image capturing device 1 further includes a memory 1000 implemented by the ROM 112, the SRAM 113, and the DRAM 114 illustrated in FIG. 9.

Now, a functional configuration of each unit of the special image capturing device 1 is further described in detail with reference to FIG. 9 and FIG. 11.

The acceptance unit 12 of the special image capturing device 1 is implemented mainly as the operation unit 115 and processing by the CPU 111 illustrated in FIG. 9 and accepts an operation input from a user.

The image capturing unit 13 is implemented mainly as the imaging unit 101, the image processor 104, the imaging controller 105, and processing by the CPU 111 illustrated in FIG. 9 and captures an image of an object, a scene, and so on to obtain captured image data. The captured image data includes two pieces of hemispherical-image data, as illustrated in FIGS. 3A and 3B, from which spherical-image data is generated.

The audio collection unit 14 is implemented by the microphone 108, the audio processor 109, and processing by the CPU 111 illustrated in FIG. 9 and collects sounds around the special image capturing device 1.

The image and audio processing unit 15 is implemented mainly in accordance with instructions from the CPU 111 and performs various processing on captured image data obtained by the image capturing unit 13 or on audio data obtained by the audio collection unit 14. For example, the image and audio processing unit 15 generates equirectangular projection image data (see FIG. 3C) based on two pieces of hemispherical-image data (see FIGS. 3A and 3B) respectively obtained by the two imaging elements 103a and 103b.

The determiner 17 is implemented by instructions of the CPU 111 and performs various types of determination.

The near-distance communication unit 18 is implemented mainly by the communication circuit 117, the antenna 117a, and instructions of the CPU 111 and may communicate with, for example, a near-distance communication unit 58 of the smartphone 5 by using a short-range wireless communication technology, such as Wi-Fi.

The storing and reading unit 19 is implemented mainly by instructions of the CPU 111 illustrated in FIG. 9. The storing and reading unit 19 stores various types of data (or information) in the memory 1000 and reads various types of data (or information) from the memory 1000.

<Functional Configuration of Smartphone>

Next, a functional configuration of the smartphone 5 is described in detail. As illustrated in FIG. 11, the smartphone 5 includes a far-distance communication unit 51, an acceptance unit 52, an image capturing unit 53, an audio collection unit 54, an image and audio processing unit 55, a display control 56, a determiner 57, the near-distance communication unit 58, and a storing and reading unit 59. These units are functions or units that are implemented by one or more of the constituent elements illustrated in FIG. 10 operating in accordance with instructions from the CPU 501, the CPU 501 operating in accordance with a program for the smartphone 5 loaded from the EEPROM 504 to the RAM 503.

Figure 10:
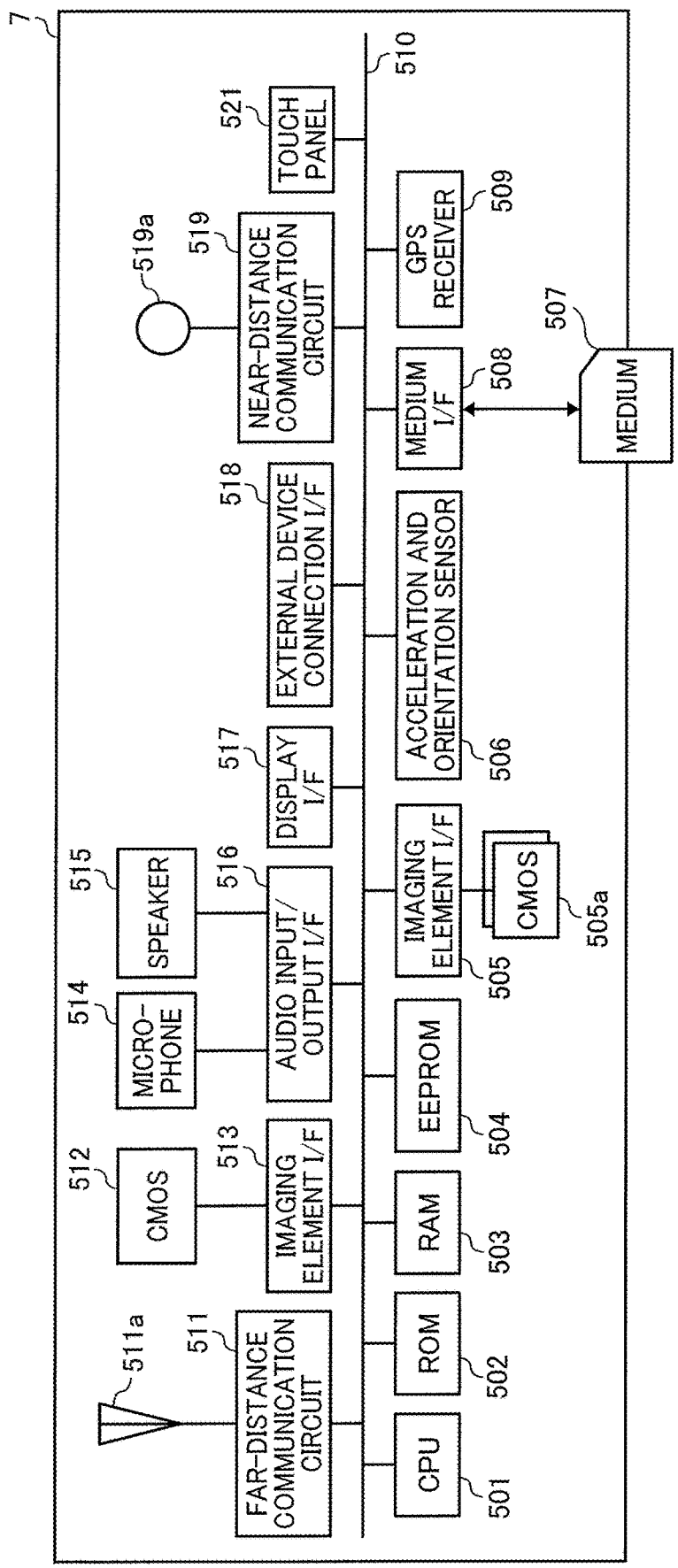
FIG. 10 is a schematic diagram illustrating a hardware configuration of a smartphone, according to an embodiment.
Figures 12A, 12B:
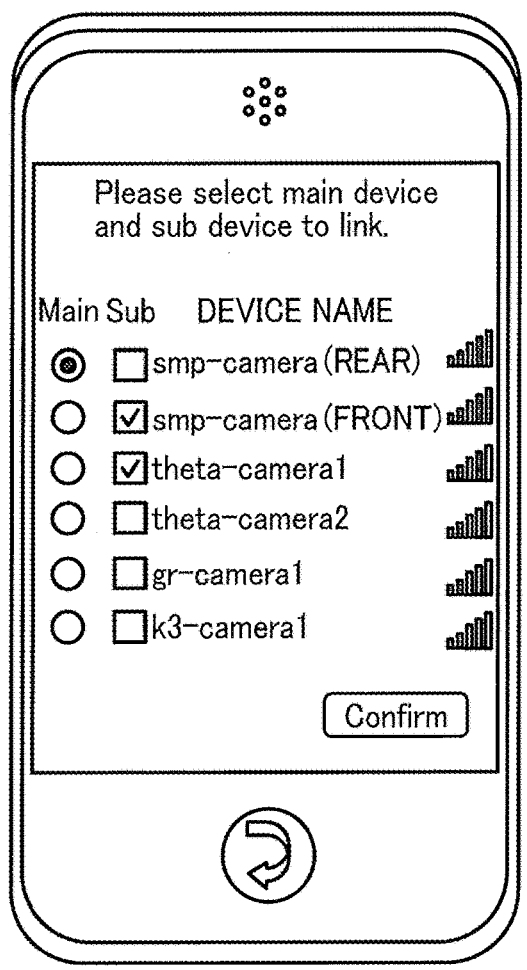
FIG. 12A is a diagram illustrating a linked image capturing device management table, according to an embodiment.
FIG. 12B is a diagram illustrating a linked image capturing device configuration screen, according to an embodiment.

The smartphone 5 further includes a memory 5000 implemented by the ROM 502, the RAM 503, and the EEPROM 504 illustrated in FIG. 10. The memory 5000 stores a linked image capturing device management database (DB) 5001. The linked image capturing device management DB 5001 includes a linked image capturing device management table illustrated in FIG. 12A. FIG. 12A is a diagram illustrating the linked image capturing device management table. The memory 5000 further stores superimposed area information 5002, which will be described below.

Now, the linked image capturing device management table is described with reference to FIG. 12A. As illustrated in FIG. 12A, the linked image capturing device management table includes, for each image capturing device, linking information indicating a relation between the linked image capturing devices, the IP address of the image capturing device, and the device name of the image capturing device in association with one another. Among these items, the linking information indicates whether the image capturing device is a "main" device or a "sub" device. An image capturing device that is a "main" device starts capturing an image in response to pressing of the shutter button thereof, and an image capturing device that is a "sub" device starts capturing an image in response to pressing of the shutter button provided in the "main" image capturing device. The IP address is used in a case of Wi-Fi communication. The IP address is replaced by a manufacture identification (ID) and a product ID in a case of communication using a USB wire cable and replaced by a Bluetooth device (BD) address in a case of wireless communication using Bluetooth.

The far-distance communication unit 51 of the smartphone 5 is implemented mainly by the far-distance communication circuit 511 and instructions of the CPU 501 illustrated in FIG. 10 and transmits/receives various types of data (or information) to/from other devices, namely, the special image capturing device 1, other smartphones, and servers, via a communication network, such as the Internet.

The acceptance unit 52 is implemented mainly by the touch panel 521 and instructions of the CPU 501 and accepts various selections or input from a user. The touch panel 521 may be integrated to the display 517. Further, another input unit, such as a button, other than the touch panel may be used.

The image capturing unit 53 is implemented mainly by the CMOS sensors 505a, the CMOS sensor 512, and instructions of the CPU 501 illustrated in FIG. 10 and captures an image of an object, a scene, and so on to obtain captured image data. The captured image data is planar image data obtained by using a perspective projection method.

The audio collection unit 54 is implemented by the microphone 514 and instsructions of the CPU 501 illustrated in FIG. 10 and collects sounds around the smartphone 5.

The image and audio processing unit 55 is implemented mainly in accordance with instructions from the CPU 501 and performs various processes for captured image data obtained by the image capturing unit 53 or for audio data obtained by the audio collection unit 54.

The display control 56 is implemented by instructions of the CPU 501 illustrated in FIG. 10 and instructs the display 517 to display a planar image P corresponding to captured image data that is being obtained or has been obtained by the image capturing unit 53. Further, the display control 56 uses superimposed display metadata generated by the image and audio processing unit 55 to adjust each grid area LA0 of the planar image P described below so as to be located at a position indicated by a location parameter and so as to have brightness and color indicated by a correction parameter, thereby superimposing and displaying the planar image P on the spherical image CE. In one example, the planar image P is not combined with the spherical image CE before viewing by a user but is superimposed on the spherical image CE upon viewing by the user so as not to limit the planar image P to a single display form and so as to allow the planar image P to be displayed in various forms (for example, changing the zoom factor or the projection method upon displaying).

The location parameter is an example of location information. The correction parameter is an example of correction information.

The determiner 57 is implemented by instructions of the CPU 501 illustrated in FIG. 10 and performs various types of determination.

The near-distance communication unit 58, which is implemented mainly by the near-distance communication circuit 519, the antenna 519a, and instructions of the CPU 501, communicates with, for example, the near-distance communication unit 18 of the special image capturing device 1 by using a short-range wireless communication technology, such as Wi-Fi.

The storing and reading unit 59 is implemented mainly by instructions of the CPU 501 illustrated in FIG. 10. The storing and reading unit 59 stores various types of data (or information) including superimposed display metadata in the memory 5000 and reads various types of data (or information) including the superimposed display metadata from the memory 5000. Further, the storing and reading unit 59 functions as an obtainer that obtains various types of data from the memory 5000.

Figure 13:
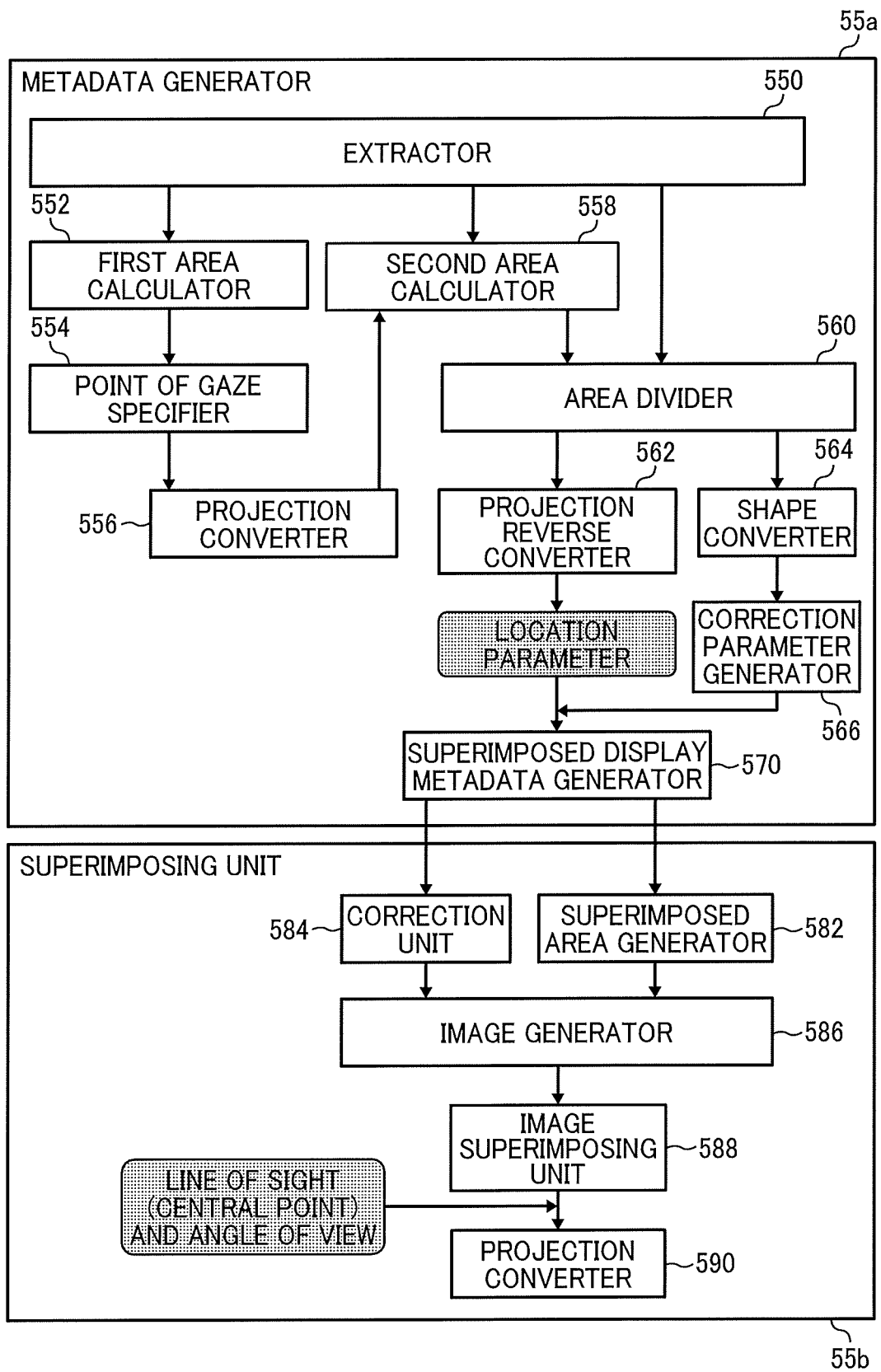
FIG. 13 is a detailed functional block diagram of an image and audio processing unit, according to an embodiment.

Now, a functional configuration of each unit of the image and audio processing unit 55 is described in detail with reference to FIG. 13. FIG. 13 is a detailed functional block diagram of the image and audio processing unit 55.

Figure 16:
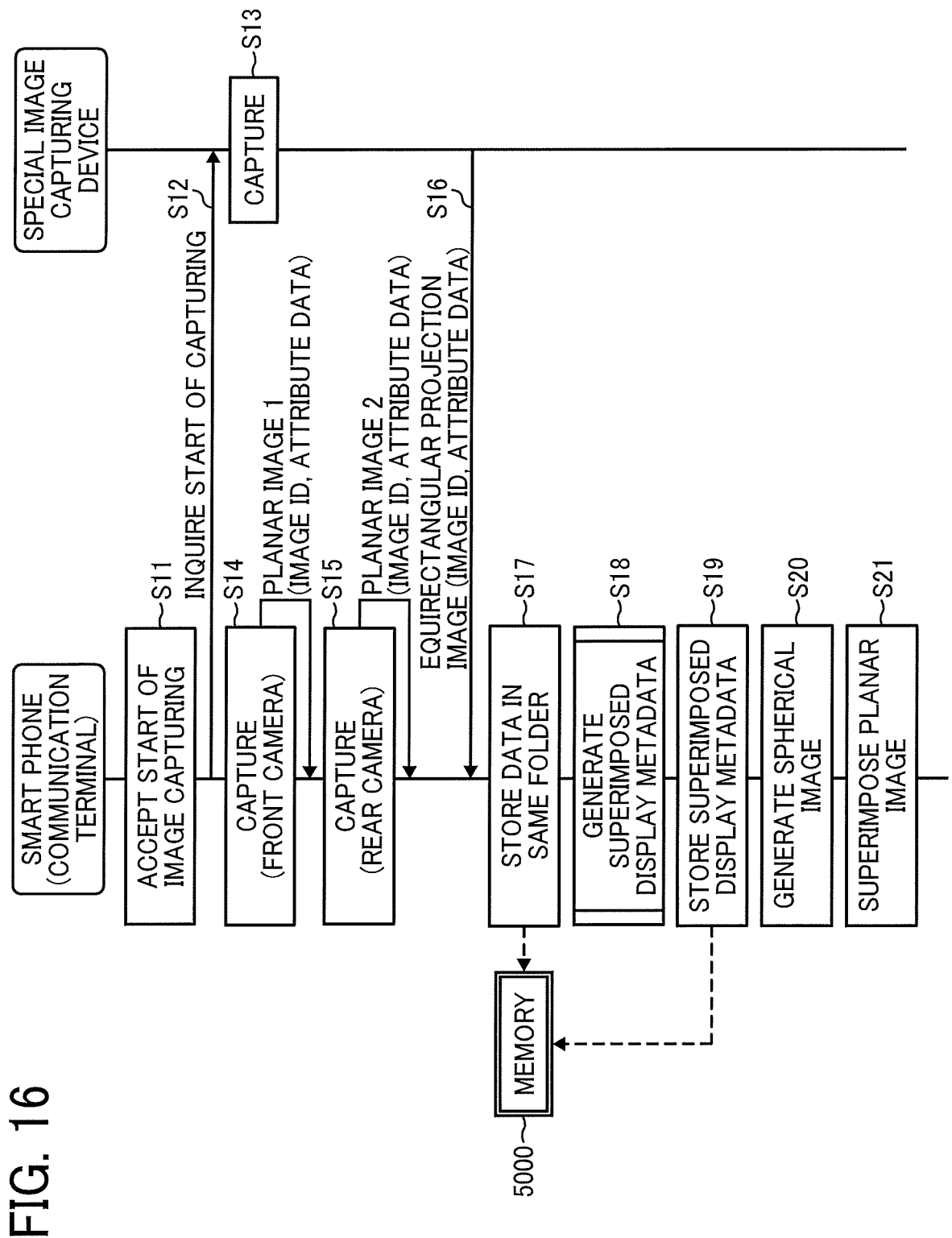
FIG. 16 is a sequence diagram illustrating image capturing operation according to an embodiment.

The image and audio processing unit 55 includes a metadata generator 55a, which performs encoding, and a superimposing unit 55b, which performs decoding. In this example, the encoding corresponds to processing to generate metadata to be used for superimposing images for display ("superimposed display metadata"). Further, in this example, the decoding corresponds to processing to generate images for display using the superimposed display metadata. The metadata generator 55a performs a process in step S18, which is processing to generate superimposed display metadata, as illustrated in FIG. 16. The superimposing unit 55b performs a process in step S23, which is processing to superimpose the images using the superimposed display metadata, as illustrated in FIG. 16.

Figure 17:
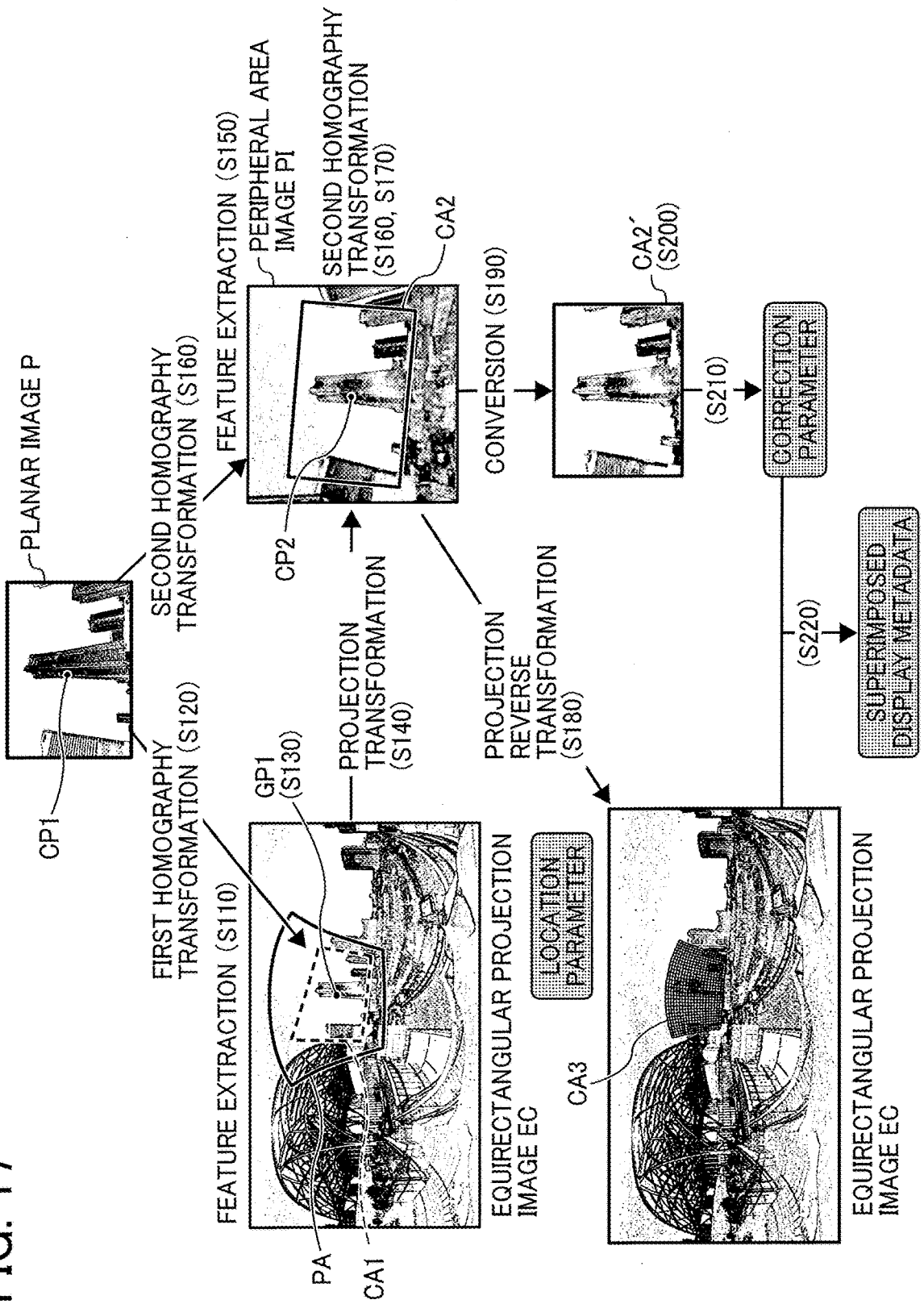
FIG. 17 is a diagram schematically illustrating operation of generating superimposed display metadata, with images being processed, according to an embodiment.

Now, a functional configuration of each unit of the metadata generator 55a is described. The metadata generator 55a includes an extractor 550, a first area calculator 552, a point of gaze specifier 554, a projection converter 556, a second area calculator 558, an area divider 560, a projection reverse converter 562, a shape converter 564, a correction parameter generator 566, and a superimposed display metadata generator 570. The shape converter 564 and the correction parameter generator 566 need not be included in a case where brightness and color need not be corrected. FIG. 17 is a conceptual diagram illustrating operation of generating the superimposed display metadata, with images processed or generated in such operation.

The extractor 550 extracts feature points according to local features of each of two images having the same object. The feature points are distinctive keypoints in both images. The local features correspond to patterns or structures including edges and blobs found in an image and are converted to numerical values to obtain feature values. In this embodiment, the extractor 550 extracts feature points for each of two images that are different from each other. The extractor 550 processes two images, which may be images obtained by using different projection methods. Unless the difference in projection methods cause highly distorted images, any desired image projection methods may be used. For example, referring to FIG. 17, the extractor 550 processes the equirectangular projection image EC that is a rectangular image obtained by using an equirectangular projection method and the planar image P that is a rectangular image obtained by using a perspective projection method. Further, the extractor 550 processes the planar image P and a peripheral area image PI obtained as a result of conversion by the projection converter 556. The equirectangular projection method is an example of a first projection method, and the perspective projection method is an example of a second projection method. The equirectangular projection image EC is an example of a first projection image, and the planar image P is an example of a second projection image.

The first area calculator 552 calculates feature values fv1 based on a plurality of feature points fp1 in the equirectangular projection image EC and further calculates feature values fv2 based on a plurality of feature points fp2 in the planar image P. The feature values are obtained by using any desired method. In this embodiment, it is desirable that the feature values remain unchanged or robust to changes caused as the images are enlarged/reduced or rotated. Subsequently, the first area calculator 552 calculates corresponding points in the images based on the similarities between the calculated feature values fv1 of the plurality of feature points fp1 in the equirectangular projection image EC and the calculated feature values fv2 of the plurality of feature points fp2 in the planar image P. Based on the corresponding points between the images, the first area calculator 552 calculates the homography for transformation between the equirectangular projection image EC and the planar image P. The first area calculator 552 then applies first homography transformation to the planar image P (S120) Accordingly, the first area calculator 552 obtains a first corresponding area CA1 ("first area CA1"), in the equirectangular projection image EC, which corresponds to the planar image P. In the first homography transformation, a central point CP1 of a rectangle defined by the four vertices of the planar image P is converted to a point of gaze GP1 in the equirectangular projection image EC.

When the coordinates of the four vertices of the planar image P are represented by p1=(x1, y1), p2=(x2, y2), p3=(x3, y3), and p4=(x4, y4), the first area calculator 552 calculates the central point CP1 (x, y) by using equations (2) below.

$$S1=[(x4-x2)*(y1-y2)-(y4-y2)*(x1-x2)]/2$$

$$S2=[(x4-x2)*(y2-y3)-(y4-y2)*(x2-x3)]/2$$

$$x=x1+(x3-x1)*S1/(S1+S2)$$

$$y=y1+(y3-y1)*S1/(S1+S2) \qquad (2)$$

In FIG. 17, the planar image P has a rectangular shape. Alternatively, for any rectangular partial image having, for example, a square shape, a trapezoidal shape, or a rhombus shape, the coordinates of the central point may be calculated using the equation 2 based on the point of intersection of the diagonals. In a case where the shape of the planar image P is limited to a rectangular shape or a square shape, the midpoint of the diagonals may be assumed to correspond to the coordinates of the central point PC of the partial image to simplify calculation. The midpoint of the diagonal P1P3 is calculated by using equations (3) below.

$$x=(x1+x3)/2$$

$$y=(y1+y3)/2 \qquad (3)$$

The point of gaze specifier 554 determines a point (referred to as "point of gaze" in this embodiment), on the equirectangular projection image EC, at which the central point CP1 of the planar image P is located after the first homography transformation (S130).

The coordinates of the point of gaze GP1 are the coordinates of a point on the equirectangular projection image EC, and therefore, it is desirable that the coordinates of the point of gaze GP1 be converted so as to be expressed by the latitude and longitude. Specifically, the vertical direction of the equirectangular projection image EC is expressed by the latitude coordinate extending from −90° (−0.5 π) to +90° (+0.5 π), and the horizontal direction thereof is expressed by the longitude coordinate extending from −180° (−π) to +180° (+π). Accordingly, the coordinates of a pixel position that correspond to the image size of the equirectangular projection image EC are calculated from the latitude and longitude coordinates.

The projection converter 556 extracts a peripheral area PA, which is a part surrounding the point of gaze GP1, from the equirectangular projection image EC. The projection converter 556 converts the peripheral area PA, from the equirectangular projection to the perspective projection, to generate a peripheral area image PI (S140). Here, the peripheral area PA for which projection transformation (conversion) is performed is determined so that the peripheral area image PI having a square shape is eventually generated. The peripheral area image PI is defined by a central point CP2, which is a point obtained as a result of conversion of the point of gaze GP1, and the vertical angle of view (or the horizontal angle of view), which is equal to the diagonal angle of view α of the peripheral area PA.

(Transformation of Projection)

First, conversion of the projection method is described. As the description has been given with reference to FIG. 3A to FIG. 5, the equirectangular projection image EC is placed so as to cover the sphere CS to generate the spherical image CE. Therefore, data of each pixel of the equirectangular projection image EC is associated with data of a corresponding pixel of the 3D spherical image CE on the surface of the sphere CS. Accordingly, when the coordinates of a point on the equirectangular projection image EC are expressed by (latitude, longitude)=(ea, aa) and the coordinates of a point on the 3D sphere CS are expressed by rectangular coordinates (x, y, z), conversion performed by the projection converter 556 is expressed by equation (4) below.

$$(x,y,z)=(\cos(ea)\times\cos(aa), \cos(ea)\times\sin(aa), \sin(ea)) \quad (4)$$

Here, the radius of the sphere CS is assumed to be equal to 1.

Meanwhile, the planar image P, which is a perspective projection image, is a 2D image. When a point on the planar image P is expressed by 2D polar coordinates (radius vector, argument)=(r, a), the radius vector r corresponds to the diagonal angle of view α and has a value within the range 0≤r≤tan(diagonal angle of view/2). When a point on the planar image P is expressed by 2D rectangular coordinates (u, v), the conversion relation with the polar coordinates (radius vector, argument)=(r, a) is expressed by equations (5) below.

$$u=r\times\cos(a), v=r\times\sin(a) \quad (5)$$

Then, equations (5) are applied to 3D coordinates (radius vector, polar angle, azimuth). Here, only the surface of the sphere CS is taken into consideration, and therefore, the radius vector in the 3D polar coordinates is equal to 1. When the above-described 2D polar coordinates (radius vector, argument)=(r, a) are used, projection in which the equirectangular projection image EC that is placed on the surface of the sphere CS is converted to a perspective projection image is expressed by equation (6) and equation (7) below under the assumption that the virtual camera IC is present at the center of the sphere CS.

$$r=\tan(\text{polar angle}) \quad (6)$$

$$a=\text{azimuth} \quad (7)$$

Here, when the polar angle is represented by t, t is expressed by t=arctan(r). Therefore, the 3D polar coordinates (radius vector, polar angle, azimuth) is expressed by (radius vector, polar angle, azimuth)=(1, arctan(r), a).

Further, conversion from the 3D polar coordinates to the rectangular coordinates (x, y, z) is expressed by equation (8) below.

$$(x,y,z)=(\sin(t)\times\cos(a), \sin(t)\times\sin(a), \cos(t)) \quad (8)$$

The above equation (8) is applied to convert between the equirectangular projection image EC in equirectangular projection and the planar image P in perspective projection. That is, the radius vector r, which corresponds to the diagonal angle of view α of the planar image P to be generated, is used to calculate transformation map coordinates indicating each pixel of the planar image P and the coordinates of a corresponding point on the equirectangular projection image EC. Based on the transformation map coordinates, the peripheral area image PI, which is a perspective projection image, is generated from the equirectangular projection image EC.

In the projection transformation described above, the position, in the equirectangular projection image EC, expressed by (latitude, longitude)=(90°, 0°) is converted to the central point CP2 of the peripheral area image PI, which is a perspective projection image. Therefore, in a case of performing perspective projection transformation while assuming a certain point of the equirectangular projection image EC to be the point of gaze, the sphere CS on which the equirectangular projection image EC is placed needs to be rotated to perform coordinate rotation so that the coordinates (latitude, longitude) of the point of gaze is located at the position (90°,0°).

As the transformation formula for this rotation of the sphere CS, a general coordinate rotation formula may be used, and therefore, a detailed description will be omitted.

Figure 18A:
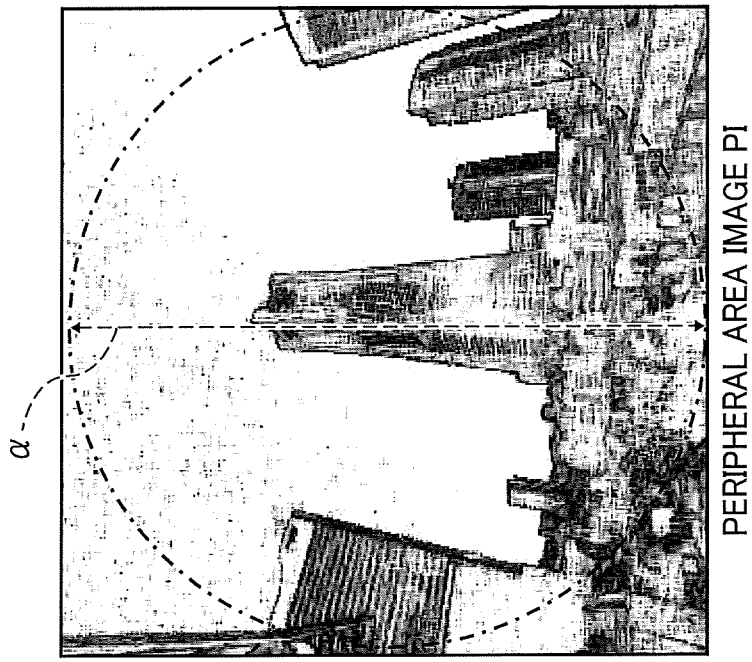
FIGS. 18A and 18B are diagrams schematically illustrating an operation of determining a peripheral area image, according to the embodiment.
Figure 18B:
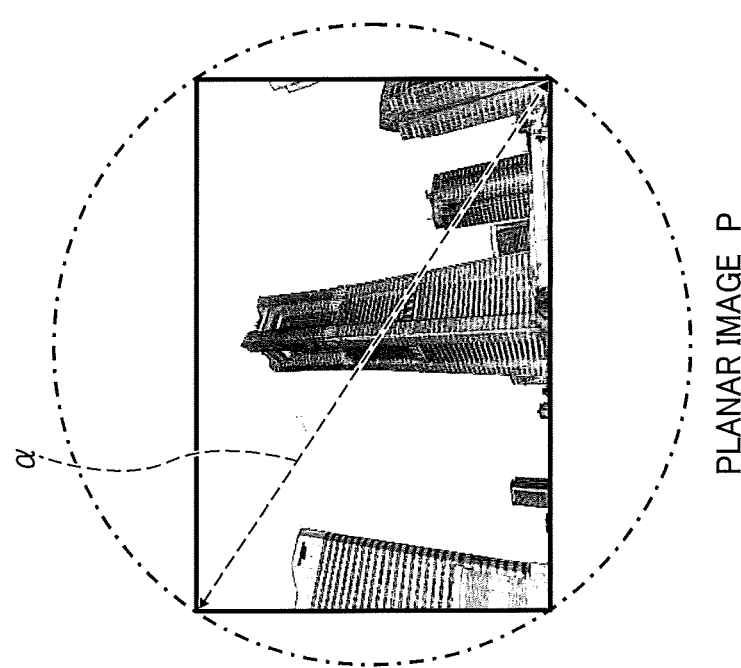

Next, a method for determining the area of the peripheral area image PI is described with reference to FIGS. 18A and 18B. FIGS. 18A and 18B are diagrams schematically illustrating an operation of determining the peripheral area image PI.

For the first area calculator 552 to determine a correspondence between the planar image P and the peripheral area image PI, it is desirable that a second area CA2 included in the peripheral area image PI is large to the extent possible. If the peripheral area image PI is sufficiently large in size, the peripheral area image PI includes the second area CA2. However, if the peripheral area image PI is too large, the number of pixels for which the similarity is to be calculated increases accordingly, resulting in an increased processing time. Therefore, the peripheral area image PI needs to include the second area CA2 and needs to be small to the extent possible. Accordingly, in this embodiment, the peripheral area image PI is determined with a method as described below.

In this embodiment, the peripheral area image PI is determined by using the 35 mm equivalent focal length for the planar image P. The 35 mm equivalent focal length is obtained from Exif data recorded when the image is captured. The 35 mm equivalent focal length is a focal length corresponding to the film size of 24 mm×36 mm, and therefore, the length of the diagonal of such a film and the focal length are used to calculate the corresponding diagonal angle of view by using equation (9) and equation (10) below.

$$\text{Diagonal of film}=\text{sqrt}(24*24+36*36) \tag{9}$$

$$\begin{aligned}&\text{Angle of view of image to be combined}/2=\arctan\\&\quad((\text{Diagonal of film}/2)/35\text{ mm equivalent focal}\\&\quad\text{length for image to be combined})\end{aligned} \tag{10}$$

Here, an image that covers such an angle of view has a circle shape; however, the actual imaging element (film) has a rectangular shape. Therefore, the image captured by the imaging element is a rectangular image that is inscribed in the circle. In this embodiment, the vertical angle of view α of the peripheral area image PI is set to a value equal to the diagonal angle of view α of the planar image P. Accordingly, the peripheral area image PI illustrated in FIG. 18B has a square shape that is circumscribed about the circle that covers the diagonal angle of view α of the planar image P illustrated in FIG. 18A, and the vertical angle of view α is calculated from the length of the diagonal of the square and the focal length for the planar image P as expressed by equation (11) and equation (12) below.

$$\begin{aligned}&\text{Diagonal of square}=\text{sqrt}(\text{Diagonal of film}*\text{Diagonal}\\&\quad\text{of film}+\text{Diagonal of film}*\text{Diagonal of film})\end{aligned} \tag{11}$$

$$\begin{aligned}&\text{Vertical angle of view }\alpha/2=\arctan((\text{Diagonal of}\\&\quad\text{square}/2)/35\text{ mm equivalent focal length for}\\&\quad\text{planar image})\end{aligned} \tag{12}$$

The vertical angle of view α thus calculated is used to perform projection transformation, to obtain the peripheral area image PI (perspective projection image) that covers the planar image P centered on the point of gaze as large as possible at the diagonal angle of view αand has a vertical angle of view α that is not too large.

Referring back to FIGS. 13 and 17, the second area calculator 558 calculates the feature values fv2 of the plurality of feature points fp2 in the planar image P and feature values fv3 of a plurality of feature points fp3 in the peripheral area image PI. The second area calculator 558 specifies corresponding points between the images, based on the similarities between the calculated feature values fv2 and the calculated feature values fv3. Based on the corresponding points between the images, the second area calculator 558 calculates the homography for transformation between the planar image P and the peripheral area image PI. The second area calculator 558 then applies second homography transformation to the planar image P (S160). Accordingly, the second area calculator 558 obtains a second (corresponding) area CA2 ("second area CA2"), in the peripheral area image PT, which corresponds to the planar image P (S170).

Note that at least one of the planar image P and the equirectangular projection image EC may be resized before the first homography transformation to reduce the time taken to calculate the first homography. For example, in a case where the planar image P has 40 million pixels and the equirectangular projection image EC has 30 million pixels, for example, the planar image P may be resized so as to have 30 million pixels. Alternatively, both the planar image P and the equirectangular projection image EC may be resized so as to have 10 million pixels. Similarly, at least one of the planar image P and the peripheral area image PI may be resized before the second homography calculation.

The homography in this embodiment is a transformation matrix indicating the projection relation between the equirectangular projection image EC and the planar image P. The coordinate system for the planar image P is multiplied by the homography transformation matrix to convert into a corresponding coordinate system for the equirectangular projection image EC (spherical image CE).

Figure 19A:
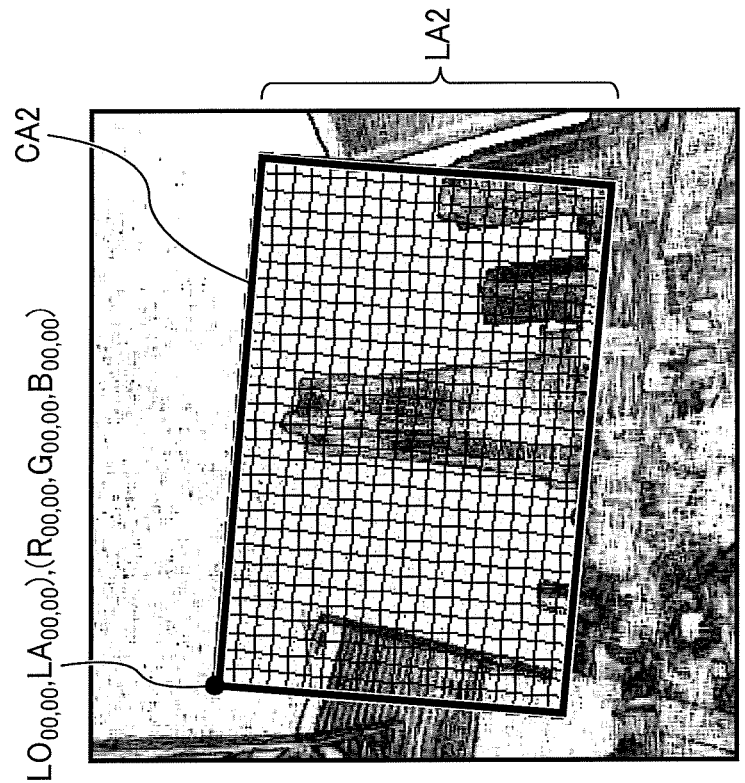
FIGS. 19A and 19B are diagrams schematically illustrating an operation of dividing a second area into a plurality of grid areas, according to the embodiment.
Figure 19B:
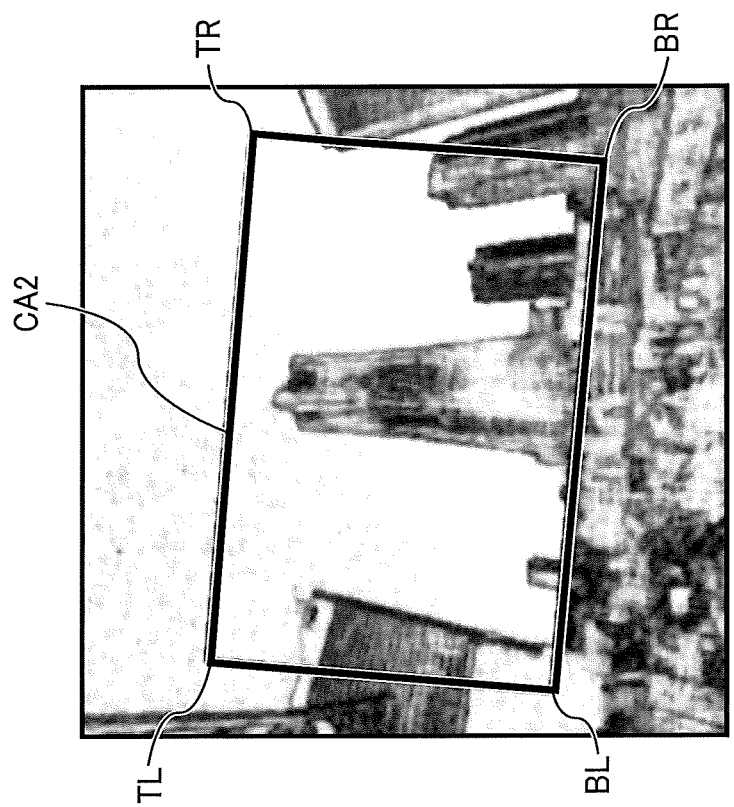

The area divider 560 divides a part of the image into a plurality of grid areas. Example operation of dividing the second area CA2 into a plurality of grid areas is described in detail with reference to FIGS. 19A and 19B. FIGS. 19A and 19B are diagrams schematically illustrating an operation of dividing the second area CA2 into a plurality of grid areas.

The area divider 560 divides a rectangle illustrated in FIG. 19A defined by the four vertices indicated by the coordinates of the second area CA2 calculated by the second area calculator 558 performing the second homography transformation into a plurality of grid areas LA2 illustrated in FIG. 19B. For example, the area divider 560 equally divides the rectangle into 30 grid areas in the horizontal direction and 20 grid areas in the vertical direction.

Now, a specific method for divivding into the plurality of grid areas LA2 is described.

A calculation equation used to equally divide the second area CA2 is described. In a case of equally dividing a line segment connecting two points A(X1, Y1) and B(X2, Y2) into n segments, the coordinates of a point Pm, which is the m-th point from the point A, are calculated by using equation (13) below.

$$Pm=(X1+(X2-X1)\times m/n, Y1+(Y2-Y1)\times m/n) \tag{13}$$

With equation (13) above, the coordinates of each point obtained by equally dividing the line segment are calculated. Therefore, the coordinates of each point obtained by dividing the upper side and the lower side of the rectangle are obtained, and thereafter, each line segment indicated by corresponding coordinates obtained as a result of division needs to be further divided. When the upper left, the upper right, the lower right, and the lower left vertices of the rectangle are respectively represented by TL, TR, BR, and BL, the coordinates of each point obtained by equally dividing each of the line segment TL-TR and the line segment BR-BL into 30 segments are calculated. Then, the 0-th to 30-th points indicated by the calculated coordinates are obtained as a result of division. Subsequently, each of the line segments defined by corresponding points at the same positions in the order is equally divided into 20 segments to obtain the coordinates of the resulting points. Accordingly, the coordinates based on which the rectangular area is divided into 30×20 small areas are calculated. FIG. 19B illustrates the coordinates of, for example, TL ($LO_{00,00}$, $LA_{00,00}$).

Figure 20:
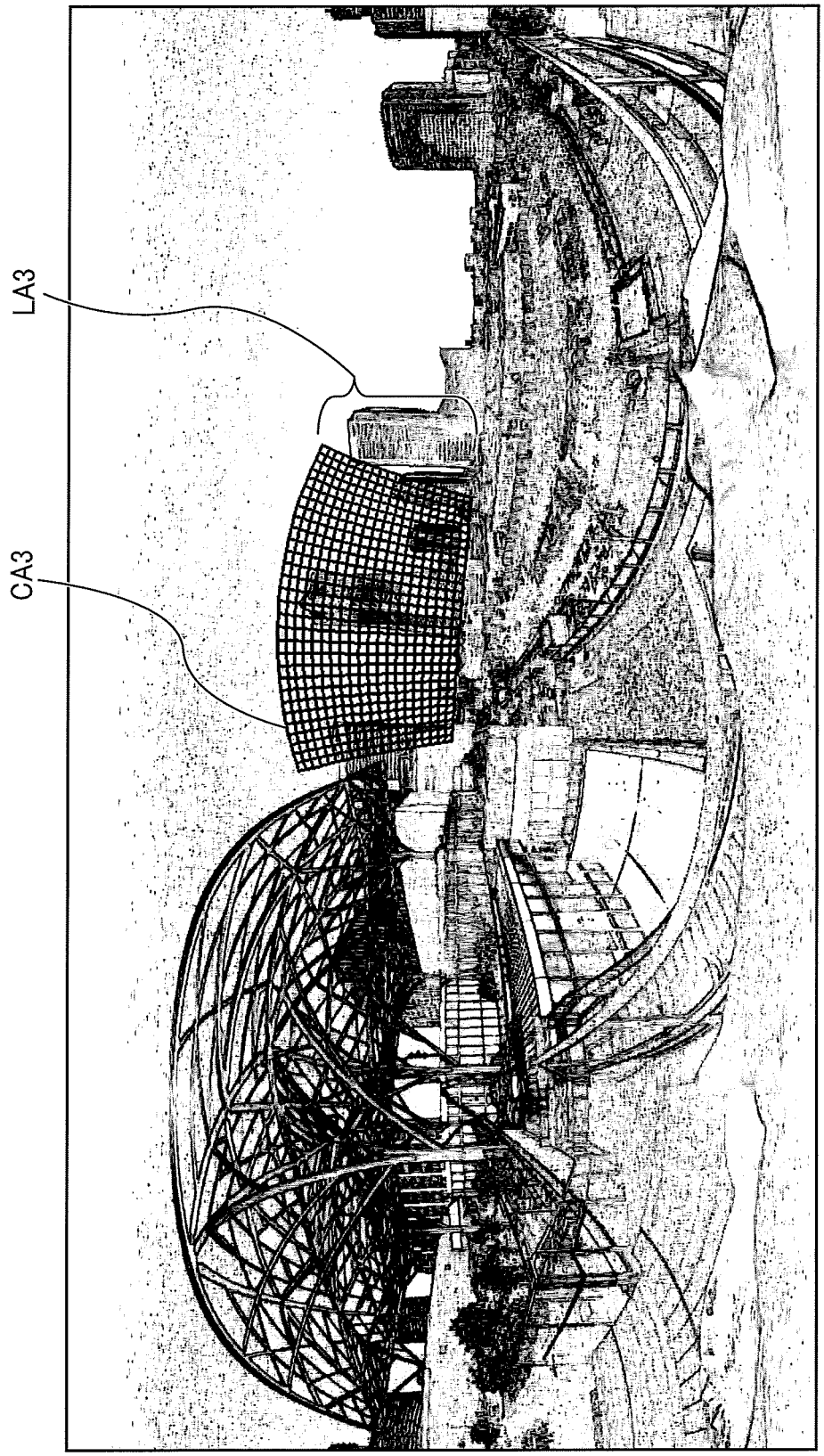
FIG. 20 is a diagram schematically illustrating a third area in an equirectangular projection image, according to the embodiment.

Referring back to FIG. 13 and FIG. 17, the projection reverse converter 562 reversely converts the projection applied to the second area CA2, back to the equirectangular projection applied to the equirectangular projection image EC. With this projection transformation, the third area CA3 in the equirectangular projection image EC, which corresponds to the second area CA2, is determined. Specifically, the projection reverse converter 562 determines the third area CA3, in the equirectangular projection image EC, which contains a plurality of grid areas LA3 corresponding to the plurality of grid areas LA2 in the second area CA2. FIG. 20 illustrates an enlarged view of the third area CA3 illustrated in FIG. 17. FIG. 20 is a diagram schematically illustrating the third area CA3 in the equirectangular projection image EC. Accordingly, the planar image P is eventually superimposed and displayed on the spherical image CE generated from the equirectangular projection image EC so as to fit in (be mapped onto) the third area CA3. With this process by the projection reverse converter 562, the location parameter indicating the coordinates of each of the grid points of the grid areas LA3 is generated. The location parameter is illustrated in FIG. 17 and FIG. 14. Note that the grid points are examples of a plurality of points.

As described above, the location parameter is generated, which is used to calculate the correspondence of each pixel between the equirectangular projection image EC and the planar image P.

Although the planar image P is superimposed on the equirectangular projection image EC at a right location with the location parameter, these image EC and image P may vary in brightness or color (such as tone), causing an unnatural look. The shape converter 564 and the correction parameter generator 566 are provided to avoid this unnatural look, even when these images that differ in brightness and color, are partly superimposed one above the other.

Figure 21A:
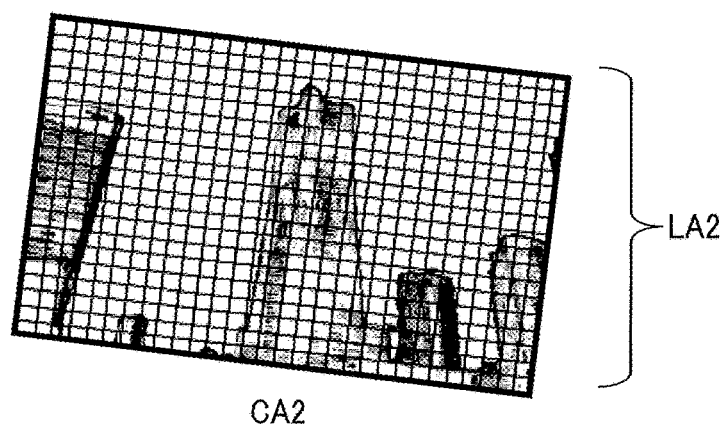
FIGS. 21A to 21C are diagrams schematically illustrating images in the process of generating a correction parameter, according to the embodiment.

Prior to a color correction described below, the shape converter 564 maps the four vertices of the second area CA2 to the four vertices of the planar image P to thereby convert the shape of the second area CA2 to a shape identical to the shape of the planar image P. Specifically, the shape converter 564 converts the shape of the second area CA2 to a shape identical to the shape of the planar image P so that the grid areas LA2 of the second area CA2 illustrated in FIG. 21A match the grid areas LA0 of the planar image P illustrated in FIG. 21C. As a result, the shape of the second area CA2 illustrated in FIG. 21A is converted to the shape of a second area CA2' illustrated in FIG. 21B. Accordingly, the grid areas LA2 are converted to grid areas LA2' to have a shape identical to the shape of the grid areas LA0 of the planar image P.

The correction parameter generator 566 generates, for the brightness and color of the grid areas LA2' of the second area CA2' obtained as a result of conversion to the identical shape, a correction parameter for adjusting the brightness and color of the grid areas LA0 of the planar image P, the grid areas LA0 having a shape identical to the shape of the grid areas LA2'. Specifically, the correction parameter generator 566 calculates the average a=($R_{ave}$, $G_{ave}$, $B_{ave}$) of the brightness and color values (R, G, B) of all pixels constituting four grid areas LA0 that share one common grid point and further calculates the average a'=($R'_{ave}$, $G'_{ave}$, $B'_{ave}$) of the brightness and color values (R', G', B') of all pixels constituting four grid areas LA2' that share one common grid point. In a case where the one grid point of the grid areas LA0 and the one grid point of the grid areas LA2' respectively correspond to one of the four corners of the third area CA3 and one of the four corners of the second area CA2, the correction parameter generator 566 calculates the average a of the brightness and color from the corresponding one grid area LA0 and the average a' of the brightness and color from the corresponding one grid area LA2'. In a case where the one grid point of the grid areas LA0 and the one grid point of the grid areas LA2' respectively correspond to a point on the boundary of the third area CA3 and a point on the boundary of the second area CA2, the correction parameter generator 566 calculates the average a of the brightness and color from the two internal grid areas LA0 and the average a' of the brightness and color from the two internal grid areas LA2'. In this embodiment, the correction parameter is gain data for correcting the brightness and color of the planar image P, and therefore, the correction parameter, which is represented by Pa, is calculated by dividing the average a' by the average a as expressed by equation (14) below.

$$Pa = a'/a \quad (14)$$

Accordingly, the gain value indicated by the correction parameter is used to perform multiplication for each grid area LA0 in superimposed display described below, and the color tone and brightness of the planar image P become closer to those indicated by the pixel values of the equirectangular projection image EC (spherical image CE). This prevents unnatural look, even when the planar image P is superimposed on the equirectangular projection image EC. The correction parameter need not be calculated from the averages and may be calculated by using, for example, the medians and/or the modes instead of or in addition to the averages.

In this embodiment, the pixel values (R, G, B) are used to calculate correction values for brightness and color. Alternatively, a luminance value and color difference values in, for example, the YUV format or the JPEG sYCC (YCbCr) format represented by a luminance signal and color difference signals may be used to calculate the averages of the luminance and color difference values of all pixels constituting the grid areas using a similar method. Then, division may be performed for the averages, and the resulting value may be used as the correction parameter used in superimposed display described below. As a method for conversion from RGB values to YUV or sYCC (YCbCr) values, existing methods are available, and therefore, a detailed description will be omitted. An example of converting RGB values to YCbCr values in the JPEG compressed image format, that is, the JPEG file interchange format (JFIF), using equation (15) below is indicated for reference.

$$\begin{pmatrix} Y \\ Cb \\ Cr \end{pmatrix} = \begin{pmatrix} 0.299 & 0.587 & 0.114 \\ -0.1687 & -0.3313 & 0.5 \\ 0.5 & -0.4187 & -0.0813 \end{pmatrix} \begin{pmatrix} R \\ G \\ B \end{pmatrix} + \begin{pmatrix} 0 \\ 128 \\ 128 \end{pmatrix} \quad (15)$$

The superimposed display metadata generator 570 generates superimposed display metadata indicating a location where the planar image P is superimposed on the spherical image CE, and correction values for correcting brightness and color of pixels, using such as the location parameter and the correction parameter.

Now, a data structure of the superimposed display metadata is described with reference to FIG. 14. FIG. 14 illustrates a data structure of the superimposed display metadata.

As illustrated in FIG. 14, the superimposed display metadata includes equirectangular projection image information, planar image information, superimposed display information, and metadata generation information.

The equirectangular projection image information is transmitted from the special image capturing device 1 together with captured image data. The equirectangular projection image information includes an image identifier (image ID) and attribute data of the captured image data. The image identifier included in the equirectangular projection image information is an image identifier for identifying an equirectangular projection image. While FIG. 14 uses an image file name as an example of image identifier, an image ID for uniquely identifying the image may be used instead.

The attribute data included in the equirectangular projection image information is any information related to the equirectangular projection image information. In FIG. 14, the attribute data includes, for example, positioning correction data (pitch, yaw, roll) of the equirectangular projection image data obtained when the image is captured by the special image capturing device 1. The positioning correction data may be stored in the Exif format, which is specified as an image recording format used in the special image capturing device 1, or may be stored in any other format defined by Google Photo Sphere schema (GPano). When a spherical image is captured at the same position, a 360-degree omnidirectional image can be captured even if the positioning differs. In a case of displaying the spherical image CE, positioning information and the position of the center of the image (the point of gaze) need to be specified in order to determine the display position. Accordingly, in general, the spherical image CE is corrected so that the zenith is right above the user capturing the image and displayed, which enables natural display in which the horizon is corrected to a straight line.

The planar image information is information generated by the smartphone 5. The planar image information includes an image identifier (image ID) and attribute data. The image identifier included in the planar image information is an image identifier for identifying the planar image P. While FIG. 14 uses an image file name as an example of image identifier, an image ID for uniquely identifying the image may be used instead.

The attribute data included in the planar image information is any information related to the planar image information. In FIG. 14, the attribute data in the planar image information includes, for example, the value of the 35 mm equivalent focal length. The value of the 35 mm equivalent focal length need not be used in superimposing and displaying the planar image P on the spherical image CE; however, the value of the 35 mm equivalent focal length is included, for example, as reference information for determining the angle of view for display in a case of superimposed display.

The superimposed display information is generated by the smartphone 5 and includes area division number information, the coordinates of the grid points of each grid area (location parameter), and correction values for brightness and color (correction parameter). The area division number information indicates the number of divisions in the horizontal (longitude) direction and in the vertical (latitude) direction in a case of dividing the first area CA1 into a plurality of grid areas.

The location parameter is vertex mapping information that indicates a position, in the equirectangular projection image EC (spherical image CE), at which each grid point obtained by dividing the planar image P into a plurality of grid areas is located. For example, the location parameter associates a location of each grid in each grid area in the equirectangular projection image EC, with each grid in each grid area in the planar image P. The correction parameter is gain data for correcting the color of the planar image P in this embodiment. Since the target to be corrected may be a monochrome image, the correction parameter may be used only to correct the brightness value. Accordingly, at least the brightness of the image is to be corrected using the correction parameter.

In a case where the spherical image CE is captured by using perspective projection, which is the projection method for the planar image P, a 360-degree omnidirectional image is not obtained. Therefore, an image of a wide angle of view, such as a spherical image, is often generated by using equirectangular projection, which is one of the existing projection methods. When equirectangular projection, such as the Mercator projection, is used for an image, a length in the horizontal direction increases as the distance from the standard parallel increases, resulting in the image significantly different from an image generated using perspective projection that is employed in typical cameras. Accordingly, in a case where the planar image P captured separately from the spherical image CE is superimposed on a part of the spherical image CE, the equirectangular projection image EC (spherical image CE) and the planar image P do not match, and the planar image P does not satisfactorily fit in the spherical image CE because the equirectangular projection image EC and the planar image P are generated using different projection methods. Even if scaling of the images is changed for superimposition, the images do not match, and the planar image P does not satisfactorily fit in the full-view spherical image CE. Accordingly, in this embodiment, the location parameter is generated in the process described in FIG. 17.

Figure 15A:
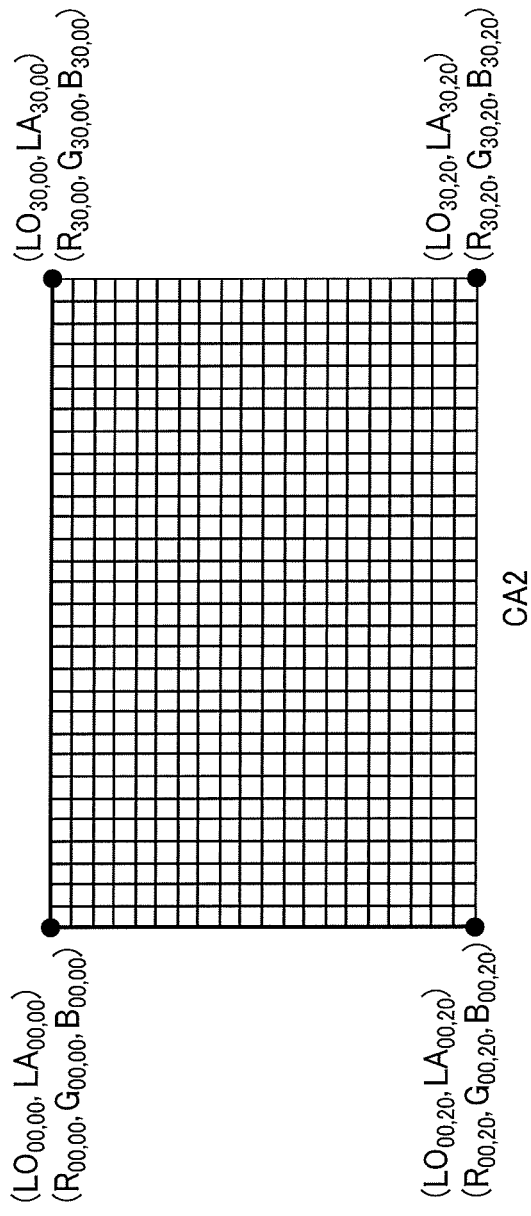
FIG. 15A is a diagram schematically illustrating grid areas in a second area, according to an embodiment.

Now, the location parameter and the correction parameter are described in detail with reference to FIGS. 15A and 15B. FIG. 15A is a diagram schematically illustrating grid areas in the second area CA2, and FIG. 15B is a diagram schematically illustrating grid areas in the third area CA3.

As illustrated in FIG. 15A, in this embodiment, the second area CA2 obtained by converting the first area CA1, which is a part of the equirectangular projection image EC, to an image in perspective projection, which is the projection method for the planar image P, is divided into a plurality of grid areas, namely, 30 areas in the horizontal direction and 20 areas in the vertical direction. In FIG. 15A, the coordinates of the grid points of each of the grid areas ($LO_{00,00}$, $LA_{00,00}$), ($LO_{01,00}$, $LA_{01,00}$), ..., ($LO_{30,20}$, $LA_{30,20}$) and the correction values for brightness and color of the grid points of each of the grid areas ($R_{00,00}$, $G_{00,00}$, $B_{00,00}$), ($R_{01,00}$, $G_{01,00}$, $B_{01,00}$), ..., ($R_{30,20}$, $G_{30,20}$, $B_{30,20}$) are found. To simplify the figure, only the coordinates and the correction values for brightness and color of the grid point at each of the four vertices are indicated; however, the coordinates and the correction values for brightness and color are actually present for all of the grid points. The correction values R, G, and B for brightness and color respectively indicate correction gains for red, green, and blue. Further, the correction values R, G, and B for brightness and color actually indicate correction values for the brightness and color of an image within a predetermined range centered on each grid point indicated by coordinates (a range that does not overlap with a predetermined range centered on an adjacent grid point).

Figure 15B:
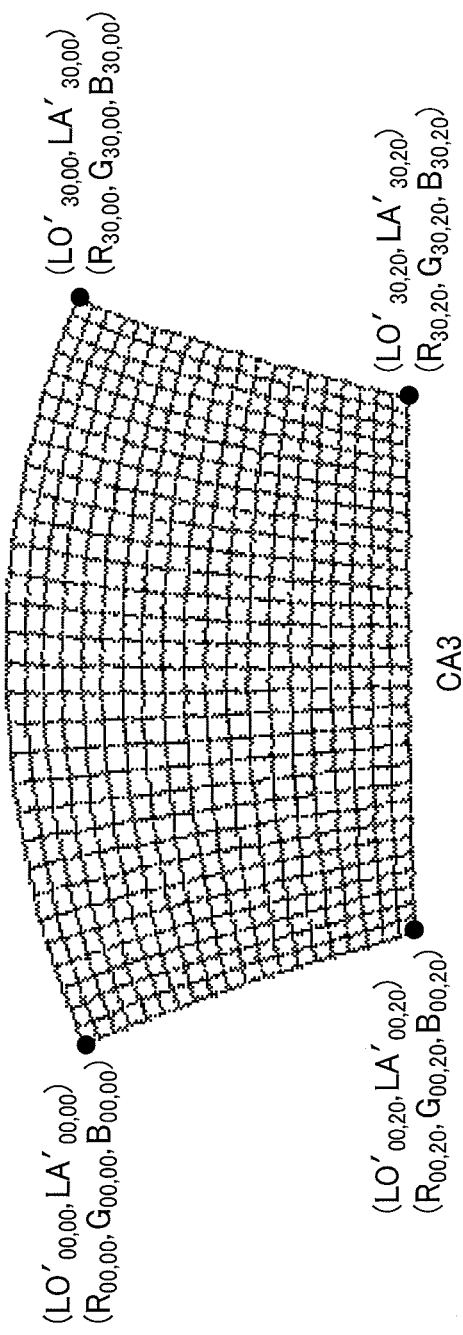
FIG. 15B is a diagram schematically illustrating grid areas in a third area, according to an embodiment.

As illustrated in FIG. 15B, in this embodiment, the third area CA3 obtained by reversely converting the second area CA2 to an image in equirectangular projection, which is the projection method for the equirectangular projection image EC, is similarly divided into a plurality of grid areas, namely, 30 areas in the horizontal direction and 20 areas in the vertical direction. In FIG. 15B, the coordinates of the grid points of each of the grid areas ($LO'_{00,00}$, $LA'_{00,00}$), ($LO'_{01,00}$, $LA'_{01,00}$), ($LO'_{30,20}$, $LA'_{30,20}$) and the correction values for brightness and color, the correction values being equal to the correction values for the second area CA2, are found. Also in FIG. 15B, only the coordinates and the correction values for brightness and color of the grid point at each of the four vertices are indicated for simplifying the figure; however, the coordinates and the correction values for brightness and color are actually present for all of the grid points.

Referring back to FIG. 14, the metadata generation information includes version information indicating the version of the superimposed display metadata.

As described above, the location parameter indicates a locational correspondence between the planar image P and the equirectangular projection image EC (spherical image CE). If the location parameter is used to indicate the position of each pixel of the planar image P and the coordinates of a corresponding point on the equirectangular projection image EC (spherical image CE), the location parameter needs to include information for about 40 million pixels in a case where the smartphone 5 includes a digital camera having a large number of pixels. Therefore, the amount of data of the location parameter increases, and the processing load due to, for example, data storage increases. In this embodiment, the planar image P is divided into 600 (30×20) areas, and the location parameter includes data indicating only the coordinates of each grid point on the planar image P and a corresponding position on the equirectangular projection image EC (spherical image CE). In a case of superimposed display, the smartphone 5 interpolates the position of an image in each area using the coordinates of the grid points to thereby implement superimposed display.

Now, a functional configuration of the superimposing unit 55b is described with reference to FIG. 13. The superimposing unit 55b includes a superimposed area generator 582, a correction unit 584, an image generator 586, an image superimposing unit 588, and a projection converter 590.

The superimposed area generator 582 specifies a part of the sphere CS (hereinafter referred to as "partial sphere") PS, which corresponds to the third area CA3.

The correction unit 584 corrects the brightness and color of the planar image P to the brightness and color of the equirectangular projection image EC using the correction parameter included in the superimposed display metadata. The correction unit 584 need not correct the brightness and color. In a case where the correction unit 584 uses the correction parameter to make corrections, the correction unit 584 may correct only the brightness without correcting the color.

The image generator 586 places the planar image P (or a corrected image C obtained by correcting the planar image P) on the partial sphere PS to generate a superimposed image S. The image generator 586 generates mask data M based on the area of the partial sphere PS. The image generator 586 places the equirectangular projection image EC on the sphere CS to generate the spherical image CE.

The mask data M is data indicating the degree of transparency and may be used in a case of superimposing the superimposed image S on the spherical image CE. In the case of superimposing the superimposed image S on the spherical image CE, the brightness and color around the boundary need to change such that the brightness and color on the side of the superimposed image S inside the boundary gradually becomes closer to those on the side of the spherical image CE outside the boundary. Therefore, the mask data M is set such that the degree of transparency around the mask gradually increases from inside to outside the boundary, namely, from the inside of the superimposed image S toward the boundary with the spherical image CE. Accordingly, even if the superimposed image S is superimposed on the spherical image CE, the superimposition is hardly noticeable to the extent possible. The mask data M need not be generated.

The image superimposing unit 588 superimposes the superimposed image S and the mask data M on the spherical image CE. Accordingly, generation of the spherical image CE having a low definition on which the superimposed image S having a high definition is superimposed so as to make the boundary unnoticeable is completed.

The projection converter 590 converts the projection based on the predetermined line-of-sight direction of the virtual camera IC (the central point CP of the predetermined area T) and the angle of view α of the predetermined area T illustrated in FIG. 7 to thereby make the predetermined area T in the spherical image CE on which the superimposed image S is superimposed visible on the display 517. In the projection transformation, the projection converter 590 also performs a process for adjusting the resolution of the predetermined area T to the resolution of a display area on the display 517. Specifically, in a case where the resolution of the predetermined area T is lower than the resolution of the display area of the display 517, the projection converter 590 enlarges the predetermined area T so that the predetermined area T matches the display area of the display 517.

In a case where the resolution of the predetermined area T is higher than the resolution of the display area of the display 517, the projection converter 590 reduces the predetermined area T so that the predetermined area T matches the display area of the display 517. Accordingly, the display control 56 displays the predetermined-area image Q representing the predetermined area T across the display area of the display 517.

<Operation>

Now, an image capturing method used by the image capturing system 200 is described with reference to FIG. 16. FIG. 16 is a sequence chart illustrating operation of capturing the image, according to the embodiment. A description is given below of a case where an image of an object, a scene, and so on is captured; however, the audio collection unit 14 may record ambient sound simultaneously with the image capturing.

As illustrated in FIG. 16, the acceptance unit 52 of the smartphone 5 accepts a user instruction for starting linked image capturing (step S11). In response to this, the display control 56 controls the display 517 to display the linked image capturing device configuration screen illustrated in FIG. 12B. On this screen, radio buttons for specifying a main image capturing device in linked image capturing and check boxes for specifying (selecting) one or more sub-image capturing devices in linked image capturing are displayed for the respective image capturing devices. Further, the device names of the image capturing devices and the received signal intensity levels are displayed for the respective image capturing devices. When the user specifies (selects) desired image capturing devices as the main and sub-image capturing devices and presses the "Confirm" button, the acceptance unit 52 accepts the user instruction for starting linked image capturing. More than one image capturing device may be selected as sub-image capturing devices, and therefore, the check boxes are provided so as to allow specification (selection) of a plurality of image capturing devices.

In the smartphone 5, the near-distance communication unit 58 transmits image capturing start request information for requesting the start of image capturing to the special image capturing device 1 (step S12). The near-distance communication unit 18 of the special image capturing device 1 receives the image capturing start request information.

The smartphone 5 can use, for example, a set of commands for spherical cameras called Open Spherical Camera application program interfaces (OSC APIs) to issue an image capturing instruction to the special image capturing device 1.

The special image capturing device 1 starts capturing images (step S13). More specifically, the image capturing unit 13 captures images of an object, a scene, and so on and generates captured image data (two pieces of hemispherical-image data as illustrated in FIGS. 3A and 3B). The image and audio processing unit 15 generates a single piece of equirectangular projection image data as illustrated in FIG. 3C based on the two pieces of hemispherical-image data. The storing and reading unit 19 stores the piece of equirectangular projection image data in the memory 1000.

In the smartphone 5, the image capturing unit 53 starts capturing images parallel to the image capturing by the special image capturing device 1 (steps S14 and S15). Desirably, the smartphone 5 and the special image capturing device 1 simultaneously capture images. However, it is difficult for the special image capturing device 1 to actually capture images in response to an image capturing instruction issued from the smartphone 5 to the special image capturing device 1 and for the smartphone 5 to capture images at completely the same timing. Further, the front camera and the rear camera of the smartphone 5 might not capture images at completely the same timing. In FIG. 16, the front camera captures an image and the rear camera subsequently captures an image; however, preferably, the front camera, the rear camera, and the special image capturing device 1 capture image simultaneously to the extent possible.

As a mechanism for simultaneously giving image capturing instructions, in a case of, for example, Android (registered trademark) operating system (OS), a program executed by the smartphone 5 calls the Camera API that provides an image capturing function to thereby give image capturing instructions to the front and rear cameras.

The image capturing unit 53 of the smartphone 5 captures a planar image with the front camera to generate first planar image data (planar image data 1), with an image identifier and attribute data for the first planar image data. The image capturing unit 53 further captures a planar image with the rear camera to generate second planar image data (planar image data 2), with an image identifier and attribute data for the second planar image data.

The near-distance communication unit 18 of the special image capturing device 1 transmits the equirectangular projection image data obtained in step S13 to the smartphone 5 (step S16). At this time, an image identifier for identifying the equirectangular projection image data for transmission and attribute data are also transmitted. The image identifier and the attribute data are illustrated in FIG. 14 as equirectangular projection image information. The near-distance communication unit 58 of the smartphone 5 receives the equirectangular projection image data, the image identifier, and the attribute data.

Subsequently, the storing and reading unit 59 of the smartphone 5 saves the electronic files of the pieces of planar image data received in steps S14 and S15 and the electronic file of the equirectangular projection image data received in step S16 in the same electronic folder in the memory 5000 (step S17).

Subsequently, the image and audio processing unit 55 of the smartphone 5 generates superimposed display metadata that is used in a case where the planar image P, which is a high-definition image, is superimposed and displayed on a part of the spherical image CE, which is a low-definition image (step S18). The storing and reading unit 59 stores the superimposed display metadata in the memory 5000 (step S19). The image and audio processing unit 55 of the smartphone 5 generates a spherical image (step S20). Step S21 will be described below The process for generating the superimposed display metadata is described in detail here with reference to, for example, FIG. 13 to FIG. 21C. Even if the resolution of the imaging elements of the smartphone 5 and the resolution of the imaging elements of the special image capturing device 1 are the same, the definition, per unit area, of an image captured by the special image capturing device 1 becomes low. This is because the imaging elements of the special image capturing device 1 need to capture an equirectangular projection image that fully covers a 360-degree scene, from which the spherical image CE is generated.

As described above, the smartphone 5 can give image capturing instructions to the cameras of the smartphone 5 and also give an image capturing instruction to the special image capturing device 1 simultaneously. A spherical image and planar images can be obtained at substantially the same time, which is desirable for image superimposition. In a case where images are captured at substantially the same time, the locational relation between the special image capturing device 1 and the smartphone 5 is known, and therefore, a point of gaze Gp described below can be determined.

In FIG. 16, the smartphone 5 gives an image capturing instruction to the special image capturing device 1; however, the user may operate the special image capturing device 1 to give an image capturing instruction from the special image capturing device 1 to the smartphone 5.

Now, a process for generating the superimposed display metadata is described with reference to FIG. 17. The superimposed display metadata is used to superimpose the planar image P having a high definition on the spherical image CE, which is generated from the equirectangular projection image EC having a low definition, and to display a resulting image on the display 517. The superimposed display metadata includes the location parameter and the correction parameter, as illustrated in FIG. 14, and therefore, a method for generating the location parameter and the correction parameter is focused and described.

The extractor 550 extracts a plurality of feature points in the equirectangular projection image EC, which is a rectangular image obtained by using equirectangular projection, and a plurality of feature points in the planar image P, which is a rectangular image obtained by using perspective projection (step S110).

Subsequently, the first area calculator 552 performs first homography transformation and calculates the first area CA1, which is a rectangular area corresponding to the planar image P, in the equirectangular projection image EC as illustrated in FIG. 17 based on the similarities between the plurality of feature points in the equirectangular projection image EC and the plurality of feature points in the planar image P (step S120). More specifically, the first area calculator 552 calculates corresponding points in the images based on the similarities between the calculated feature values fv1 of the plurality of feature points fp1 in the equirectangular projection image EC and the calculated feature values fv2 of the plurality of feature points fp2 in the planar image P. The first area calculator 552 calculates a homography, in the equirectangular projection image EC, corresponding to the planar image P to perform first homography transformation, thereby calculating the first area CA1, which is a rectangular area corresponding to the planar image P, in the equirectangular projection image EC, as illustrated in FIG. 17. In this process, it is not possible to precisely map the planar image P, which is an image in different projection, onto the equirectangular projection image EC; however, this process is a process (tentative determination process) for tentatively and roughly estimating a corresponding position.

Subsequently, the point of gaze specifier 554 determines a point (point of gaze GP1), on the equirectangular projection image EC, at which the central point CP1 of the planar image P is located after the first homography transformation (step S130).

Subsequently, the projection converter 556 converts the peripheral area PA centered on the point of gaze GP1 on the equirectangular projection image EC to an image in perspective projection, which is the projection method for the planar image P, to eventually generate the peripheral area image PI in which the vertical angle of view α of the peripheral area image PI is equal to the diagonal angle of view α of the planar image P, as illustrated in FIGS. 18A and 18B (step S140).

Subsequently, the extractor 550 extracts a plurality of feature points in the peripheral area image PI obtained by the projection converter 556 (step S150).

Subsequently, the second area calculator 558 performs second homography transformation and calculates the second area CA2, which is a rectangular area corresponding to the planar image P, in the peripheral area image PI based on the similarities between the plurality of feature points in the planar image P and the plurality of feature points in the peripheral area image PI (step S160). The planar image P is a high-definition image having, for example, 40 million pixels, and therefore, is resized in advance to an appropriate size.

Subsequently, the area divider 560 divides the second area CA2 into the plurality of grid areas LA2, as illustrated in FIG. 19B (step S170).

Subsequently, the projection reverse converter 562 converts (reversely converts) the projection applied to the second area CA2 to equirectangular projection, which is the projection method for the equirectangular projection image EC, as illustrated in FIG. 17 (step S180). Then, the projection reverse converter 562 calculates the third area CA3, in the equirectangular projection image EC, constituted by the grid areas LA3 corresponding to the plurality of grid areas LA2 in the second area CA2, as illustrated in FIG. 20. FIG. 20 is a diagram schematically illustrating the third area CA3 in the equirectangular projection image EC. With this process performed by the projection reverse converter 562, the location parameter indicating the coordinates of each grid point of the grid areas LA3 is generated.

The location parameter is illustrated in FIG. 13 and FIG. 17, as described above.

Figure 21B:
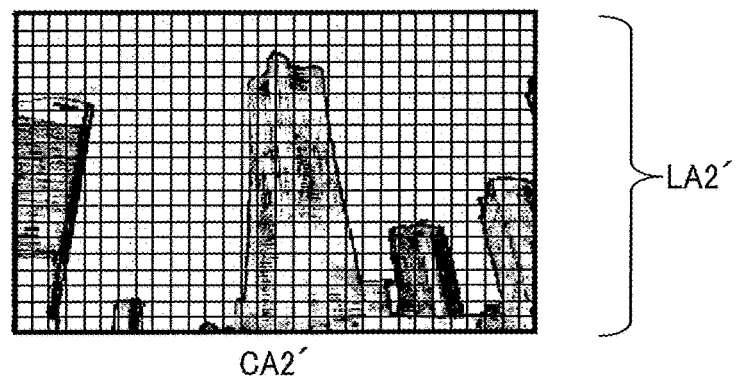

The process for generating the correction parameter is described with reference to, for example, FIGS. 21A to 21C. After the process in step S180, the shape converter 564 maps the four vertices of the second area CA2, as illustrated in FIG. 21A, to the four vertices of the planar image P to thereby convert the shape of the second area CA2 to a shape identical to the shape of the planar image P and obtain the second area CA2', as illustrated in FIG. 21B (step S190).

Figure 21C:
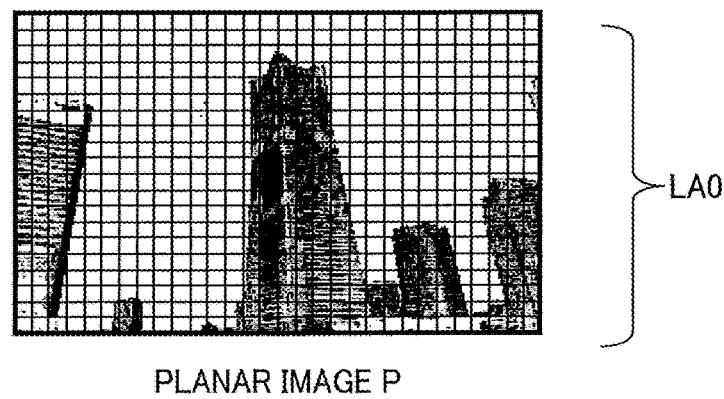

Subsequently, the area divider 560 divides the planar image P into the plurality of grid areas LA0 having a shape identical to the shape of the grid areas LA2' in the second area CA2' obtained as a result of conversion, as illustrated in FIG. 21C, the number of the grid areas LA0 being equal to the number of the grid areas LA2' (step S200).

Subsequently, the correction parameter generator 566 generates, for the brightness and color of the grid areas LA2' in the second area CA2', a correction parameter for adjusting the brightness and color of the grid areas LA0 in the planar image P, the grid areas LA0 corresponding to the grid areas LA2' (step S210).

The superimposed display metadata generator 570 generates the superimposed display metadata on the basis of the equirectangular projection image information obtained from the special image capturing device 1, the predetermined area division number information, the location parameter generated by the projection reverse converter 562, the correction parameter generated by the correction parameter generator 566, and the metadata generation information, as illustrated in FIG. 17 (step S220). The storing and reading unit 59 stores the superimposed display metadata in the memory 5000.

Consequently, the process in step S20 illustrated in FIG. 16 ends. The storing and reading unit 59 and the display control 56 use the superimposed display metadata to perform a process of superimposed display (step S21).

Figure 22:
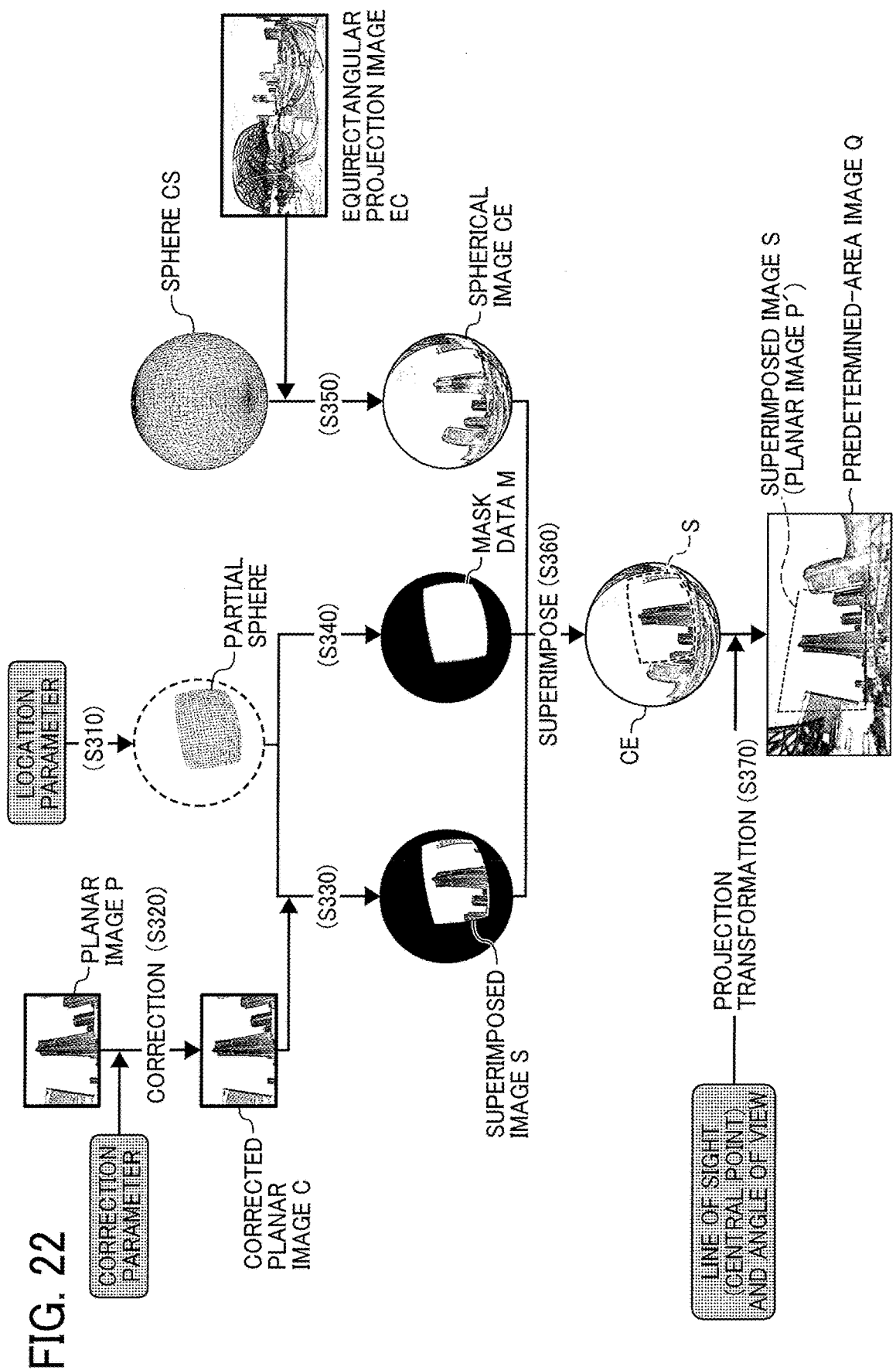
FIG. 22 is a diagram schematically illustrating operation of displaying a superimposed image, with images being processed, according to the embodiment.

Now, the process of superimposed display is described with reference to FIG. 22. FIG. 22 is a diagram schematically illustrating images in the process of superimposed display.

First, the storing and reading unit 59 (obtainer) illustrated in FIG. 11 reads and obtains in advance, from the memory 5000, data of the equirectangular projection image EC in equirectangular projection, data of the planar image P in perspective projection, and the superimposed display metadata.

Next, the superimposed area generator 582 generates the partial sphere PS corresponding to the third area CA3 on the virtual sphere CS based on the location parameter, as illustrated in FIG. 22 (step S310). Here, pixels not specified in the location parameter, namely, pixels other than pixels at the grid points, are interpolated by performing, for example, linear interpolation.

Next, the correction unit 584 corrects the brightness and color of the planar image P to the brightness and color of the equirectangular projection image EC using the correction parameter included in the superimposed display metadata (step S320). The planar image P that has been corrected is called "corrected image C".

Next, the image generator 586 places the corrected image C on the partial sphere PS to generate the superimposed image S (step S330). Here, pixels not specified in the location parameter, namely, pixels other than pixels at the grid points, are interpolated by performing, for example, linear interpolation. The image generator 586 generates the mask data M based on the partial sphere PS (step S340). Further, the image generator 586 places the equirectangular projection image EC on the sphere CS to generate the spherical image CE (step S350). The image superimposing unit 588 superimposes the superimposed image S on the spherical image CE using the superimposed image S and the mask data M (step S360). The mask data M includes transparency percentage data, from which a multiplication value is calculated and used to perform multiplication for the partial sphere PS used in step S330 and for the spherical image CE. Then, superimposition is performed to thereby generate the spherical image CE. Accordingly, generation of the spherical image CE having a low definition on which the superimposed image S having a high definition is superimposed so as to make the boundary unnoticeable is completed.

Next, the projection converter 590 converts the projection based on the predetermined line-of-sight direction of the virtual camera IC (the central point CP of the predetermined area T) and the angle of view α of the predetermined area T illustrated in FIG. 7 to thereby make the predetermined area T in the spherical image CE on which the superimposed image S is superimposed visible on the display 517 (step S370).

In the projection transformation, the projection converter 590 also performs a process for adjusting the resolution of the predetermined area T to the resolution of a display area on the display 517. Accordingly, the display control 56 displays the predetermined-area image Q representing the predetermined area T across the display area of the display 517. Here, the predetermined-area image Q includes the superimposed image S, that is, a planar image P', which is the superimposed planar image P.

Figure 23:
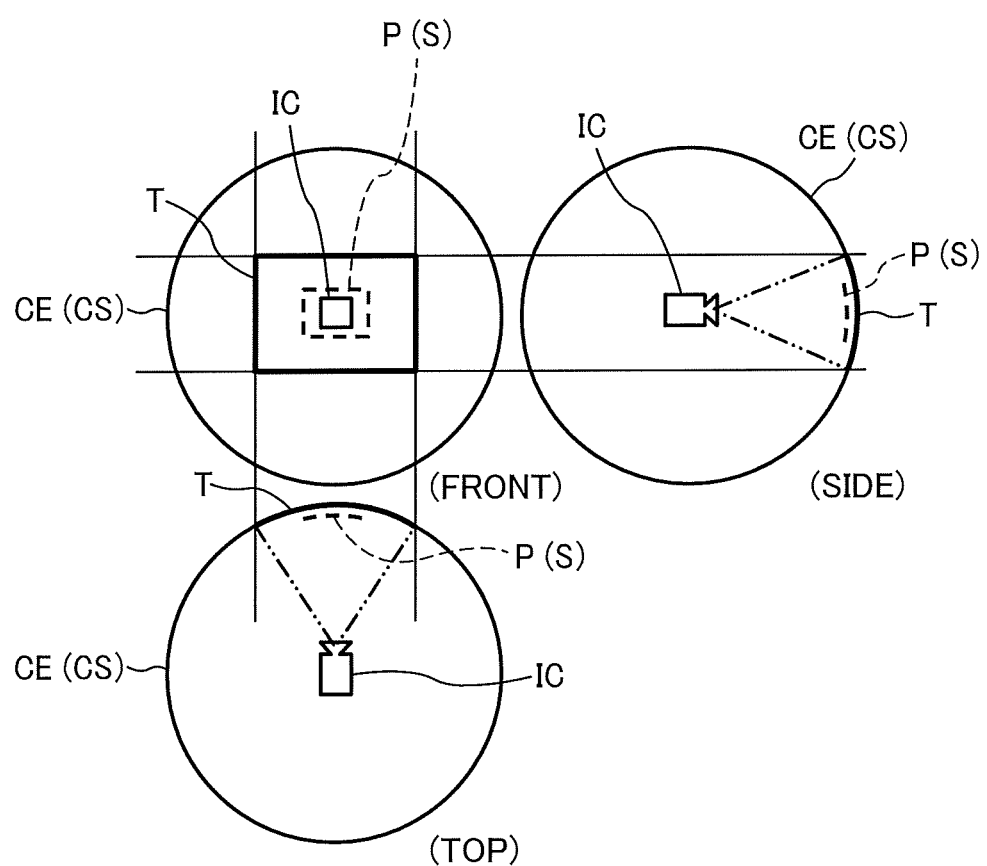
FIG. 23 is a two-dimensional (2D) diagram schematically illustrating an example case where a planar image is superimposed on a spherical image.

Now, the state of superimposed display is described in detail with reference to FIG. 23 to FIG. 27D. FIG. 23 is a 2D diagram schematically illustrating a case where the planar image P is superimposed on the spherical image CE. Here, a case where the planar image P is superimposed in the state illustrated in FIG. 5 is illustrated. As illustrated in FIG. 23, the superimposed image S having a high definition is superimposed on the spherical image CE having a low definition and placed on the sphere CS in accordance with the location parameter so as to be placed on the inner surface of the sphere CS.

Figure 24:
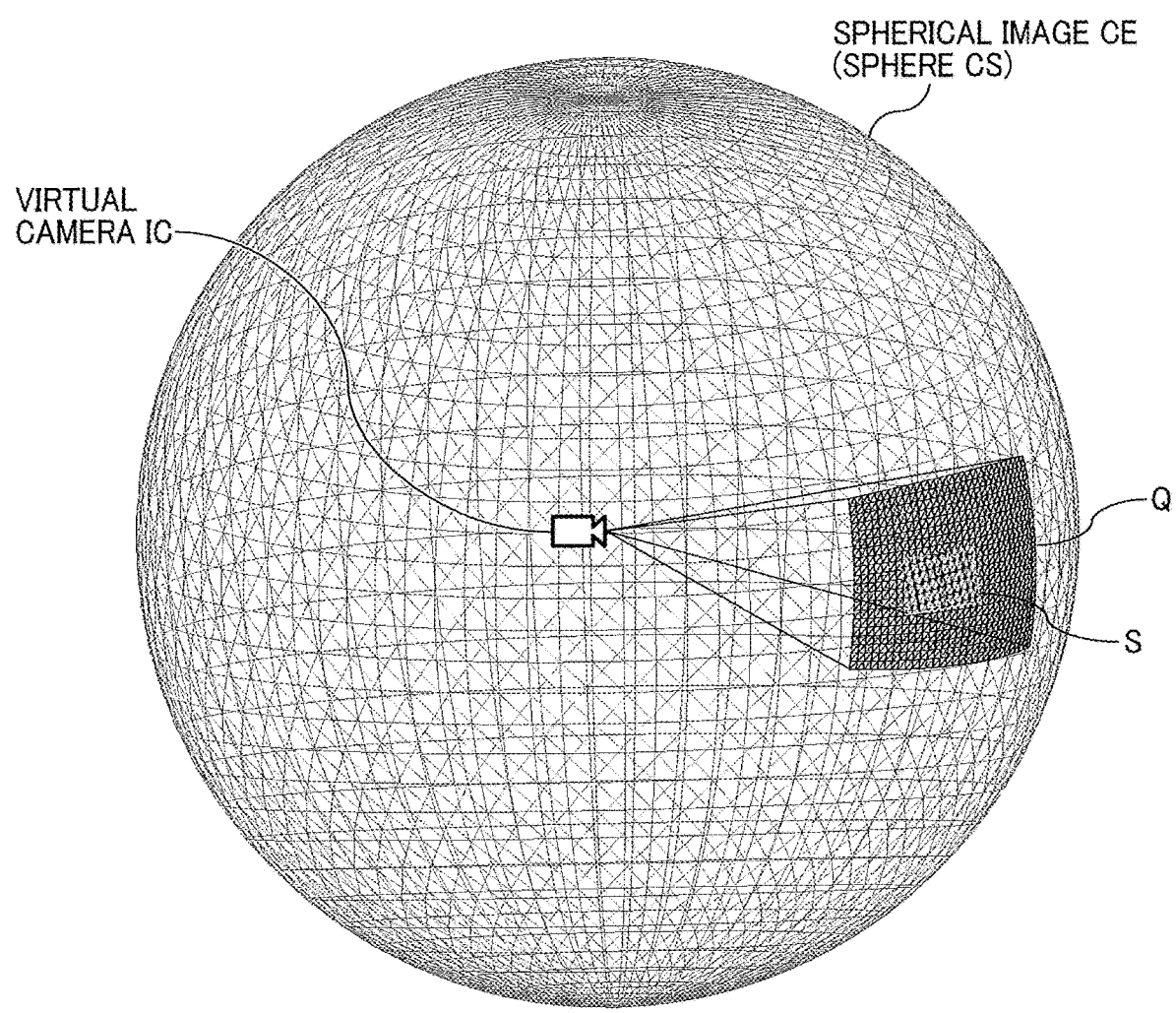
FIG. 24 is a 3D diagram schematically illustrating an example case where a planar image is superimposed on a spherical image.

FIG. 24 is a 3D diagram schematically illustrating the case where the planar image P is superimposed on the spherical image CE. FIG. 24 illustrates a state where the spherical image CE and the superimposed image S are placed on the sphere CS and an image that includes the superimposed image S constitutes the predetermined-area image Q.

Figure 25A:
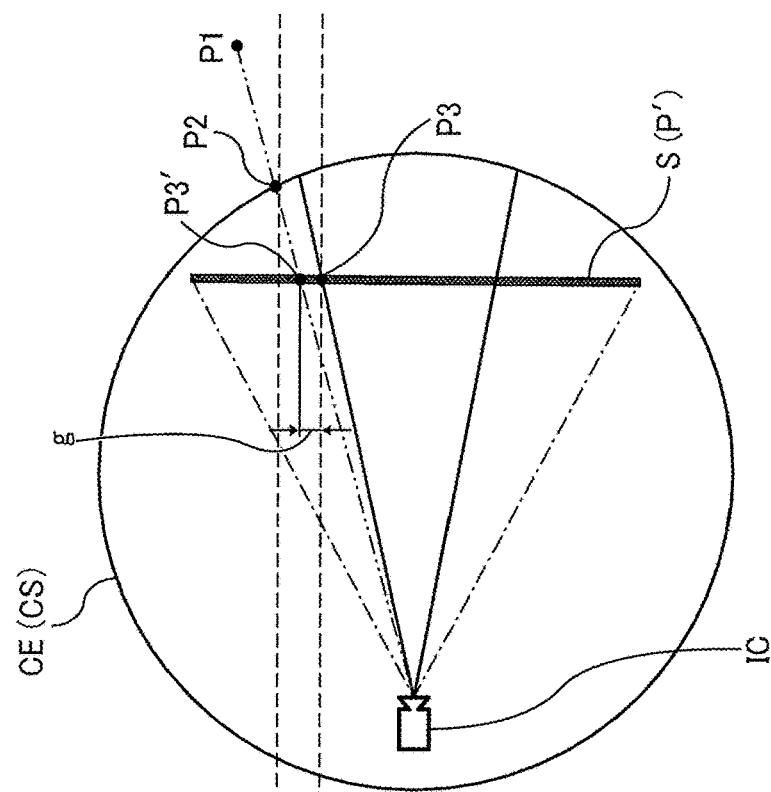
FIGS. 25A and 25B are 2D diagrams schematically illustrating an example case where a planar image is superimposed on a spherical image without using a location parameter according to a comparative example.
Figure 25B:
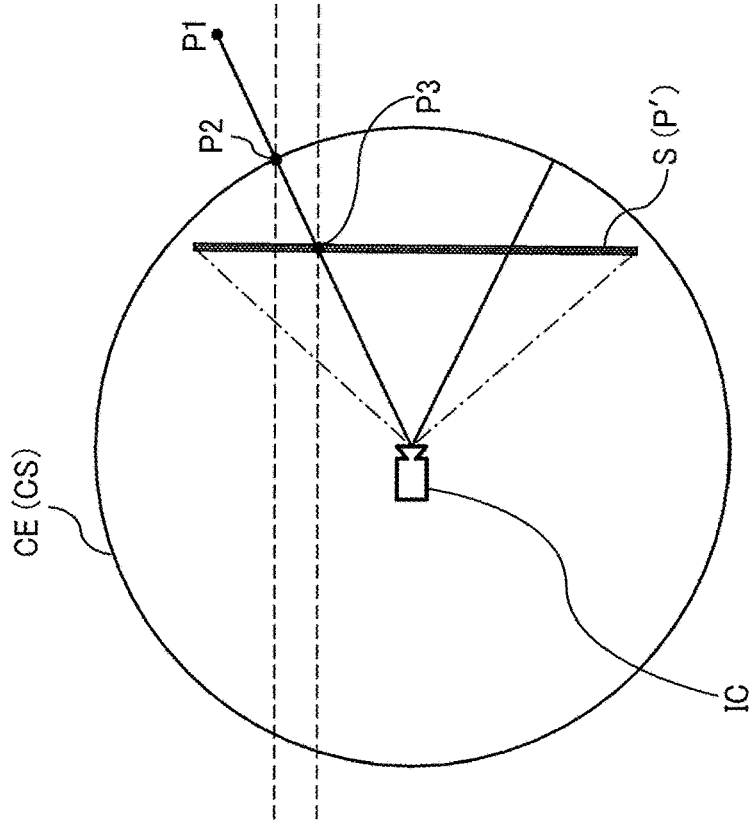

FIGS. 25A and 25B are 2D diagrams schematically illustrating a case where the planar image is superimposed on the spherical image CE without using the location parameter according to this embodiment. FIGS. 26A and 26B are 2D diagrams schematically illustrating a case where the planar image is superimposed on the spherical image CE by using the location parameter according to this embodiment.

As illustrated in FIG. 25A, when it is assumed that the virtual camera IC is located at the center of the sphere CS, the object P1 is present on the spherical image CE as the image P2 and present on the superimposed image S as the image P3. As illustrated in FIG. 25A, the image P2 and the image P3 are located on a straight line connecting the virtual camera IC with the object P1, and therefore, even if the spherical image CE on which the superimposed image S is superimposed is displayed, no shift occurs between the spherical image CE and the superimposed image S. However, as illustrated in FIG. 25B, if the virtual camera IC is located away from the center of the sphere CS (if the angle of view α decreases), the image P2 is located on the straight line connecting the virtual camera IC with the object P1, and the image P3 is located at a position slightly closer to the center of the superimposed image S. Therefore, when an image that is located on the straight line connecting the virtual camera IC with the object P1 and that is present on the superimposed image S is represented as the image P3', a shift occurs between the spherical image CE and the superimposed image S by an amount of shift g between the image P3 and the image P3'. As a result, the superimposed image S that is displayed shifts from the spherical image CE.

In this embodiment, the location parameter based on a plurality of grid areas is used, which enables the superimposed image S to be superimposed on the spherical image CE along the sphere CS, as illustrated in FIGS. 26A and 26B. Therefore, in a case where the virtual camera IC is located at the center of the sphere CS, as illustrated in FIG. 26A, and in a case where the virtual camera IC is located away from the center of the sphere CS, as illustrated in FIG. 26B, the image P2 and the image P3 are located on the straight line connecting the virtual camera IC with the object P1. Accordingly, even if the superimposed image S is superimposed on the spherical image CE and displayed, no shift occurs between the spherical image CE and the superimposed image S.

Figure 27A:
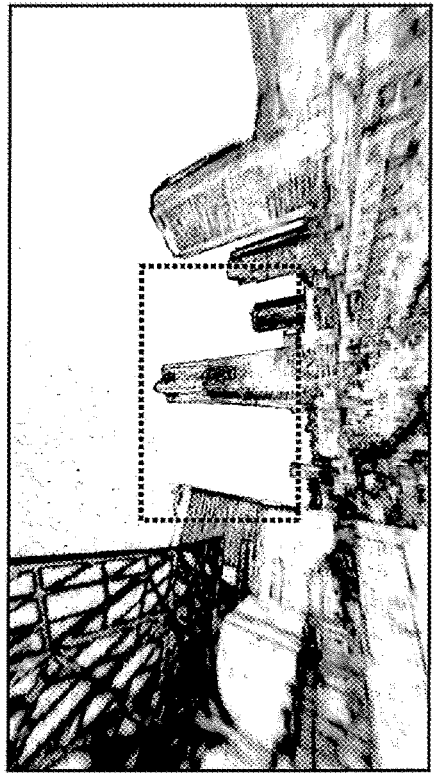
FIGS. 27A, 27B, 27C, and 27D are diagrams schematically illustrating an example wide-angle image that is displayed without superimposed display, an example telephoto image that is displayed without superimposed display, an example wide-angle image that is displayed with superimposed display, and an example telephoto image that is displayed with superimposed display, respectively.
Figure 27B:
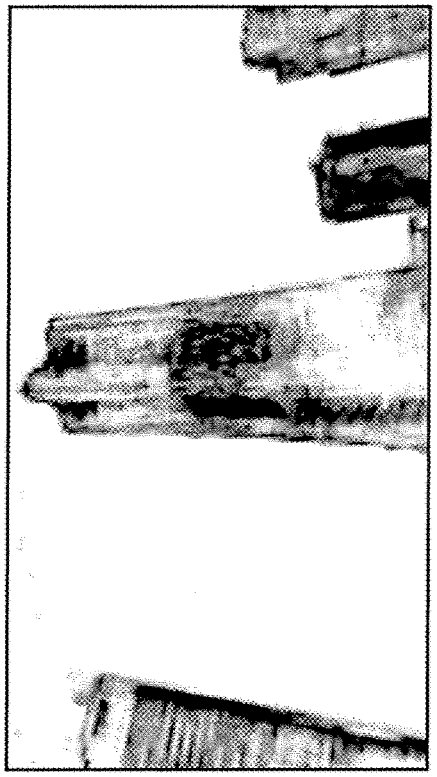
Figure 27C:
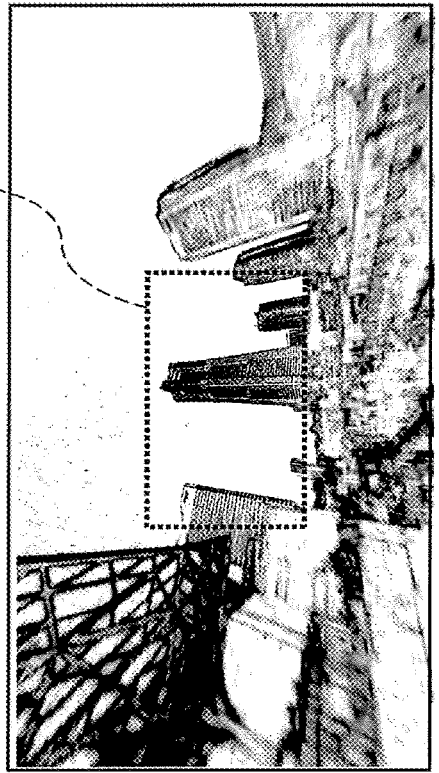

FIGS. 27A, 27B, 27C, and 27D are diagrams schematically illustrating an example wide-angle image that is displayed without superimposed display, an example telephoto image that is displayed without superimposed display, an example wide-angle image that is displayed with superimposed display, and an example telephoto image that is displayed with superimposed display, respectively. The dashed line in FIGS. 27A and 27C are illustrated for convenience of description and may or may not actually be displayed on the display 517.

Figure 27D:
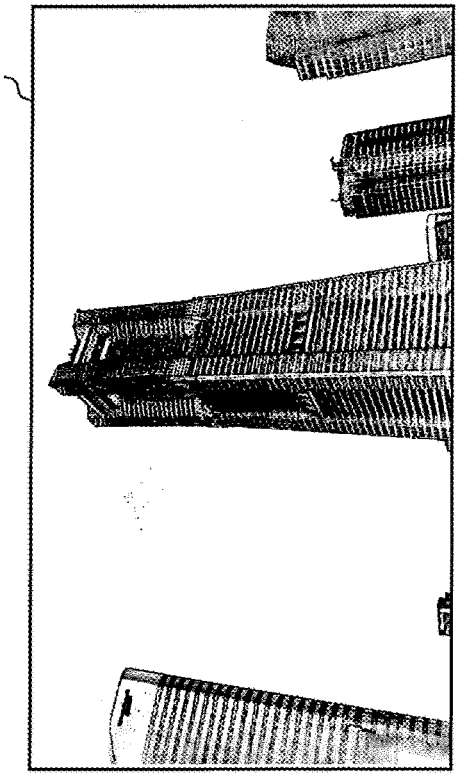

As illustrated in FIG. 27A, in a case where the spherical image CE is displayed without the planar image P superimposed thereon, when the area outlined by the dashed line in FIG. 27A is enlarged to full screen, the image having a low definition is displayed as is, and the user views the blurred image, as illustrated in FIG. 27B. On the other hand, in a case where the spherical image CE is displayed with the planar image P superimposed thereon, when the area outlined by the dashed line in FIG. 27C is enlarged to full screen, the image having a high definition is displayed, and the user can view the clear image, as illustrated in FIG. 27D. Specifically, in a case where, for example, a signboard with text thereon is present in the area outlined by the dashed line and the planar image P having a high definition is not superimposed and displayed, when the image is enlarged, the text blurs and illegible. In a case where the planar image P having a high definition is superimposed and displayed, even when the image is enlarged, the text remains clear and legible to the user.

<Parallax and Vignetting>

Figure 28A:
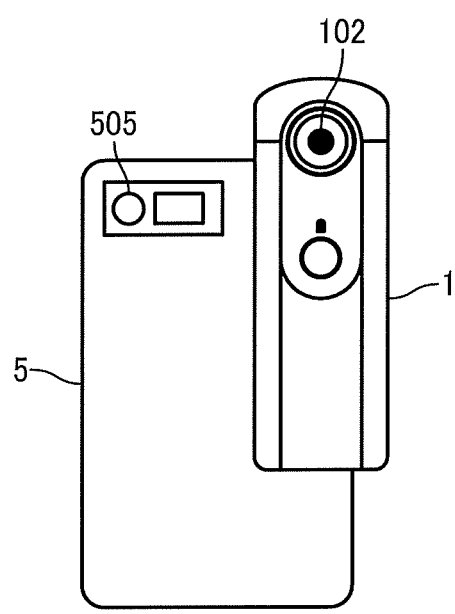
FIGS. 28A and 28B are example diagrams for describing a relation between parallax and vignetting.
Figure 28B:
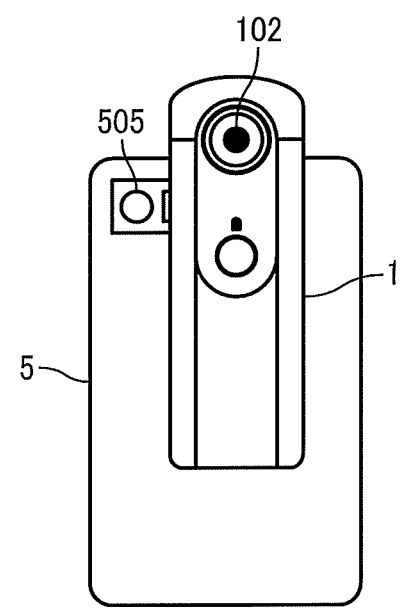

FIGS. 28A and 28B are example diagrams for describing a relation between parallax and vignetting. Vignetting, such as optical vignetting, is a phenomenon in which, for example, a lens hood or a filter appears in the perimeter of a photograph, and part of an object becomes non-visible or the perimeter becomes dark. In FIG. 28A, the lens (the CMOS sensor 505a in FIG. 10) of the rear camera of the smartphone 5 is sufficiently distant from the housing of the special image capturing device 1, and therefore, the rear camera of the smartphone 5 does not capture an image of, for example, a shadow of the special image capturing device 1, namely, a shadow of the housing or light reflection, for example. However, the distance between the lens of the smartphone 5 and the lens of the special image capturing device 1 is long (the parallax is large), and therefore, an image generated by the smartphone 5 superimposing a planar image on a spherical image may have unnatural look.

In FIG. 28B, the distance between the lens of the rear camera of the smartphone 5 and the special image capturing device 1 is short, and therefore, an image generated by the smartphone 5 superimposing a planar image on a spherical image is less likely to have unnatural look. However, vignetting in which the rear camera of the smartphone 5 captures an image of, for example, a shadow of the special image capturing device 1 may occur. If the angle of view becomes narrow as a result of zooming of the smartphone 5, vignetting does not occur.

Accordingly, in a case where the position of the lens of the smartphone 5 relative to the housing of the special image capturing device 1 and the focal length satisfy conditions under which vignetting occurs, the smartphone 5 according to this embodiment does not perform superimposed display for a portion in which vignetting occurs.

Figure 29:
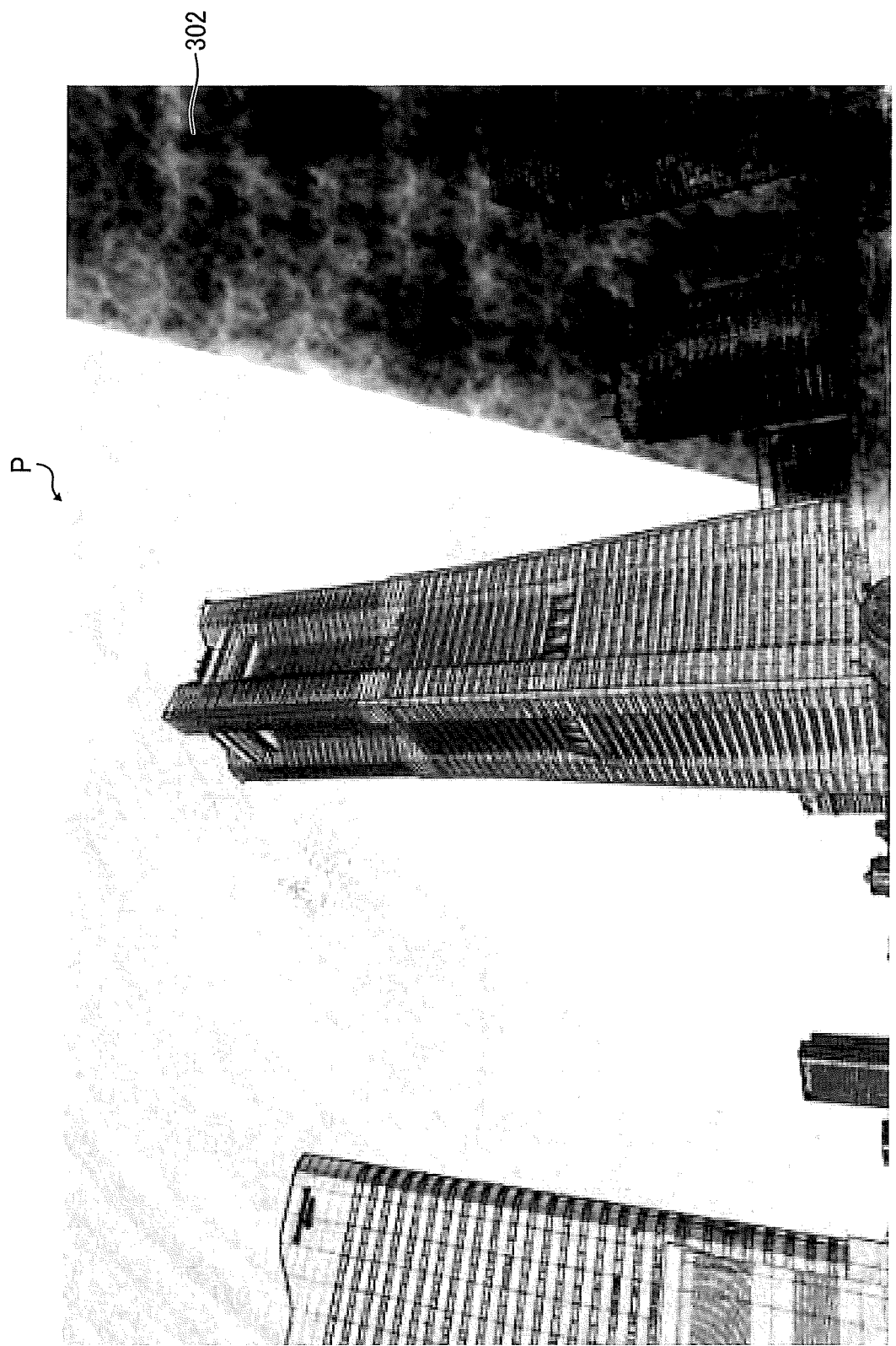
FIG. 29 is a diagram illustrating an example planar image in which vignetting occurs.

FIG. 29 is a diagram illustrating an example of the planar image P in which vignetting occurs. As illustrated in FIG. 28B, in a case where the special image capturing device 1 is located to the left of the rear camera of the smartphone 5 when viewed from the rear camera, for example, a shadow (vignetting area 302) appears in a right end portion of the planar image P. The portion in which, for example, a shadow appears has low image quality and low visibility. Accordingly, it is desirable not to use this portion for superimposition.

<First Measure against Vignetting>

Referring to FIGS. 30A to 32, a first example of image processing, in view of vignetting, is described. In a case where the position of the special image capturing device 1 relative to the smartphone 5 is fixed and the focal length of the smartphone 5 remains unchanged, an area in which vignetting occurs (vignetting area 302) remains unchanged. Therefore, for example, a developer or a user can set in advance information about the vignetting area 302 in, for example, the smartphone 5 as superimposed area information. For example, the information about the vignetting area 302 is stored in advance in the memory 5000 of the smartphone 5 as the superimposed area information 5002. Alternatively, the smartphone 5 may download such information from a server on a communication network.

Figure 30A:
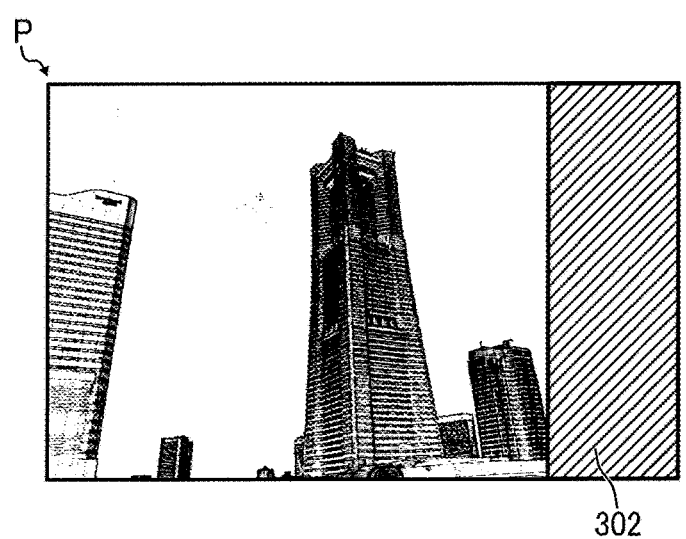
FIGS. 30A to 30C are example diagrams for describing operation of retaining information about a vignetting area in superimposed display metadata.
Figure 30B:
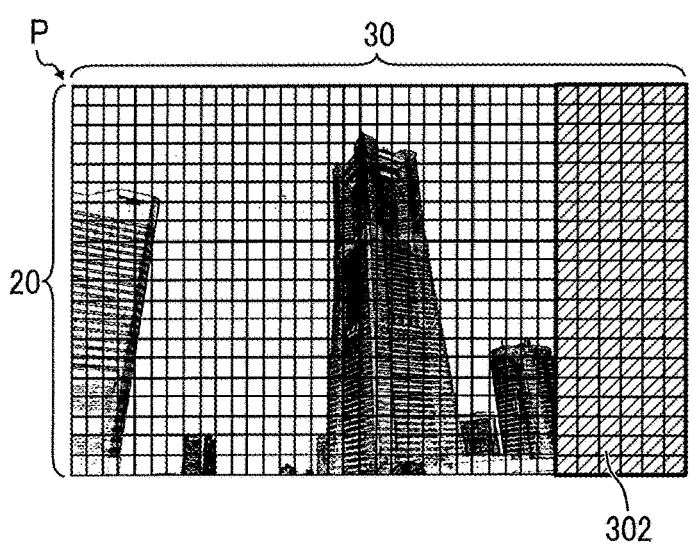
Figure 30C:
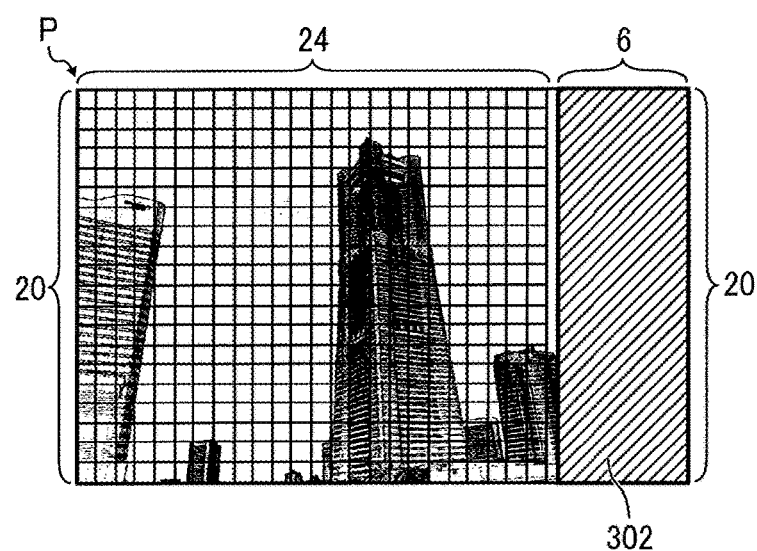

FIGS. 30A to 30C are example diagrams for describing a method for retaining the information about the vignetting area 302 in the superimposed display metadata illustrated in FIG. 14. FIG. 30A illustrates the planar image P captured by the smart phone 5, with the vignetting area 302. FIG. 30B illustrates an example of the planar image P illustrated in FIG. 30A that is divided into areas. The location parameter and the correction parameter included in the superimposed display metadata each include parameters for 30×20 areas. The grid areas illustrated in FIG. 30B correspond to the grid areas specified in the location parameter and in the correction parameter, and therefore, each area illustrated in FIG. 30B directly corresponds to a corresponding one of the grid areas specified in the location parameter and in the correction parameter.

Here, it is assumed that the vignetting area 302 is constituted by six areas in the horizontal direction and 20 areas in the vertical direction. Then, as illustrated in FIG. 30C, among the areas specified in the location parameter and in the correction parameter included in the superimposed display metadata, 24×20 areas that constitute a portion where no vignetting occurs (non-vignetting area) are specified in the superimposed area information. The superimposed display metadata generator 570 sets the superimposed area information 5002 stored in the memory 5000 in the superimposed display metadata in the encoding process, as illustrated in FIG. 31 described below.

Accordingly, the image and audio processing unit 55 of the smartphone 5 determines areas, among the grid areas specified in the location parameter and in the correction parameter, for which superimposition or a color correction is to be performed while referring to the superimposed area information. That is, areas other than the 24×20 areas are not used in superimposition or a color correction.

FIG. 31 is a diagram illustrating an example of the superimposed display metadata used in a first example of excluding a vignetting area of the planar image. When compared with FIG. 14, the superimposed display information additionally includes superimposed area information. The superimposed area information includes horizontal (latitude) start/end positions and vertical (longitude) start/end positions. The superimposed area information is used to specify an area in the planar image P to be used for determining an area of the planar image to be superimposed with the equirectangular image. The horizontal (latitude) start/end positions indicate the start position and the end position, in the horizontal direction, of a non-vignetting area in which image quality is not low, in the area constituted by the 30 areas divided in the horizontal direction as indicated by the area division number information. In FIG. 31, (0, 24) is found, which indicates an area from the leftmost area to the 24th area. Alternatively, the horizontal (latitude) start/end positions may indicate the start position and the end position, in the horizontal direction, of a vignetting area in which image quality is low.

The vertical (longitude) start/end positions indicate the start position and the end position, in the vertical direction, of a non-vignetting area in the area constituted by the 20 areas divided in the vertical direction as indicated by the area division number information. In FIG. 31, (0, 20) is found, which indicates an area from the topmost area to the 20th area.

Now, the decoding process is described. For grid areas, among the grid areas specified in the location parameter, included in the area indicated by the superimposed area information included in the superimposed display metadata, the superimposing unit 55b of the image and audio processing unit 55 (the image generator 586) extracts a corresponding area of the planar image and superimposes the area on the spherical image. For grid areas, among the grid areas specified in the location parameter, not included in the area indicated by the superimposed area information included in the superimposed display metadata, the superimposing unit 55b of the image and audio processing unit 55 (the image generator 586) does not superimpose the corresponding area of the planar image on the spherical image. The same applies to the correction parameter.

In the superimposed area information, a non-vignetting area is set; however, the vignetting area 302 may be set. For example, a developer or a user can actually capture an image using the image capturing system 200 according to this embodiment, visually check the vignetting area 302, and define in advance the vignetting area 302 in the superimposed area information.

Figure 32:
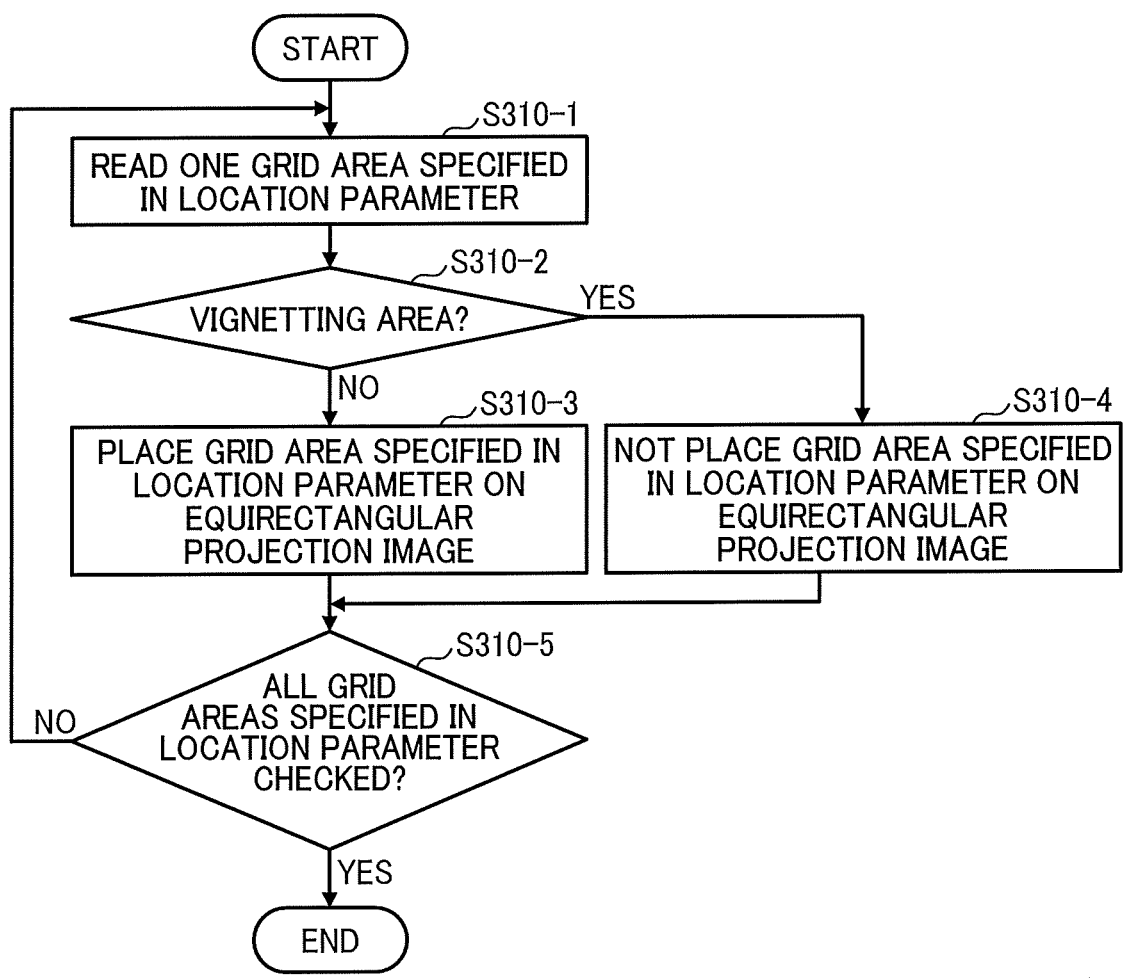
FIG. 32 is a flowchart illustrating example operation of superimposing a planar image on an equirectangular projection image with reference to superimposed area information included in superimposed display metadata.

FIG. 32 is an example flowchart for describing a process in which the image generator 586 places a planar image on an equirectangular projection image with reference to the superimposed area information in the superimposed display metadata. This process is performed in step S310 in FIG. 22.

The image generator 586 reads one of the areas specified in the location parameter (step S310-1).

The image generator 586 determines whether the one of the areas specified in the location parameter is included in the vignetting area 302 with reference to the superimposed area information (step S310-2).

If the determination in step S310-2 results in No, the image generator 586 places the area, of the planar image P, specified in the location parameter on the equirectangular projection image (step S310-3). More specifically, the image generator 586 adds the area specified in the location parameter to the mask data M.

If the determination in step S310-2 results in Yes, the image generator 586 does not place the area specified in the location parameter on the equirectangular projection image (step S310-4). More specifically, the image generator 586 does not add the area specified in the location parameter to the mask data M.

The image generator 586 determines whether the image generator 586 checks all of the areas specified in the location parameter (step S310-5).

If the determination in step S310-5 results in No, the process returns to step S310-1. If the determination in step S310-5 results in Yes, the process in FIG. 32 ends.

The vignetting area changes in accordance with the focal length of the smartphone 5, and therefore, it is desirable to set the superimposed area information for each focal length. In the superimposed display metadata, for example, the superimposed area information may be set for a focal length range as follows.

Focal length range 1: Superimposed area information 1
Focal length range 2: Superimposed area information 2
. . .
Focal length range n: Superimposed area information n As indicated above, when the superimposed area information is set for each range of the focal length, the image generator 586 reads the superimposed area information in accordance with the focal length of the rear camera of the smartphone 5 and place the planar image P on the equirectangular projection image EC.

<Second Measure Against Vignetting>

The above-described first example of image processing in view of vignetting can be taken on the condition that the vignetting area 302 in the predetermined area constituted by 20×30 areas is selected and that the vignetting area 302 is a rectangular area. In a second example, the non-vignetting area is specified using coordinate points as described below. First, the encoding is described.

Figure 33A:
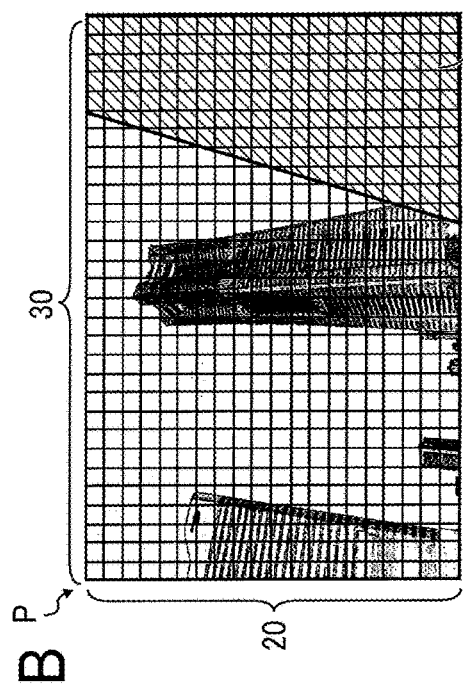
FIGS. 33A to 33D are example diagrams for describing a method for retaining information about a vignetting area in superimposed display metadata.
Figure 33B:
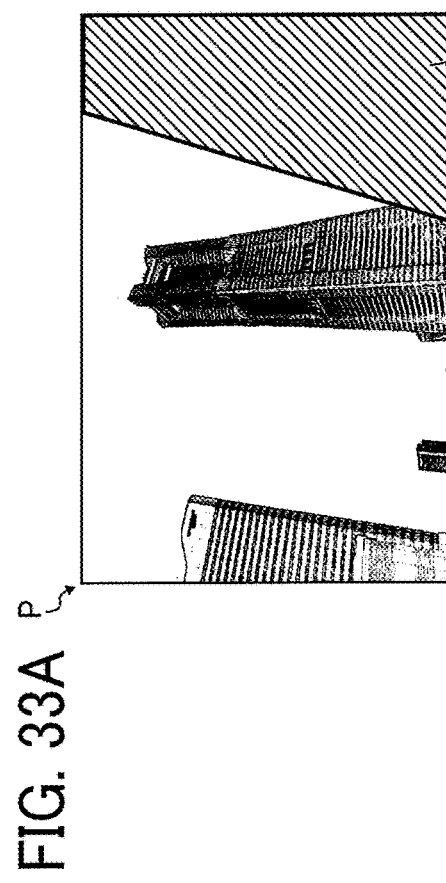
Figure 33C:
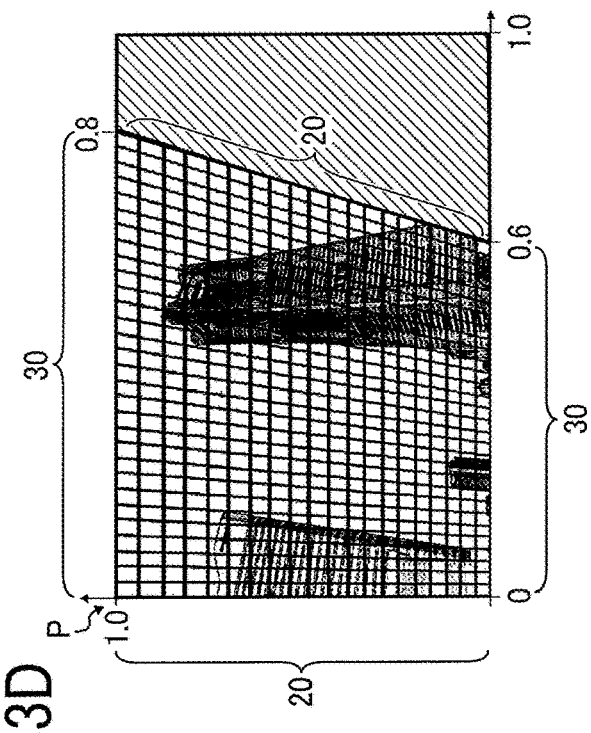
Figure 33D:
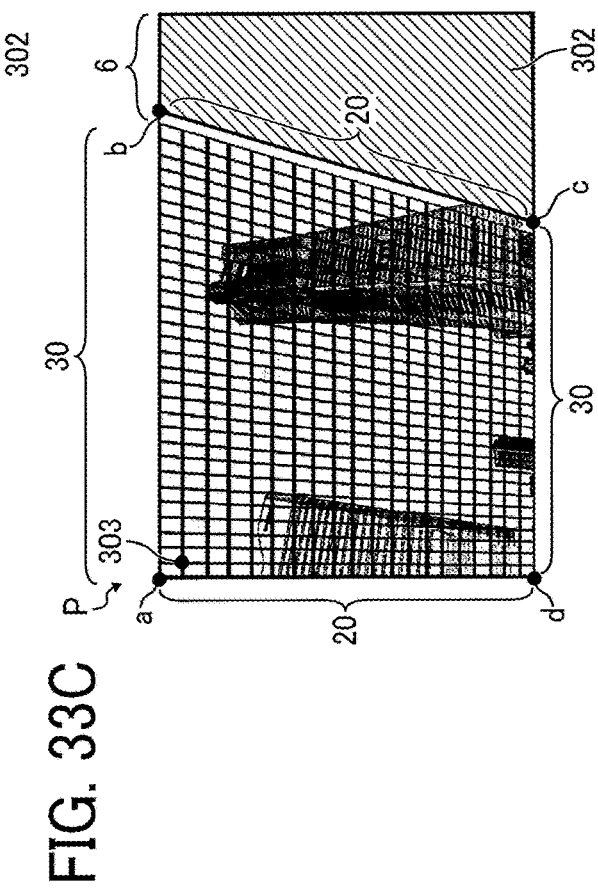

FIGS. 33A to 33D are example diagrams for describing a method for retaining information about the vignetting area 302 in the superimposed display metadata. FIG. 33A illustrates the planar image P and the vignetting area 302. FIG. 33B illustrates the planar image P that is divided into 20×30 areas. FIG. 33C illustrates an example of the planar image P in which a non-vignetting area is divided into 20×30 areas. Also in the examples illustrated in FIGS. 33A to 33D, the portion in which vignetting occurs remains unchanged.

As illustrated in FIG. 33A, the vignetting area 302 has a trapezoidal shape. The superimposed display metadata generator 570 first divides the non-vignetting area equally. The number of divisions in the longitudinal direction and that in the lateral direction are set in advance as found in the superimposed display metadata illustrated in FIG. 31.

The portion in which vignetting occurs remains unchanged, and therefore, the coordinates of the four vertices a, b, c, and d of the non-vignetting area illustrated in FIG. 33C are stored in the memory 5000 (as in the superimposed area information used in the first example of excluding a vignetting area). The superimposed display metadata generator 570 uses the coordinates to perform a process as follows.

(i) The superimposed display metadata generator 570 equally divides the side connecting the vertex a with the vertex b of the non-vignetting area into a specific number of segments, and equally divides the side connecting the vertex d with the vertex c of the non-vignetting area into the specific number of segments, the specific number being the number of divisions in the horizontal (longitude) direction in the area division number information.

(ii) The superimposed display metadata generator 570 equally divides the side connecting the vertex a with the vertex d of the non-vignetting area into a specific number of segments, and equally divides the side connecting the vertex b with the vertex c of the non-vignetting area into the specific number of segments, the specific number being the number of divisions in the vertical (latitude) direction in the area division number information.

(iii) The superimposed display metadata generator 570 connects each of the points obtained by dividing the top side of the non-vignetting area with a corresponding one of the points obtained by dividing the opposite bottom side of the non-vignetting area with a straight line sequentially from the left or from the right, and connects each of the points obtained by dividing the left side of the non-vignetting area with a corresponding one of the points obtained by dividing the opposite right side of the non-vignetting area with a straight line sequentially from the top or from the bottom. As a result, the non-vignetting area is divided into a plurality of areas.

(iv) The superimposed display metadata generator 570 uses an equation expressing each straight line used in the division, which is known, to determine the points of intersection of the straight lines to be vertices 303. In FIG. 33C, only one vertex 303 is illustrated for convenience of description. From the points of intersections of the straight lines, the coordinates of the vertices 303 of the 21×31 areas are calculated.

In the field of computer graphics, image data that is used to superimpose and display an image is usually called a texture image. Also in this embodiment, a superimposed image used in superimposed display on a spherical image is called a texture image. In OpenGL described above, the coordinate system for a texture image is called a texture UV coordinate system, which is a coordinate system in which each of the width and the height of an image is normalized and expressed by a value between 0 and 1. Also in the embodiments of the present invention, the coordinate system for a texture image is called a texture UV coordinate system or simply a UV coordinate system. The superimposed display metadata generator 570 includes the 21×31 sets of UV coordinates thus calculated in the superimposed display metadata. The coordinates of the vignetting area 302 are also known from the coordinates of the vertices a, b, c, and d, and therefore, the superimposed display metadata generator 570 may include the coordinates of the vignetting area 302 in the superimposed display metadata.

In this embodiment, the UV coordinate specifies a position in the planar image P, which corresponds to each locational coordinate, indicated by each grid point in FIG. 33C. As described above, the UV coordinate is a coordinate system in which each of the width and the height of the image is normalized to be expressed by a value between 0 and 1. Specifically, assuming that the width and the height of the planar image P are expressed as Pw and Ph, and the coordinate of a specific point in the planar image P is expressed as (x, y), the UV coordinate is expressed as (x/Pw, y/Ph). It is assumed that the lower left of the planar image P is expressed as (0, 0). FIG. 34D illustrates the planar image P expressed in UV coordinate. The top side of the rectangular texture image, ranging from the value 0 to 0.8 in the horizontal direction, is equally divided into 30. The bottom side of the texture image, ranging from the value 0 to 0.6 in the horizontal direction, is equally divided into 30. The right side and the left side of the texture image, each ranging from 0 to 1.0, are each divided into 20. The UV coordinates correspond, respectively, to the location parameter indicated by grid points, or vertices, illustrated in FIG. 33C. Such UV coordinates are used in the decode process, such as to superimpose the texture image. In a substantially similar manner as described above referring to FIG. 15A for obtaining gain data, the correction values for brightness and color are obtained for respective grid points obtained by dividing the texture image into grid areas as illustrated in FIG. 33C.

Now, the decode process is described. The image generator 586 refers to the location parameter and the texture UV coordinates, to superimpose the planar image onto the equirectangular image. By referring to locational coordinates (location parameters) corresponding to the non-vignetting area, and the UV coordinates corresponding to the locational coordinates (location parameters), only the non-vignetting area of the planar image P is superimposed on the equirectangular image.

With the method described with reference to FIGS. 33A to 33D, vignetting having a complex shape can be handled by, for example, a user or a developer appropriately setting the UV coordinates.

FIG. 34 illustrates an example of the superimposed display metadata used in the second example of excluding a vignetting area. When compared with FIG. 14, the superimposed display information additionally includes UV coordinates. The UV coordinates include the coordinates of each of the points of intersection obtained by equally dividing the non-vignetting area as illustrated in FIG. 33C.

Figure 35:
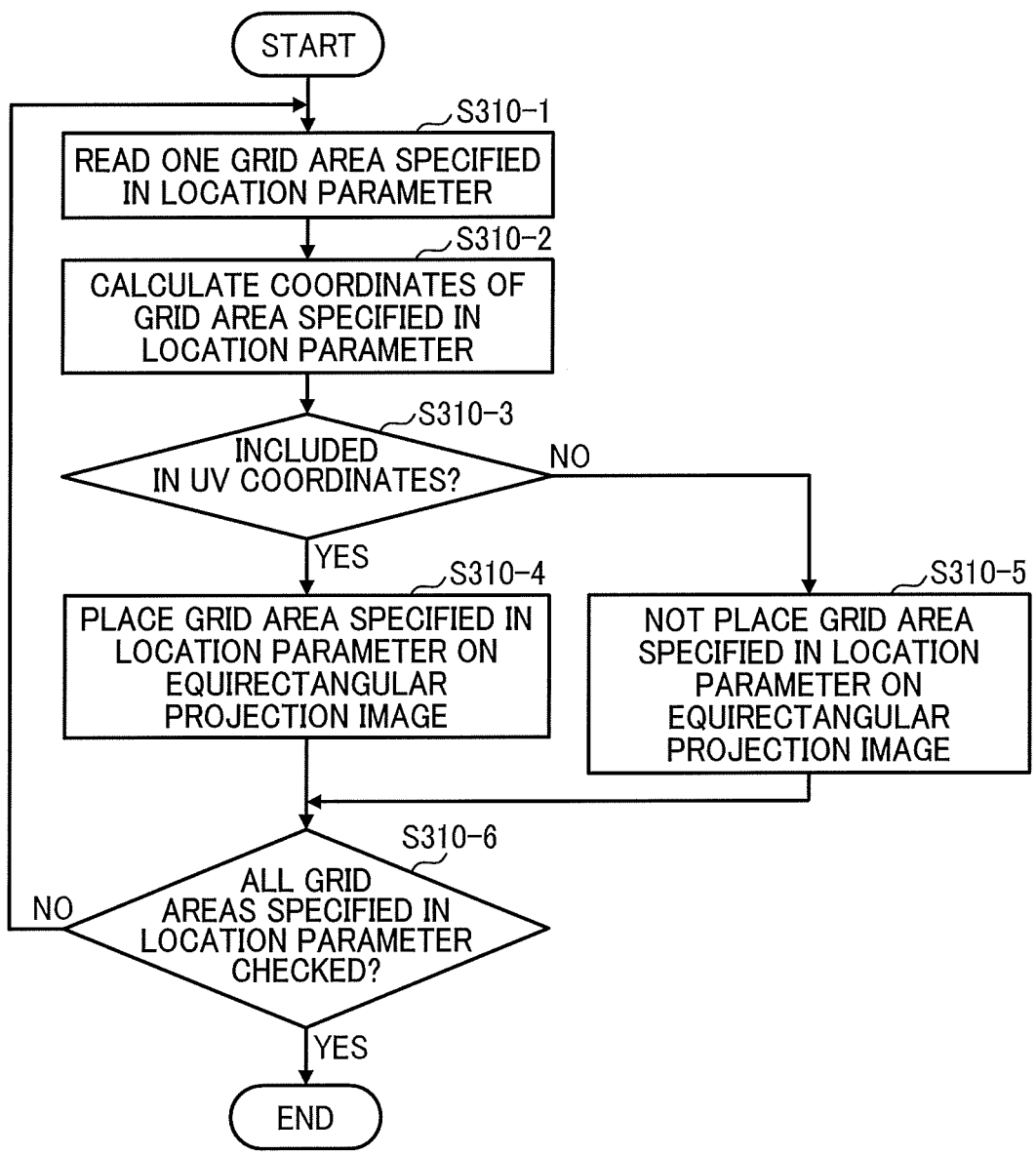
FIG. 35 is a flowchart illustrating example operation of superimposing a planar image on an equirectangular projection image with reference to superimposed area information included in superimposed display metadata.

FIG. 35 is an example flowchart for describing a process in which the image generator 586 places a planar image on an equirectangular projection image with reference to the superimposed area information in the superimposed display metadata. This process is performed in step S310 in FIG. 22.

The image generator 586 reads one of the grid areas specified in the location parameter (step S310-1).

The image generator 586 calculates the coordinates of the grid area specified in the location parameter (step S310-2). The image generator 586 calculates, for example, the coordinates of the four vertices of the grid area.

The image generator 586 determines whether the coordinates of the grid area specified in the location parameter is included in the UV coordinates in the superimposed display metadata (step S310-3). The image generator 586 determines, for example, whether the coordinates of all of the four vertices of the grid area specified in the location parameter are within an area defined by the UV coordinates.

If the determination in step S310-3 results in Yes, the image generator 586 places the grid area specified in the location parameter on the equirectangular projection image (step S310-4). More specifically, the image generator 586 adds the grid area specified in the location parameter to the mask data M.

If the determination in step S310-3 results in No, the image generator 586 does not place the grid area specified in the location parameter on the equirectangular projection image (step S310-5). More specifically, the image generator 586 does not add the grid area specified in the location parameter to the mask data M.

The image generator 586 determines whether the image generator 586 checks all of the grid areas specified in the location parameter (step S310-6).

If the determination in step S310-6 results in No, the process returns to step S310-1. If the determination in step S310-6 results in Yes, the process in FIG. 35 ends.

Also in the second example of excluding a vignetting area, it is desirable to set the UV coordinates for each focal length of the smartphone 5.

<Determination of Point of Gaze using Locational Relation Information>

The relative position of the lens of the smartphone 5 and that of the lens of the special image capturing device 1 may be used to determine a point on a spherical image to which the center of a planar image captured by the smartphone 5 corresponds. The corresponding point is called a point of gaze Gp. If the point of gaze Gp is determined, projection transformation is performed for each area of the peripheral area PA determined in accordance with the focal length to thereby generate the superimposed display metadata.

Figure 36:
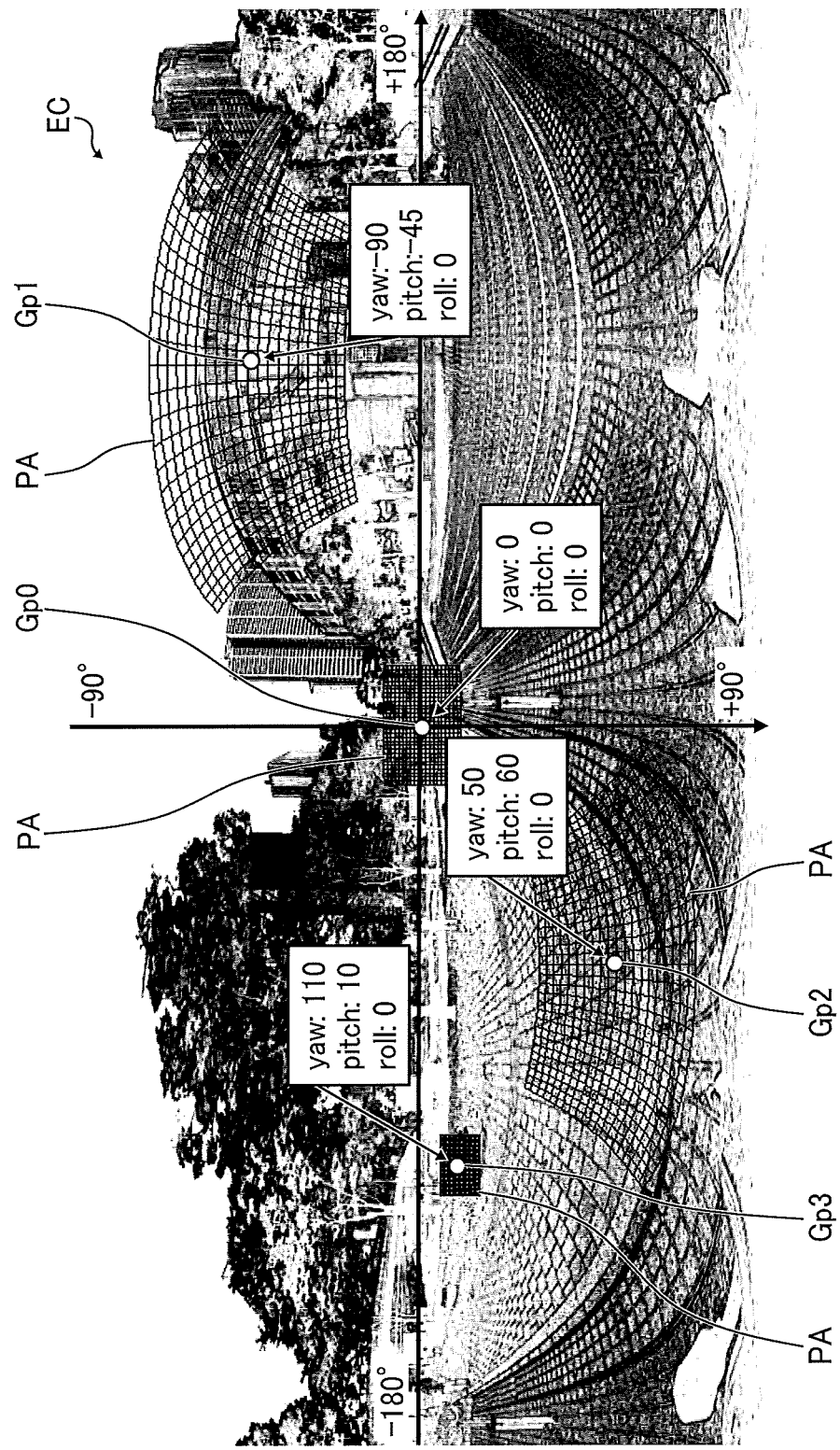
FIG. 36 is an example diagram for describing a point of gaze.

FIG. 36 is an example diagram for describing the point of gaze Gp. FIG. 36 illustrates the point of gaze Gp at each relative position in the equirectangular projection image EC and the peripheral area PA around each point of gaze Gp. The center of the spherical image corresponds to the center of the lens of the special image capturing device 1. Each relative position is expressed by yaw, pitch, and roll angles. In a case where the lens of the smartphone 5 and the lens of the special image capturing device 1 oriented in completely the same direction, yaw=0, pitch=0, and roll=0 are satisfied, and the point of gaze Gp0 matches the center of the spherical image.

In a case of yaw=−90, pitch=−45, and roll=0, the point of gaze Gp1 is present in an upper right portion of the equirectangular projection image EC. The coordinate system of yaw and positive/negative of yaw do not match because of the way of defining the coordinate system. In a case of yaw=50, pitch=60, and roll=0, the point of gaze Gp2 is present in a lower left portion of the equirectangular projection image EC. In a case of yaw=110, pitch=10, and roll=0, the point of gaze Gp3 is present to the left of the point of gaze Gp0.

The point of gaze Gp may be calculated by taking into consideration the locational relation between the lenses, the focal length, and so on in addition to yaw, pitch, and roll.

Figure 37:
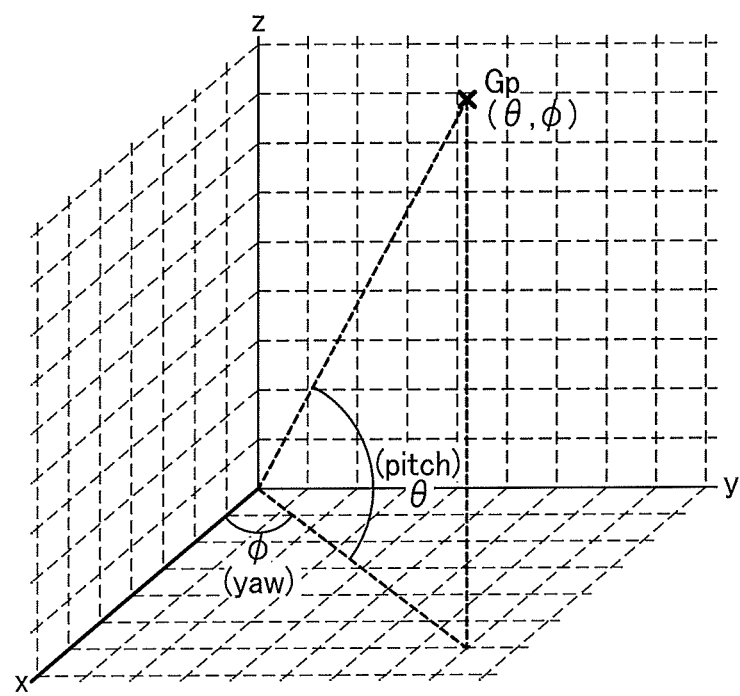
FIG. 37 is an example diagram illustrating correspondences between yaw, pitch, and a point of gaze.

FIG. 37 is an example diagram for describing correspondences among yaw, pitch, and the point of gaze Gp. When the image capturing position is assumed to remain the same, yaw and pitch respectively correspond to the latitude and longitude, and the latitude and longitude are converted to the coordinates of the equirectangular projection image to thereby calculate the point of gaze Gp.

The relative position of the smartphone 5 and that of the special image capturing device 1 are fixed, and therefore, the smartphone 5 may store in advance information about the point of gaze Gp in the memory 5000. Accordingly, the metadata generator 55a need not calculate the point of gaze Gp.

Figure 38A:
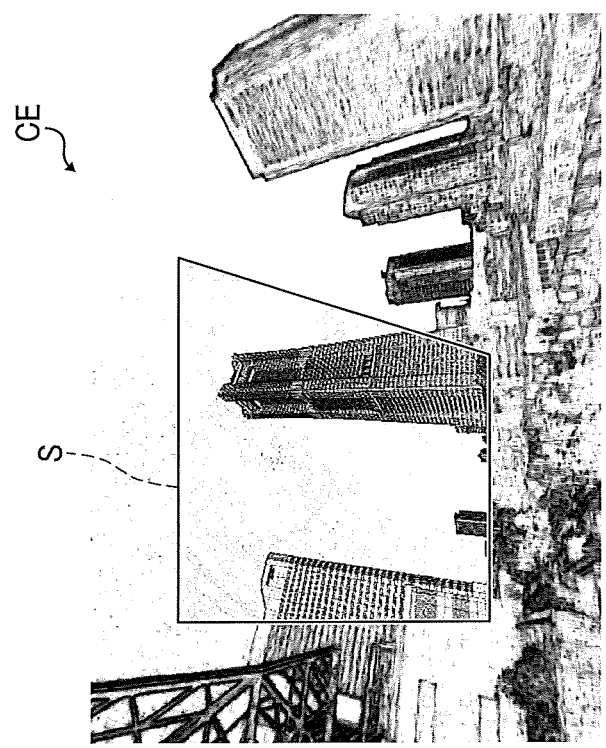
FIGS. 38A and 38B are example diagrams for describing an effect produced by not superimposing a vignetting area.
Figure 38B:
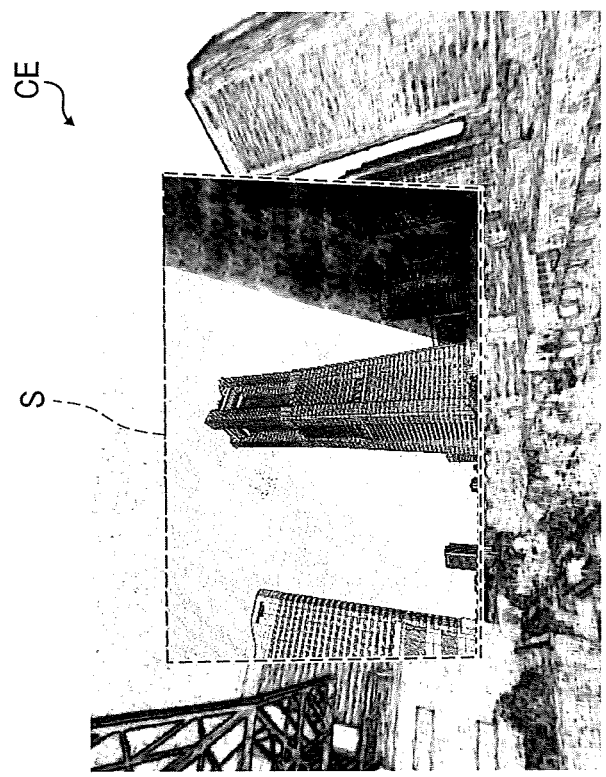

An effect produced by not superimposing a vignetting area is described with reference to FIGS. 38A and 38B. FIG. 38A is provided for a comparison and illustrates the spherical image CE in a case where the vignetting area is included and superimposition is performed. In FIG. 38A, the vignetting area is also superimposed. FIG. 38B illustrates the spherical image CE in a case where the vignetting area is excluded and superimposition is performed. In FIG. 38B, the vignetting area is not superimposed, and therefore, the user is less likely to view the planar image having low image quality or feel unnatural about vignetting.

In the series of processes illustrated in FIG. 17 for generating the location parameter in the superimposed display metadata, the processes from steps S110 to S130 need not be performed, resulting in a decrease in the time taken to calculate the location parameter. Further, it is less likely to calculate the location parameter that is not correct.

That is, the point of gaze Gp can be calculated by the smartphone 5 from its relative position, or information about the point of gaze Gp is stored in advance in the memory 5000, and therefore, the process in step S110 performed by the extractor 550 (extraction of a plurality of feature points in the equirectangular projection image EC and in the planar image P), the process in step S120 performed by the first area calculator 552 (first homography transformation), and the process in step S130 performed by the point of gaze specifier 554 (determination of the point of gaze GP1) can be omitted.

<Correction of Distortion due to Lens Aberration>

In this embodiment, a decrease in image quality due to vignetting has been described by using the texture UV coordinates. The texture UV coordinates can be used to suppress a decrease in image quality due to a factor other than vignetting. Example application to a planar image that is distorted due to a lens aberration is described.

In a case where the planar image P that is captured by the smartphone 5 and that is distorted due to a lens aberration is placed on the sphere CS, a noticeable shift is visible specifically on the boundary, which may result in a decrease in image quality.

Figure 39:
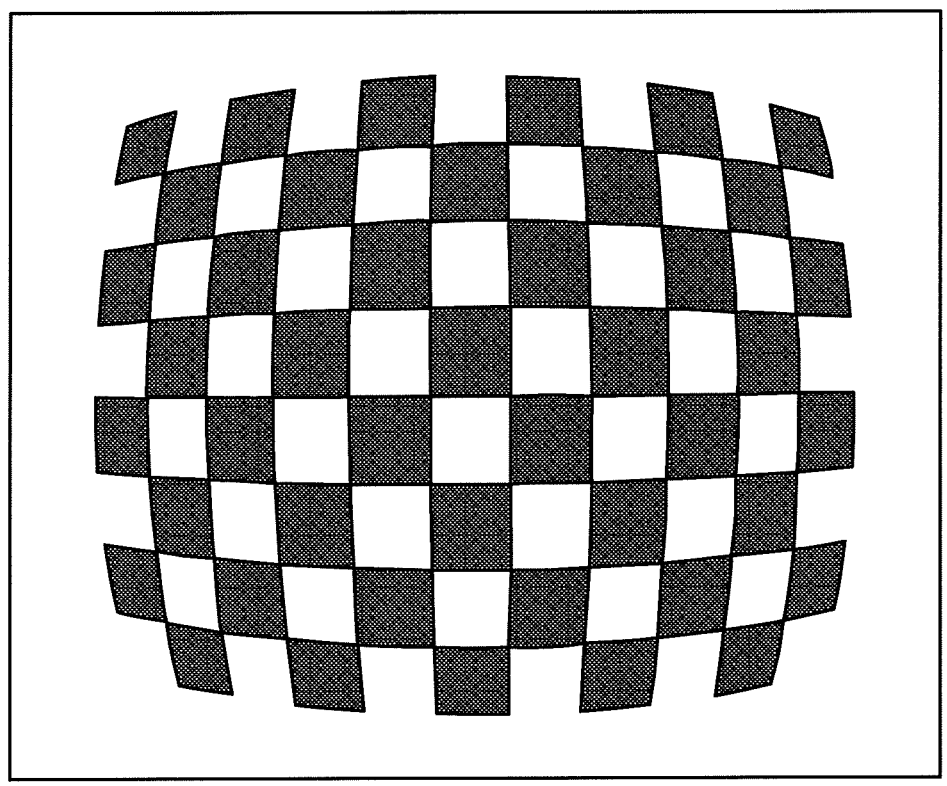
FIG. 39 is a diagram illustrating an example of a distorted planar image.

FIG. 39 is a diagram illustrating an example of the planar image P that is distorted. The planar image P that is an image of a grid pattern is illustrated for easily recognizing distortion. If the lens is not distorted at all, an image of the grid pattern includes an array of squares arranged in the longitudinal direction and in the lateral direction. However, the illustrated image is an image distorted due to a lens aberration in which the center portion is enlarged and the perimeter portion is reduced. The distortion illustrated in FIG. 39 is an example, and an image is distorted differently depending on the lens.

Figure 40B:
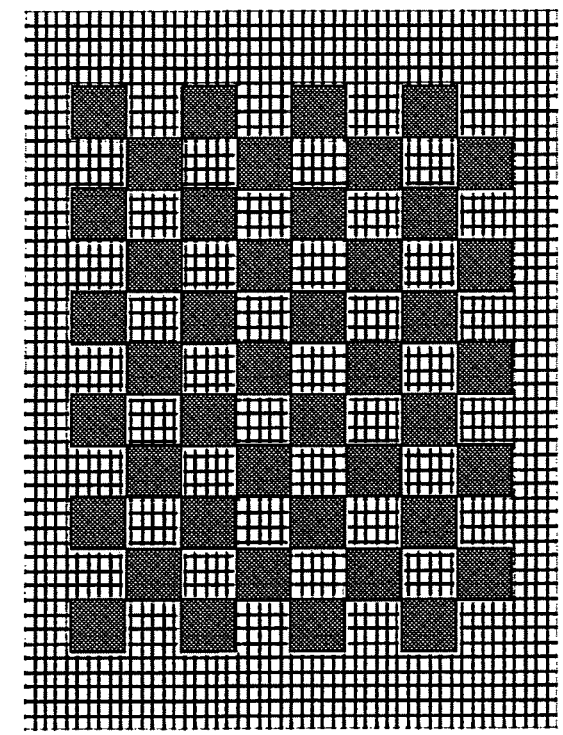
FIGS. 40A and 40B are example diagrams illustrating a correspondence between texture UV coordinates and a location parameter.
Figure 40A:
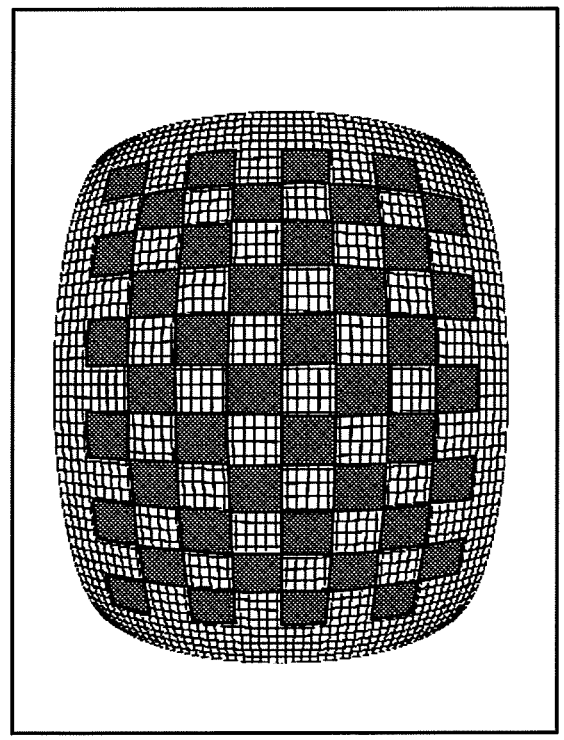

FIGS. 40A and 40B are example diagrams illustrating a correspondence between texture UV coordinates and a location parameter. FIG. 40A is a diagram illustrating 51×51 sets of texture UV coordinates obtained by dividing the planar image P that is distorted into 50×50 areas. FIG. 40B is a diagram schematically illustrating the planar image P that is corrected and placed on a partial sphere on the basis of a correspondence between the position of each of the grid points (in this example, 51×51 grid points) specified in the location parameter and a corresponding one of the sets of UV coordinates.

That is, the 51×51 grid points indicated by the sets of UV coordinates correspond to the 51×51 grid points specified in the location parameter. If the planar image P is superimposed using the location parameter as is, the planar image P is distorted, as illustrated in FIG. 40A. Therefore, for example, a developer of the image capturing system 200 creates in advance a parameter for correcting distortion due to the lens for each of the grid points specified in the location parameter. For example, corrected coordinates of each grid point are simply used as the parameter for correcting distortion due to the lens. In a case of superimposition, the superimposing unit 55b performs, for example, projection transformation of the planar image P for each grid area to thereby correct the distortion. As the parameter for correcting the distortion due to the lens, UV coordinates are used.

As a method for calculating the parameter for correcting distortion due to the lens (in this embodiment, a coefficient for calculating corrected texture UV coordinates), methods using existing techniques are available. In one example method, for example, a computer or an image capturing device captures an image of a grid pattern using a target lens a plurality of times while changing the image capturing position. Then, corresponding points in the plurality of captured images are used to calculate an internal parameter, an external parameter, and a distortion aberration coefficient of the camera. The details of such camera calibration are described in, for example, Zhang, Z. "A Flexible New Technique for Camera Calibration." IEEE Transactions on Pattern Analysis and Machine Intelligence. Vol. 22, No. 11, 2000, pp. 1330-1334, which is hereby incorporated by reference herein. Such a method is also included in Open Source Computer Vision Library (OpenCV), which is a general-purpose program library.

As illustrated in FIGS. 40A and 40B, 50×50 rectangles in the distorted grid pattern in FIG. 40A are corrected to squares. When the sets of texture UV coordinates are appropriately specified, the superimposing unit 55b can place the planar image P for which distortion has been corrected on a partial sphere.

Figure 41B:
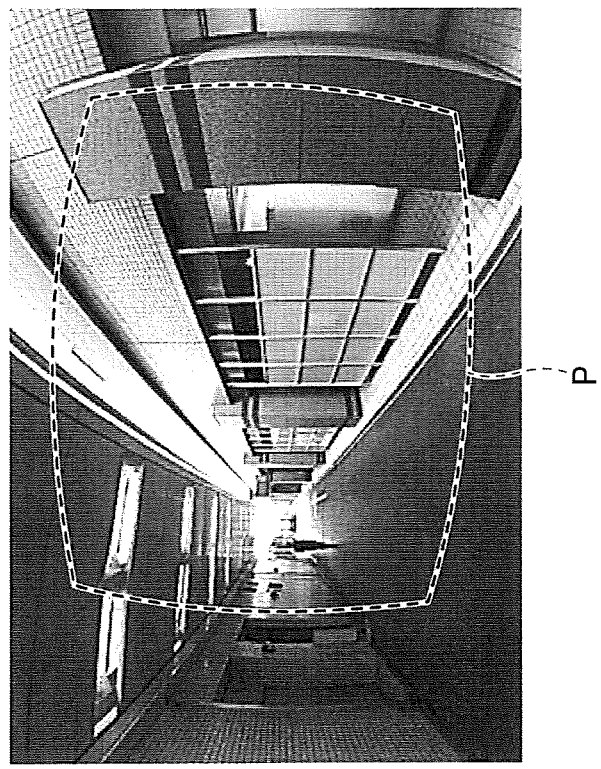
FIGS. 41A and 41B are example diagrams for describing an effect of a distortion correction.
Figure 41A:
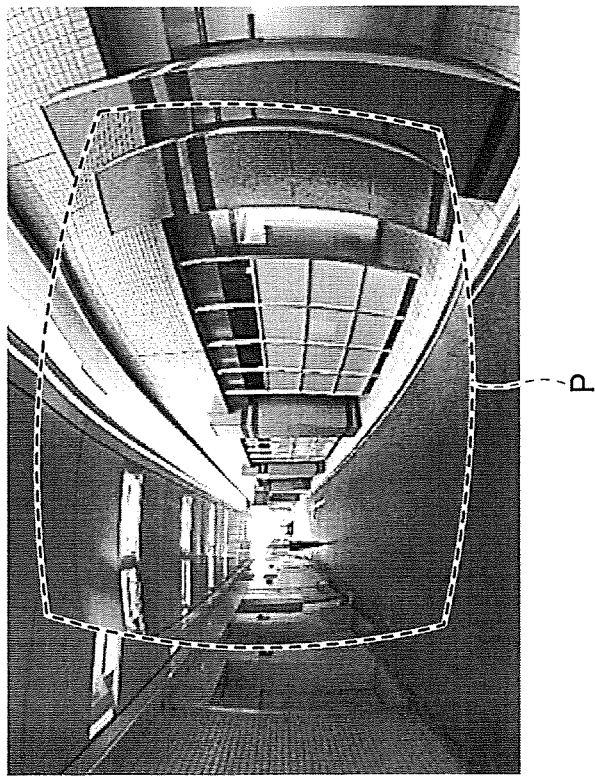

FIGS. 41A and 41B are example diagrams for describing an effect of a distortion correction. FIG. 41A illustrates an example of a partial sphere on which the planar image P is placed without taking into consideration distortion, and FIG. 41B illustrates an example of a partial sphere on which the planar image P is placed on the basis of texture UV coordinates for which a distortion correction has been performed. In FIGS. 41A and 41B, the area outlined by the dashed line corresponds to the placed planar image P.

In FIG. 41A, the distortion of the planar image P and the distortion of the spherical image do not match, and a noticeable shift is visible around the boundary, resulting in a decrease in image quality. In FIG. 41B, the shift around the boundary between the spherical image and the planar image P is significantly reduced, the distortion of the planar image P is corrected, and the quality of the spherical image on which the planar image P is superimposed increases.

As described above, the texture UV coordinates can be used to exclude vignetting and to correct distortion.

<Example Structures of Superimposed Display Metadata for a Plurality of Superimposed Images>

Now, superimposed display metadata in a case where a plurality of superimposed images (planar images) are present is described. FIG. 42 is a diagram illustrating an example structure of superimposed display metadata in a case where N planar images P are present. The superimposed display metadata illustrated in FIG. 14 is metadata for one planar image P, and therefore, includes one piece of planar image information and one piece of superimposed display information. In the case where N planar images P are present, planar image information and superimposed display information are set for each of the planar images P.

In the display process, the superimposed area generator 582 generates the partial sphere PS corresponding to the third area CA3 on the virtual sphere CS based on the superimposed display information about each of the planar images P. The plurality of planar images P are present, and therefore, a plurality of partial spheres are generated.

Subsequently, the correction unit 584 corrects the brightness and color of each of the planar images P to the brightness and color of the equirectangular projection image EC using the correction parameter for the planar image P included in the superimposed display information. The image generator 586 places, on the partial sphere for each of the planar images P, a corresponding corrected image C to generate the superimposed image S.

Also, the mask data M is generated for each of the planar images P. Further, the image generator 586 places the equirectangular projection image EC on the sphere CS to generate the spherical image CE. Then, the image superimposing unit 588 superimposes the superimposed image S and the mask data M created for each of the planar images P on the spherical image CE. As a result, generation of the spherical image CE having a low definition on which the plurality of superimposed images S having a high definition and corrected so that each boundary is not noticeable are superimposed is completed.

Now, superimposed display metadata in which the order of superimposition is set is described. In a case where a plurality of superimposed images (planar images) are set in the superimposed display metadata, the order in which the equirectangular projection image and the planar images are superimposed in the process of superimposed display needs to be determined. In a case where one equirectangular projection image and one planar image are present, the image superimposing unit 588 superimposes the planar image on the equirectangular projection image, and the image that is superimposed later is displayed on the near side. That is, the image superimposing unit 588 first places the equirectangular projection image EC on the sphere CS, and subsequently, superimposes the superimposed image S generated from the planar image P together with the mask data M. Therefore, the order of superimposition is automatically determined.

In a case where a plurality of superimposed images (planar images) are present and some or all of the plurality of planar images overlap, a planar image that is superimposed later is displayed on the near side, and an image on the far side is not visible in the overlapping portion. Therefore, the order in which the images are superimposed needs to be determined carefully, and it is desirable that information for specifying the order in which the images are superimposed be provided.

FIG. 43 is a diagram illustrating an example structure of superimposed display metadata that includes superimposition order information. The superimposition order, the equirectangular projection image, and the planar images are associated with one another, and the equirectangular projection image and the planar images are identified using the image identifiers. For example, IMAGE001.JPG, IMGE111.JPG, IMAGE113.JPG, and IMAGE112.JPG are image identifiers. These image identifiers are included in the superimposition order information as an array and, in the display process, the image superimposing unit 588 performs a superimposition process in accordance with the order indicated by the stored array.

In the example illustrated in FIG. 43, the superimposition order information includes [./IMAGE001.JPG, ./IMAGE111.JPG, ./IMAGE113.JPG, ./IMAGE112.JPG]. Therefore, the image superimposing unit 588 first superimposes an equirectangular projection image indicated by ./IMAGE001.JPG. Subsequently, the image superimposing unit 588 superimposes images in accordance with the order ./IMAGE111.JPG, ./IMAGE113.JPG, ./IMAGE112.JPG. In a case where these images overlap at a superimposition position, the image indicated by ./IMAGE112.JPG and superimposed last is displayed nearest.

The order of superimposition may be determined differently depending on application or use of the displayed image and may be specified by a user at their discretion. Alternatively, the order of superimposition may be automatically determined. For example, it is desirable to first superimpose an equirectangular projection image, and thereafter, superimpose planar images sequentially from a planar image captured with the shortest focal length (at the widest angle of view). When planar images are superimposed sequentially from the planar image captured with the shortest focal length, even if planar images overlap at a superimposition position, it is possible to avoid a situation in which an image captured with a longer focal length (an image captured at a smaller angle of view) lies behind another planar image.

<Example Structure of Superimposed Display Metadata for Generating Display Image to be Displayed First>

Now, superimposed display metadata that includes settings for specifying a line-of-sight direction (the image capturing direction of the virtual camera IC) and an angle of view α for first display by the smartphone 5 in superimposed display is described.

FIG. 44 is a diagram illustrating an example structure of superimposed display metadata that includes line-of-sight direction information and angle-of-view information as display start information. As described with reference to FIG. 7, when the positioning of the virtual camera IC is changed, the predetermined area T, which is the image capturing area of the virtual camera IC, changes. For example, in step S370 in FIG. 22, the predetermined area T in the spherical image CE on which the superimposed image S is superimposed is subjected to projection transformation and displayed on the display 517 according to the predetermined line-of-sight direction of the virtual camera IC (the positioning of the virtual camera IC) and the angle of view α of the predetermined area T.

The projection converter 590 refers to the predetermined line-of-sight direction and the angle of view α (initial value), which are included in the superimposed display metadata, as display start information for generating the predetermined-area image that is displayed first.

It is desirable that the user specifies, as desired, a display image generated first, which may differ depending on the application or use of the displayed image for the user. Alternatively, the display start information may be automatically set, which is described below as an example. In a case where one planar image is to be superimposed, the superimposed display metadata generator 570 determines the display start information so that a central point corresponding to the center of the planar image is located at a position corresponding to the center of the predetermined-area image Q.

Accordingly, the central point of the planar image that is superimposed and displayed is converted to the latitude and longitude coordinates (ee, aa) indicating a position on the equirectangular projection image and stored in the superimposed display metadata as the line-of-sight direction information. This conversion is performed by the projection reverse converter 562 described above. The latitude and longitude coordinates indicating a position on the equirectangular projection image are expressed under the assumption that the vertical direction is expressed by the latitude coordinate extending from −90° (−0.5 π) to +90° (+0.5 π) and that the horizontal direction is expressed by the longitude coordinate extending from −180° (−π) to +180° (+π), as described above. As the angle of view α, the diagonal angle of view of the planar image is specified.

In a case where a plurality of planar images are present, positioning direction information needs to be determined for, for example, the planar image captured with the shortest focal length in a similar manner so that the central point of the planar image matches the center of the predetermined-area image. The angle of view needs to be determined similarly. In a case where a plurality of planar images captured with the same focal length are present, a planar image needs to be selected on the basis of the order information specified in the superimposition order information.

As described above, the image capturing system 200 according to this embodiment does not superimpose a predetermined vignetting area on an equirectangular projection image, thus suppressing the decrease in image quality of a planar image superimposed on a spherical image.

In one embodiment, the image processing apparatus (such as the smart phone 5) refers to area specification information, such as superimposed area information, to determine a part of the planar image P to be superimposed on the equirectangular projection image EC. The area specification information may indicate a part of the planar image P to be excluded from superimposition (such as vignetting area), or a part of the planar image P to be superimposed (such as non-vignetting area). More specifically, in one example, the image processing apparatus stores location information and area specification information, as metadata, to be referred to when superimposing the planar image on the equirectangular projection image. In another example, the image processing apparatus generates location information that reflects area specification information, to be referred to when superimposing the planar image on the equirectangular projection image. In such case, in transformation of the second corresponding area from the second projection to the first projection, only a part of the planar image P to be superimposed on the equirectangular projection image EC is taken into consideration. This results in generation of the third corresponding area including only the area to be superimposed on the equirectangular projection image, and generation of local information for such area to be superimposed.

The image capturing system 200 according to this embodiment may correct a distortion in the planar image P using the UV coordinates included in the superimposed display metadata. Further, the image capturing system 200 according to this embodiment may specify the order in which a plurality of planar images are superimposed and the initial value of the line-of-sight direction and that of the angle of view in the superimposed display metadata.

Second Embodiment

According to the second embodiment, the image capturing system 200 in which an image processing server 7 generates superimposed display metadata is described.

Figure 45:
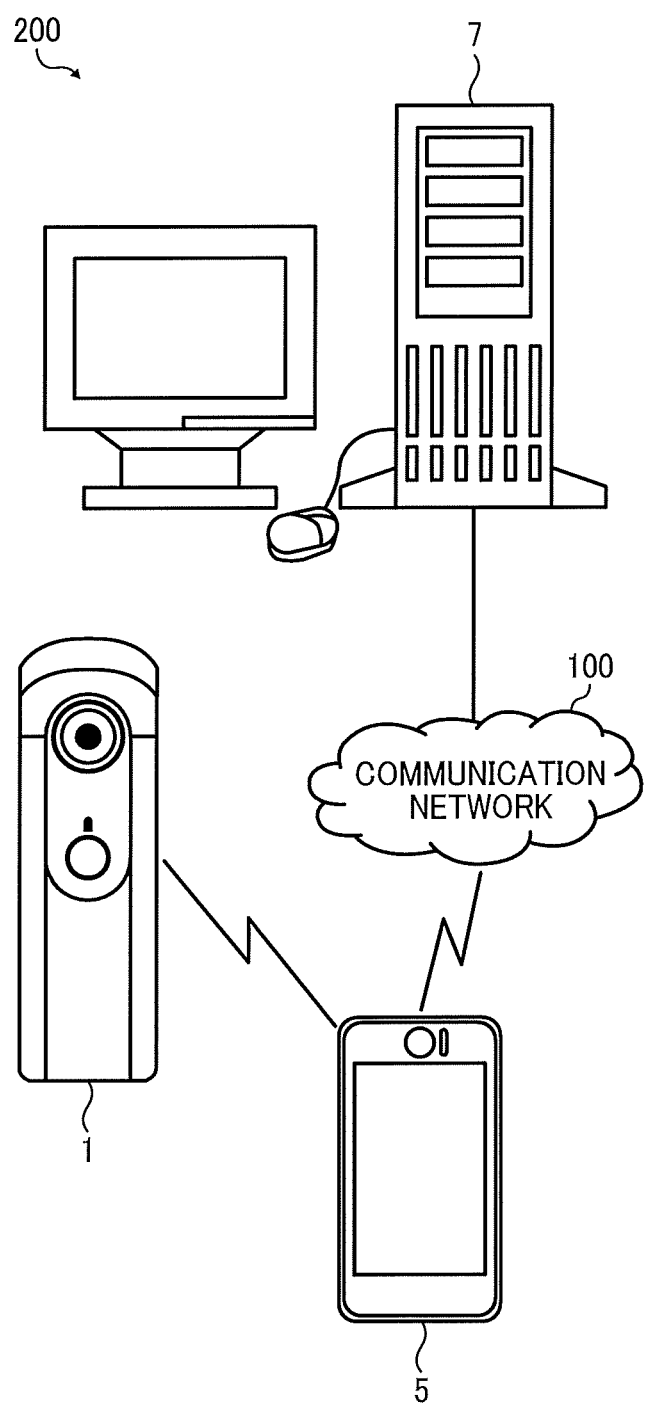
FIG. 45 is an example diagram schematically illustrating a configuration of an image capturing system according to an embodiment.

First, an overall configuration of the image capturing system 200 according to this embodiment is described with reference to FIG. 45. FIG. 45 is a diagram schematically illustrating a configuration of the image capturing system 200 according to this embodiment.

As illustrated in FIG. 45, the image capturing system 200 according to this embodiment further includes the image processing server 7 in addition to the constituent elements according to the first embodiment. The same constituent elements as those in the first embodiment are assigned the same reference numerals, and descriptions thereof will be omitted. The smartphone 5 and the image processing server 7 can communicate with each other via the communication network 100, which is, for example, the Internet or an intranet.

In the first embodiment, the smartphone 5 performs the process for generating superimposed display metadata and the process for superimposing images. In this embodiment, the image processing server 7 performs these processes. In this embodiment, the smartphone 5 is an example of a communication terminal, and the image processing server 7 is an example of an image processing apparatus.

The image processing server 7 is a server computer or may be implemented by using a plurality of server computers performing image processing in a distributed manner.

Figure 46:
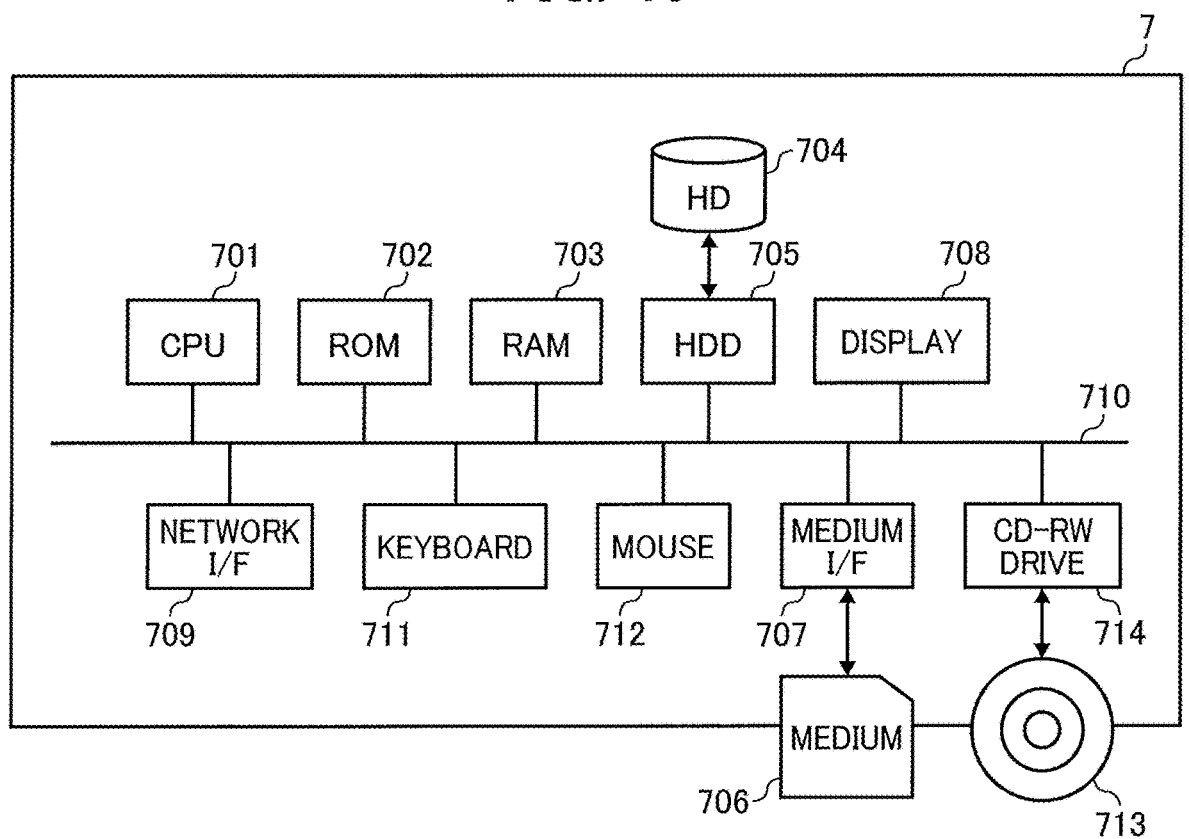
FIG. 46 is an example diagram illustrating a hardware configuration of an image processing server according to the embodiment.

Next, a hardware configuration of the image processing server 7 according to this embodiment is described in detail with reference to FIG. 46. FIG. 46 is a diagram illustrating a hardware configuration of the image processing server 7. The hardware configuration of the special image capturing device 1 and that of the smartphone 5 according to this embodiment are the same as those in the first embodiment, and therefore, descriptions thereof will be omitted.

<Hardware Configuration of Image Processing Server>

As illustrated in FIG. 46, the image processing server 7 is implemented by a computer and includes a CPU 701, a ROM 702, a random access memory (RAM) 703, an HD 704, an HDD 705, a recording medium 706, a medium I/F 707, a display 708, a network I/F 709, a keyboard 711, a mouse 712, an optical (CD-RW) drive 714, and a bus line 710. The image processing server 7 functions as a server, and therefore, need not include an input device, such as the keyboard 711 or the mouse 712, or an output device, such as the display 708.

The CPU 701 controls the overall operation of the image processing server 7. The ROM 702 stores programs used to drive the CPU 701. The RAM 703 is used as a work area for the CPU 701. The HD 704 stores various types of data including programs. The HDD 705 controls read/write of various types of data from/to the HD 704 under control of the CPU 701. The medium I/F 707 controls read/write (storing) of data from/to (in) a recoding medium 706, such as a flash memory. The display 708 displays various types of information, such as cursors, menus, windows, text, and images. The network IN 709 is an interface for data communication using the communication network 100. The keyboard 711 is an example of an input device and includes a plurality of keys for inputting, for example, characters, numbers, and various instructions. The mouse 712 is an example of an input device used to, for example, select and perform various instructions, select a processing target, and move a cursor. The optical drive 714 controls, for example, reading of various types of data from a compact disc rewritable (CD-RW) 713, which is an example of an attachable/detachable recording medium.

The bus line 710 included in the image processing server 7 is implemented by, for example, an address bus and a data bus used to electrically connect the elements including the CPU 701 illustrated in FIG. 46.

Figure 47:
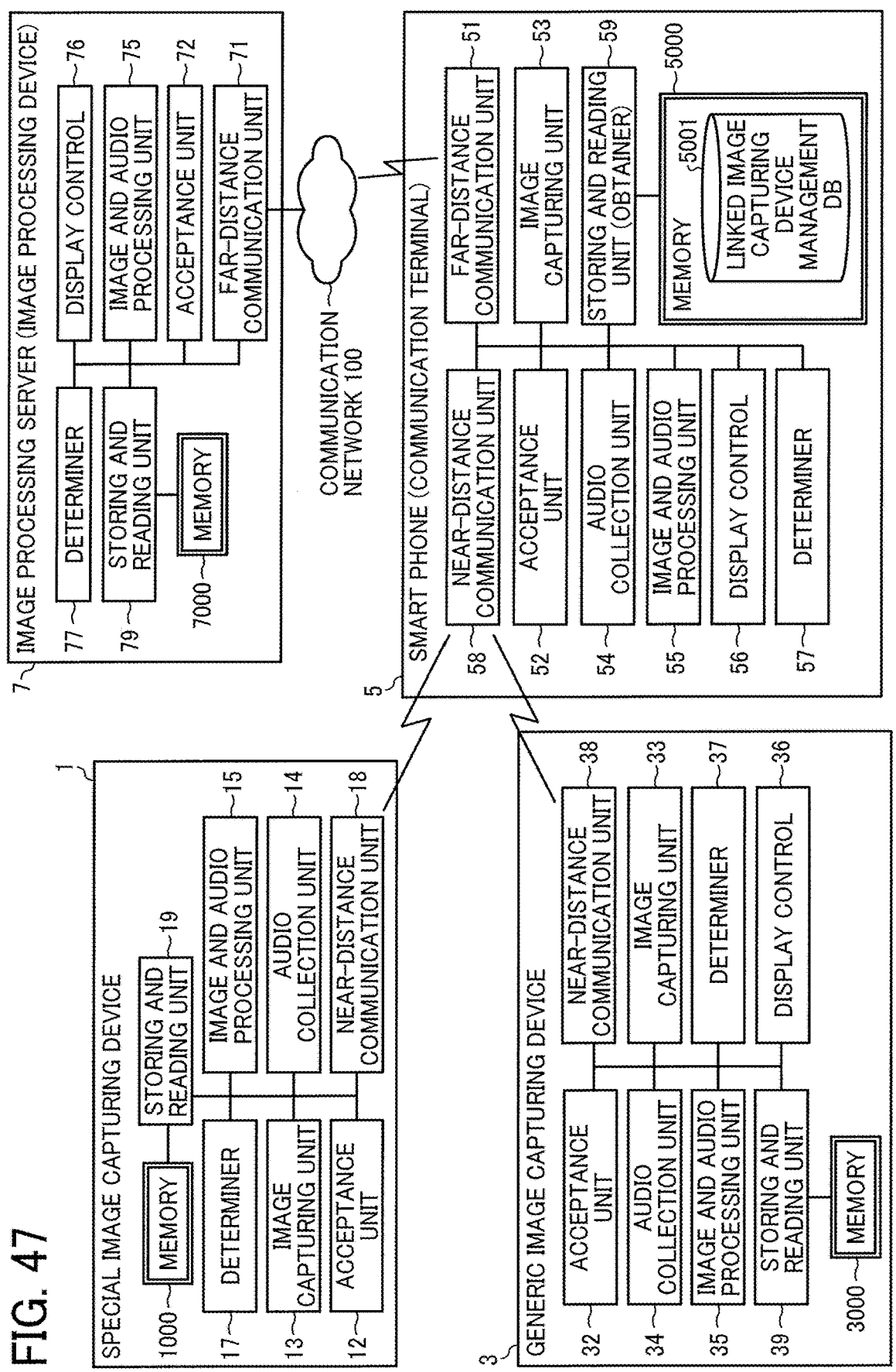
FIG. 47 is an example functional block diagram of the image capturing system according to the embodiment.
Figure 48:
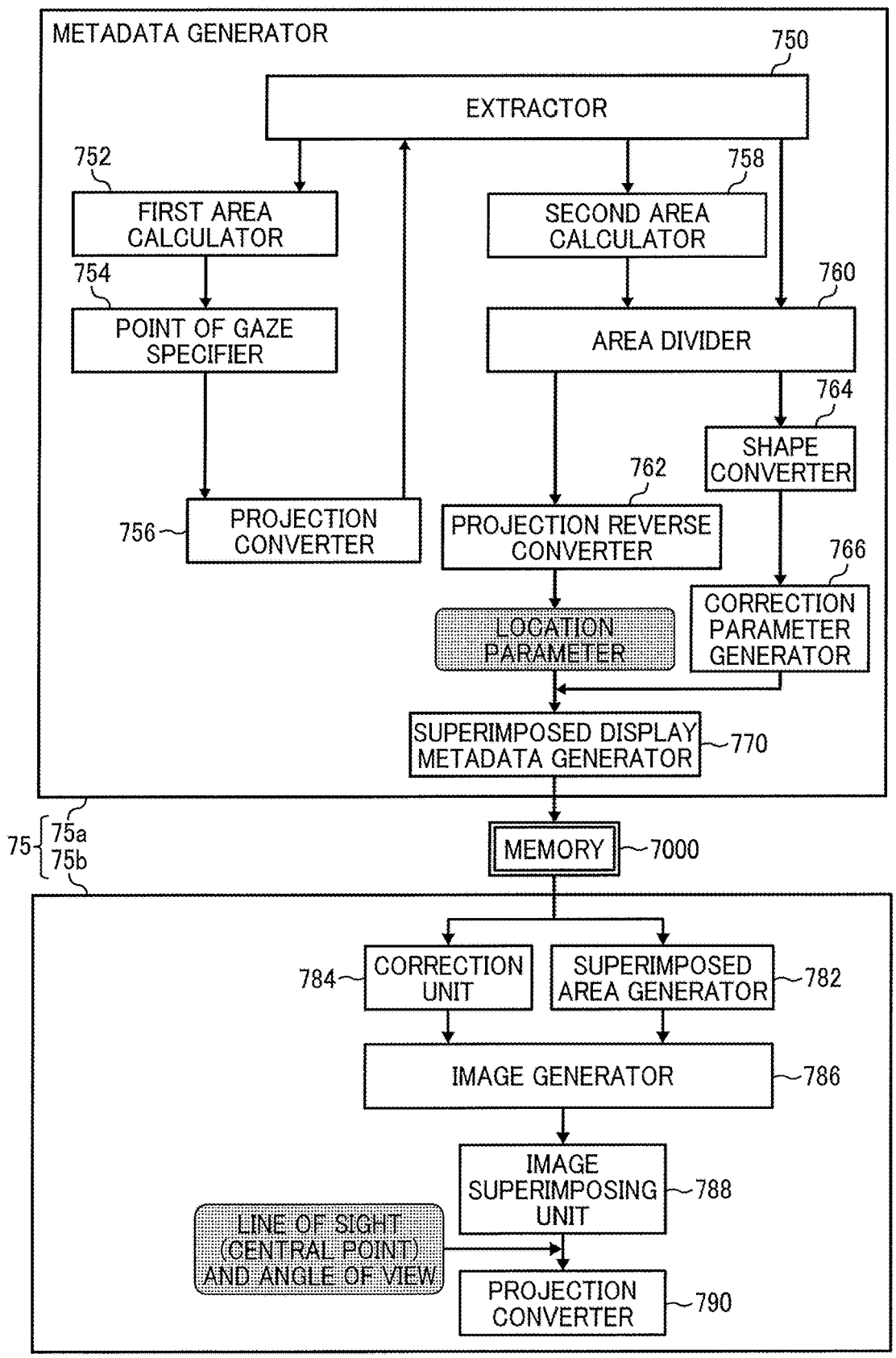
FIG. 48 is an example functional block diagram of an image and audio processing unit according to the embodiment.

Now, a functional configuration of the image capturing system 200 taccording to this embodiment is described with reference to FIG. 47 and FIG. 48. FIG. 47 is a functional block diagram of the image capturing system 200 according to this embodiment. The functional configuration of the special image capturing device 1 and that of the smartphone 5 according to this embodiment are the same as those in the first embodiment, and therefore, descriptions thereof will be omitted. In this embodiment, the image and audio processing unit 55 of the smartphone 5 may or may not include all of the functional units illustrated in FIG. 48.

<Functional Configuration of Image Processing Server>

As illustrated in FIG. 47, the image processing server 7 includes a far-distance communication unit 71, an acceptance unit 72, an image and audio processing unit 75, a display control 76, a determiner 77, and a storing and reading unit 79. These units are functions or units that are implemented by one or more of the constituent elements illustrated in FIG. 46 operating in accordance with instructions from the CPU 701. The CPU 701 operates in accordance with a program for the image processing server 7 loaded from the HD 704 to the RAM 703.

The image processing server 7 further includes a memory 7000 implemented by the ROM 702, the RAM 703, and the HD 704 illustrated in FIG. 46.

(Functional Configuration of Each Unit of Image Processing Server)

The far-distance communication unit 71 of the image processing server 7 is implemented mainly by the network I/F 709 and instructions of the CPU 701 illustrated in FIG. 46 and transmits/receives various types of data (or information) to/from other devices (for example, other servers or the smartphone 5) via the communication network 100. The acceptance unit 72 is implemented mainly by the keyboard 711, the mouse 712, and instructions of the CPU 701 and accepts various selections or input from a user.

The image and audio processing unit 75 is implemented mainly in accordance with instructions from the CPU 701 and performs various processes for various types of data transmitted from the smartphone 5.

The display control 76 is implemented mainly by instructions of the CPU 701 and, unlike the display control 56 according to the first embodiment, generates data of the predetermined-area image Q used to display the planar image P on the display 517 of the smartphone 5. Further, the display control 76 uses superimposed display metadata generated by the image and audio processing unit 75 to generate data for adjusting each grid area LA0 of the planar image P so as to be located at a position indicated by the location parameter and so as to have brightness and color indicated by the correction parameter, thereby superimposing and displaying the planar image P on the spherical image CE.

The determiner 77 is implemented by instructions of the CPU 701 illustrated in FIG. 46 and performs various types of determination.

The storing and reading unit 79 is implemented mainly by instructions of the CPU 701 illustrated in FIG. 46. The storing and reading unit 79 stores various types of data (or information) including superimposed display metadata in the memory 7000 and reads various types of data (or information) including the superimposed display metadata from the memory 7000. Further, the storing and reading unit 79 functions as an obtainer that obtains various types of data from the memory 7000.

(Detailed Functional Configuration of Each Unit of Image and Audio Processing Unit)

Now, a functional configuration of each unit of the image and audio processing unit 75 is described in detail with reference to FIG. 48. FIG. 48 is a detailed functional block diagram of the image and audio processing unit 75.

The image and audio processing unit 75 includes a metadata generator 75a, which performs encoding, and a superimposing unit 75b, which performs decoding. The metadata generator 75a performs a process in step S44 described below and illustrated in FIG. 49. The superimposing unit 75b performs a process in step S45 described below and illustrated in FIG. 49.

First, a functional configuration of each unit of the metadata generator 75a is described. The metadata generator 75a includes an extractor 750, a first area calculator 752, a point of gaze specifier 754, a projection converter 756, a second area calculator 758, an area divider 760, a projection reverse converter 762, a shape converter 764, a correction parameter generator 766, and a superimposed display metadata generator 770, which have the same functions as the functions of the extractor 550, the first area calculator 552, the point of gaze specifier 554, the projection converter 556, the second area calculator 558, the area divider 560, the projection reverse converter 562, the shape converter 564, the correction parameter generator 566, and the superimposed display metadata generator 570 according to the first embodiment, respectively, and therefore, descriptions thereof will be omitted.

(Functional Configuration of Superimposing Unit)

Next, a functional configuration of the superimposing unit 75b is described. The superimposing unit 75b includes a superimposed area generator 782, a correction unit 784, an image generator 786, an image superimposing unit 788, and a projection converter 790, which have the same functions as the functions of the superimposed area generator 582, the correction unit 584, the image generator 586, the image superimposing unit 588, and the projection converter 590 according to the first embodiment, respectively, and therefore, descriptions thereof will be omitted.

<Operation>

Figure 49:
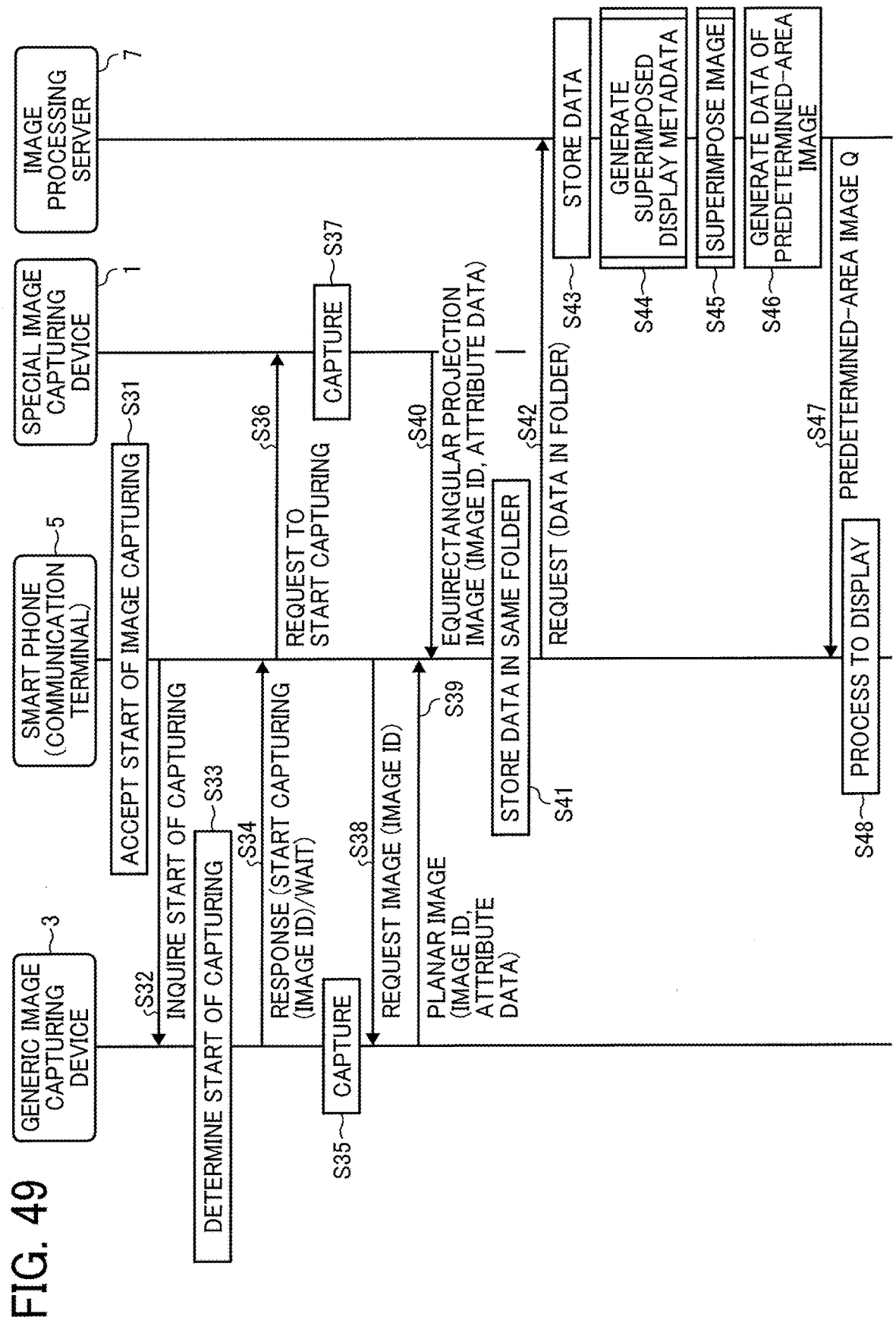
FIG. 49 is an example sequence diagram illustrating operation of capturing images, performed by the image capturing system of FIG. 45, according to the embodiment.

Now, operation of capturing an image, performed by the image capturing system 200, according to this embodiment is described with reference to FIG. 49. FIG. 49 is a sequence chart illustrating the image capturing operation according to this embodiment. The processes in steps S31 to S41 are similar to the processes in steps S11 to S17 in FIG. 16 according to the first embodiment, and therefore, descriptions thereof will be omitted.

In the smartphone 5, the far-distance communication unit 51 transmits, to the image processing server 7 via the communication network 100, superimposition request information indicating a superimposition request for superimposing an image on another image in different projection (step S42). The superimposition request information to be transmitted includes data (planar image data and equirectangular projection image data) in an electronic folder stored in the memory 5000. The far-distance communication unit 71 of the image processing server 7 receives the data in the electronic folder.

Subsequently, in the image processing server 7, the storing and reading unit 79 stores the data in the electronic folder received in step S42 in the memory 7000 (step S43). The metadata generator 75a illustrated in FIG. 48 generates superimposed display metadata (step S44). The superimposing unit 75b performs a superimposition process (step S45). The processes in steps S44 and S45 are similar to those in steps S18 and S23 illustrated in FIG. 16, and therefore, descriptions thereof will be omitted.

Subsequently, the display control 76 generates data of the predetermined-area image Q used to display the predetermined-area image Q representing the predetermined area T across the display area of the display 517 of the smartphone 5 (step S46). Here, the predetermined-area image Q includes the superimposed image S, that is, the planar image P', which is the superimposed planar image P.

The far-distance communication unit 71 transmits the data of the predetermined-area image Q generated by the display control 76 to the smartphone 5 (step S47). The far-distance communication unit 51 of the smartphone 5 receives the data of the predetermined-area image Q.

Subsequently, in the smartphone 5, the display control 56 displays the predetermined-area image Q, which includes the superimposed image S, on the display 517 (step S48).

As described above, this embodiment produces effects similar to the effects produced by the first embodiment described above.

In this embodiment, the smartphone 5 performs the linked image capturing process, and the image processing server 7 performs the process for generating the superimposed display metadata and the process for superimposition. Therefore, even if the processing capability of the smartphone 5 is limited, a shift in an image can be reduced, which is an effect produced by this embodiment.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, in the embodiment, the method for reducing a decrease in image quality due to vignetting is described; however, an area in which image quality is low for a reason other than vignetting can be excluded from superimposition.

In the description given above, for example, a user or a developer sets the vignetting area; however, the smartphone 5 may perform image processing to detect the vignetting area.

The spherical image may be displayed using browser software or application software for displaying spherical images.

The processing performed by the smartphone 5 may be performed by a server. In such case, the smartphone 5 receives a user instruction, sends the user instruction to receive the spherical image CE from the server, and displays the spherical image CE according to the user instruction.

The spherical image in the embodiments may be an image having an angle of view that does not fit in the predetermined area T. For example, the spherical image may be a wide-angle image having an angle of view between 180° and 360° extending only in the horizontal direction. That is, the spherical image in the embodiments need not be a spherical image.

The smartphone 5 includes the cameras; however, three or more cameras may be externally connected to the smartphone 5.

In this disclosure, examples of superimposition of images include, but not limited to, placement of one image on top of other image entirely or partly, laying one image over other image entirely or partly, mapping one image on other image entirely or partly, pasting one image on other image entirely or partly, combining one image with other image, integrating one image with other image, and arranging one image with other image. That is, as long as the user can perceive a plurality of images (such as the spherical image and the planar image) being displayed on a display as they were one image, or as long as the user can perceive a plurality of images, as one image being visible preferentially over other image, processing to be performed on those images for display is not limited to the above-described examples.

The example configurations illustrated in, for example, FIG. 11 and FIG. 13 include processing units divided in accordance with main functions to facilitate understanding of the processes performed by the special image capturing device 1 and by the smartphone 5. The present invention is not limited by the way of division into the processing units or the names of the processing units. The processes performed by the special image capturing device 1 and by the smartphone 5 may be divided into a larger number of processing units depending on the details of the processes. Alternatively, the processes may be divided into processing units so that one processing unit covers a larger number of processes.

The superimposed area information and the UV coordinates included in the superimposed display metadata are examples of area specification information.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

In one example, the present invention may reside in: an image processing apparatus comprising circuitry to: obtain a first image in a first projection, and a second image in a second projection; transform projection of at least a part of the first image corresponding to the second image, from the first projection to the second projection, to generate a third image in the second projection; extract a plurality of feature points, respectively, from the second image and the third image; determine a corresponding area in the third image that corresponds to the second image, based on the plurality of feature points respectively extracted from the second image and the third image; transform projection of a plurality of points in the corresponding area of the third image, from the second projection to the first projection, to obtain location information indicating locations of the plurality of points in the first projection in the first image, being respectively associated with the plurality of points in the second projection in the second image; obtain, from a memory, area specification information specifying an area in the second image; and associate the location information indicating the locations of the plurality of points in the first projection in the first image, in association with the area specification information, the area specification information to be used for determining, from among the plurality of points in the second image, one or more points in the second image to be superimposed on the first image according to the location information.

In one example, the memory previously stores the area specification information specifying the area in the second image that is not to be superimposed on the first image.

In one example, the area specified by the area specification information is an area affected by a shadow of an image capturing device that captures the first image.

In one example, the area specification information specifies one or more of a plurality of grids in the second image, when the second image is divided into a plurality of grid areas each grid area being equal in size to each grid area of the third image. The area specification information is used for determining whether each one of the grids in the second image, respectively corresponding to the grids in the third image, is to be superimposed on a partial sphere represented by the plurality of points in the first projection in the first image.

In one example, the area specification information includes location information indicating location of an area other than the specified area of the second image.

In one example, the circuitry divides the area other than the specified area of the second image into a plurality of grid areas, and generates metadata including coordinates of a plurality of grids of the area other than the specified area. The coordinates of the plurality of grids of the area other than the specified area is used for determining whether each one of the grids in the second image, respectively corresponding to the grids in the third image, is to be superimposed on a partial sphere represented by the plurality of points in the first projection in the first image.

In one example, the area specification information indicates coordinates of one or more grids of a plurality of grids obtained by dividing the second image into a plurality of grid areas, each grid area being corrected by calibration of an image capturing device that captures the second image.

In one example, the circuitry generates metadata including: the area specification information; and information regarding the plurality of points in the first projection in the first image, including at least the location information.

In one example, when the second image includes a plurality of second images, the circuitry further stores, as the metadata, information indicating an order of superimposing the plurality of second images.

In one example, the circuitry further stores, as the metadata, a line-of-sight direction and an initial value of an angle of view each obtained for the first image.

In one example, the part of the first image corresponding to the second image is a peripheral area image, which is an area of the first image that contains a target object of the second image and surroundings of the target object of the second image. The third image is generated through projection transformation of the peripheral area image from the first projection to the second projection.

In one example, the plurality of points in the third image is a plurality of grids that are obtained by dividing the third image into a plurality of grid areas, and the plurality of points in the first projection in the first image, obtained by projection transformation of the plurality of points in the third image from the second projection to the first projection, is a plurality of grids in the first image that respectively correspond to the plurality of grids in the third image.

In one example, the circuitry refers to information indicating positional relation between a first image capturing device that captures the first image and a second image capturing device that captures the second image, to determine a central point of the peripheral area image, and extracts an area that surrounds the determined central point as the peripheral area image.

In one example, the circuitry refers to information indicating a central point of the peripheral area image that is previously stored in the memory, and extracts an area that surrounds the determined central point as the peripheral area image.

In one example, the present invention may reside in: a non-transitory recording medium storing a plurality of instructions which, when executed by one or more processors, cause the processors to perform an image processing method comprising: obtaining a first image in a first projection, and a second image in a second projection; transforming projection of at least a part of the first image corresponding to the second image, from the first projection to the second projection, to generate a third image in the second projection; extracting a plurality of feature points, respectively, from the second image and the third image; determining a corresponding area in the third image that corresponds to the second image, based on the plurality of feature points respectively extracted from the second image and the third image; transforming projection of a plurality of points in the corresponding area of the third image, from the second projection to the first projection, to obtain location information indicating locations of the plurality of points in the first projection in the first image, being respectively associated with the plurality of points in the second projection in the second image; obtaining, from a memory, area specification information specifying an area in the second image; and associating the location information indicating the locations of the plurality of points in the first projection in the first image, in association with the area specification information. The area specification information to be used for determining, from among the plurality of points in the second image, one or more points in the second image to be superimposed on the first image according to the location information.

The invention claimed is:

1. An image processing apparatus comprising circuitry configured to:
   obtain a first image in a first projection, and a second image in a second projection;
   transform projection of at least a part of the first image corresponding to the second image, from the first projection to the second projection, to generate a third image in the second projection;
   extract a plurality of feature points, respectively, from the second image and the third image;
   determine a corresponding area in the third image that corresponds to the second image, based on the plurality of feature points respectively extracted from the second image and the third image;
   obtain, from a memory, area specification information specifying an area in the second image that is not to be superimposed on the first image;
   transform projection of a plurality of points in the corresponding area of the third image other than a plurality of points corresponding to the area specified by the area specification information, from the second projection to the first projection, to obtain location information indicating locations of the plurality of points in the first projection in the first image; and
   store, in the memory, the location information indicating the locations of the plurality of points in the first projection in the first image, in association with the plurality of points in the second projection in the second image.

2. The image processing apparatus of claim 1, wherein the area specified by the area specification information is an area having image quality lower than image quality of other area in the second image.

3. The image processing apparatus of claim 1, wherein the area specified by the area specification information is an area affected by a shadow of an image capturing device that captures the first image.

4. The image processing apparatus of claim 1,
   wherein the area specification information specifies one or more of a plurality of grids in the second image, when the second image is divided into a plurality of grid areas each grid area being equal in size to each grid area of the third image, and
   wherein the area specification information is used for determining whether each one of the grids in the second image, respectively corresponding to the grids in the third image, is to be superimposed on a partial sphere represented by the plurality of points in the first projection in the first image.

5. The image processing apparatus of claim 1, wherein the area specification information includes location information indicating location of an area other than the specified area of the second image.

6. The image processing apparatus of claim 5,
   wherein the circuitry divides the area other than the specified area of the second image into a plurality of grid areas, and generates metadata including coordinates of a plurality of grids of the area other than the specified area, and
   wherein the coordinates of the plurality of grids of the area other than the specified area is used for determining whether each one of the grids in the second image, respectively corresponding to the grids in the third image, is to be superimposed on a partial sphere represented by the plurality of points in the first projection in the first image.

7. The image processing apparatus of claim 1, wherein the area specification information indicates coordinates of one or more grids of a plurality of grids obtained by dividing the second image into a plurality of grid areas, each grid area being corrected by calibration of an image capturing device that captures the second image.

8. The image processing apparatus of claim 1, wherein the circuitry generates metadata including:
the area specification information; and
information regarding the plurality of points in the first projection in the first image, including at least the location information.

9. The image processing apparatus of claim 8, wherein, when the second image includes a plurality of second images, the circuitry further stores, as the metadata, information indicating an order of superimposing the plurality of second images.

10. The image processing apparatus of claim 9, wherein the circuitry further stores, as the metadata, a line-of-sight direction and an initial value of an angle of view each obtained for the first image.

11. The image processing apparatus of claim 1, wherein the part of the first image corresponding to the second image is a peripheral area image, which is an area of the first image that contains a target object of the second image and surroundings of the target object of the second image, and
wherein the third image is generated through projection transformation of the peripheral area image from the first projection to the second projection.

12. The image processing apparatus of claim 11, wherein the plurality of points in the third image is a plurality of grids that are obtained by dividing the third image into a plurality of grid areas, and
wherein the plurality of points in the first projection in the first image, obtained by projection transformation of the plurality of points in the third image from the second projection to the first projection, is a plurality of grids in the first image that respectively correspond to the plurality of grids in the third image.

13. The image processing apparatus of claim 12, wherein the circuitry refers to information indicating positional relation between a first image capturing device that captures the first image and a second image capturing device that captures the second image, to determine a central point of the peripheral area image, and extracts an area that surrounds the determined central point as the peripheral area image.

14. The image processing apparatus of claim 12, wherein the circuitry refers to information indicating a central point of the peripheral area image that is previously stored in the memory, and extracts an area that surrounds the determined central point as the peripheral area image.

15. An image capturing system comprising:
the image processing apparatus of claim 1; and
a first image capturing device configured to capture the first image in response to an instruction for capturing the first image, and transmit the captured first image to the image processing apparatus.

16. A non-transitory recording medium storing a plurality of instructions which, when executed by one or more processors, cause the processors to perform an image processing method comprising:
obtaining a first image in a first projection, and a second image in a second projection;
transforming projection of at least a part of the first image corresponding to the second image, from the first projection to the second projection, to generate a third image in the second projection;
extracting a plurality of feature points, respectively, from the second image and the third image;
determining a corresponding area in the third image that corresponds to the second image, based on the plurality of feature points respectively extracted from the second image and the third image;
obtaining, from a memory, area specification information specifying an area in the second image that is not to be superimposed on the first image;
transforming projection of a plurality of points in the corresponding area of the third image other than a plurality of points corresponding to the area specified by the area specification information, from the second projection to the first projection, to obtain location information indicating locations of the plurality of points in the first projection in the first image; and
storing, in the memory, the location information indicating the locations of the plurality of points in the first projection in the first image, in association with the plurality of points in the second projection in the second image.

17. An image processing apparatus comprising circuitry configured to:
obtain a first image in a first projection, and a second image in a second projection;
transform projection of at least a part of the first image corresponding to the second image, from the first projection to the second projection, to generate a third image in the second projection;
extract a plurality of feature points, respectively, from the second image and the third image;
determine a corresponding area in the third image that corresponds to the second image, based on the plurality of feature points respectively extracted from the second image and the third image;
transform projection of a plurality of points in the corresponding area of the third image, from the second projection to the first projection, to obtain location information indicating locations of the plurality of points in the first projection in the first image, being respectively associated with the plurality of points in the second projection in the second image;
obtain, from a memory, area specification information specifying an area in the second image; and
associate the location information indicating the locations of the plurality of points in the first projection in the first image, in association with the area specification information,
the area specification information to be used for determining, from among the plurality of points in the second image, one or more points in the second image to be superimposed on the first image according to the location information.

18. An image capturing system comprising:
the image processing apparatus of claim 17; and
a first image capturing device configured to capture the first image in response to an instruction for capturing the first image, and transmit the captured first image to the image processing apparatus.

\* \* \* \* \*